(12) United States Patent
Depraete

(10) Patent No.: US 10,267,397 B2
(45) Date of Patent: Apr. 23, 2019

(54) TURBINE ASSEMBLY FOR HYDROKINETIC TORQUE CONVERTER, AND METHOD FOR MAKING THE SAME

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 123 days.

(21) Appl. No.: 15/051,018

(22) Filed: Feb. 23, 2016

(65) Prior Publication Data

US 2017/0241529 A1 Aug. 24, 2017

(51) Int. Cl.
| | |
|---|---|
| *F16H 41/28* | (2006.01) |
| *F01D 5/04* | (2006.01) |
| *F01D 5/30* | (2006.01) |
| *F01D 9/02* | (2006.01) |
| *F01D 25/24* | (2006.01) |

(52) U.S. Cl.
CPC ............ *F16H 41/28* (2013.01); *F01D 5/048* (2013.01); *F01D 5/3053* (2013.01); *F01D 9/02* (2013.01); *F01D 25/24* (2013.01); *F05D 2230/60* (2013.01)

(58) Field of Classification Search
CPC ......... F16H 41/28; F16B 19/004; F16B 21/06
See application file for complete search history.

(56) References Cited

U.S. PATENT DOCUMENTS

| | | | |
|---|---|---|---|
| 2,749,710 A | 6/1956 | Russell | |
| 2,762,197 A | 9/1956 | Ullery | |
| 3,482,400 A | 12/1969 | Giraud | |
| 3,828,554 A | 8/1974 | Hau | |
| 4,854,438 A * | 8/1989 | Weissenberger | F16B 5/04 192/107 M |
| 5,465,575 A | 11/1995 | Shimmell | |
| 5,505,590 A * | 4/1996 | Dohring | F16H 41/28 416/180 |
| 5,507,622 A | 4/1996 | Avny | |
| 5,549,266 A * | 8/1996 | Mitchell | F16B 19/004 248/205.1 |
| 5,655,875 A | 8/1997 | Sekine | |
| 6,123,505 A | 9/2000 | Sasse et al. | |
| 6,296,445 B1 | 10/2001 | Chasseguet et al. | |
| 6,378,676 B1 | 4/2002 | Chasseguet et al. | |
| 6,428,276 B1 | 8/2002 | Chasseguet et al. | |

(Continued)

FOREIGN PATENT DOCUMENTS

WO WO0001961 A1 1/2000

OTHER PUBLICATIONS

International Search Report from corresponding international application No. PCT/EP2017/054236.

*Primary Examiner* — F Daniel Lopez
(74) *Attorney, Agent, or Firm* — Berenato & White, LLC

(57) ABSTRACT

A turbine assembly for a hydrokinetic torque converter. The turbine assembly is rotatable about a rotational axis and hydrokinetic torque converter and comprises a first turbine component coaxial with the rotational axis, and a second turbine component non-moveably secured to the turbine component coaxially therewith. The first turbine component is formed separately from the second turbine component. The first turbine component has a plurality of first turbine blade members integrally formed therewith.

25 Claims, 67 Drawing Sheets

(56) References Cited

U.S. PATENT DOCUMENTS

| | | | |
|---|---|---|---|
| 8,162,612 B2* | 4/2012 | Brees | B23K 1/0008 |
| | | | 192/30 R |
| 8,365,890 B2 | 2/2013 | Tamura | |
| 9,206,830 B2* | 12/2015 | Lu | F16B 19/004 |
| 2015/0184701 A1 | 7/2015 | Lindemann et al. | |

* cited by examiner

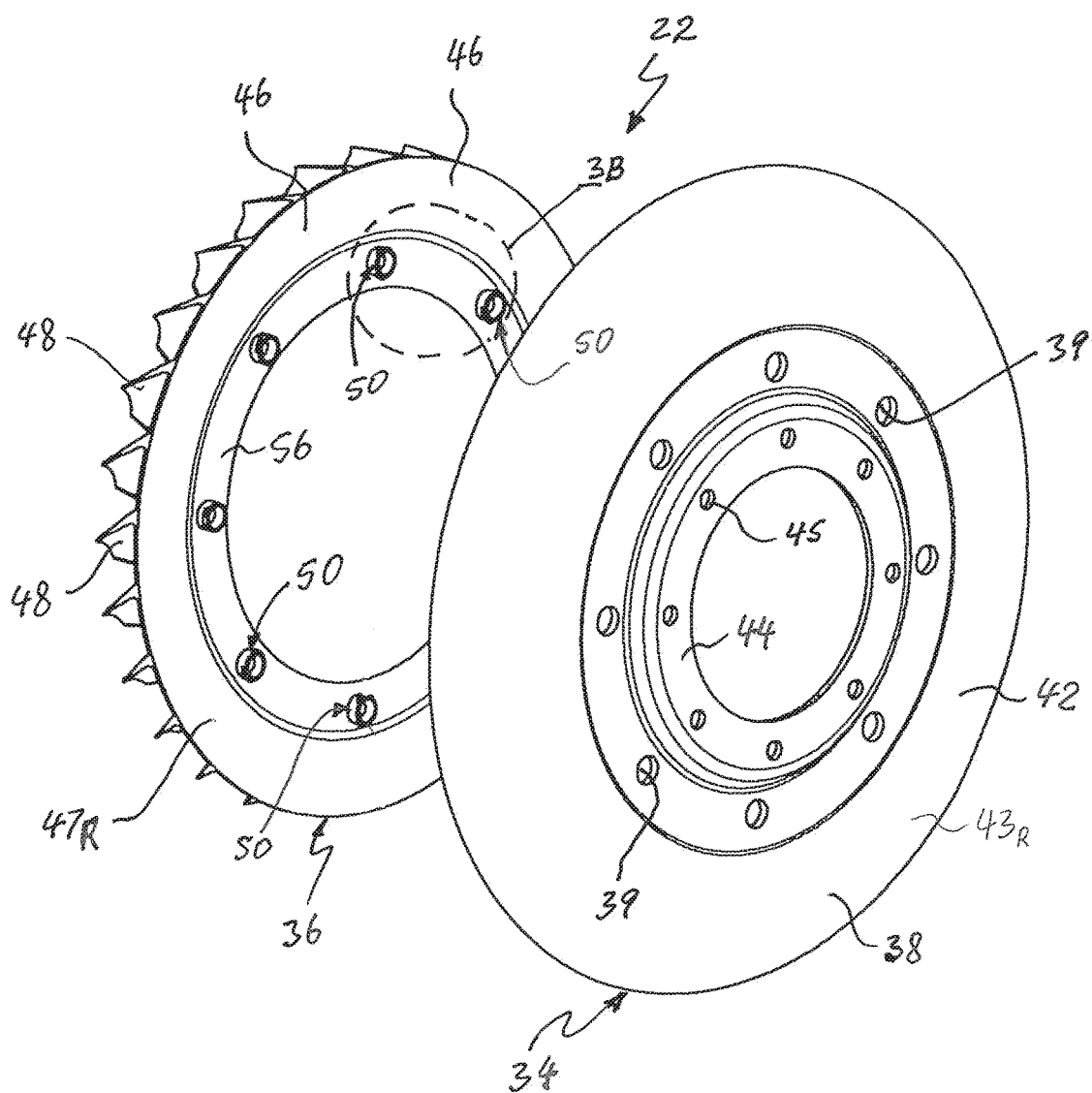

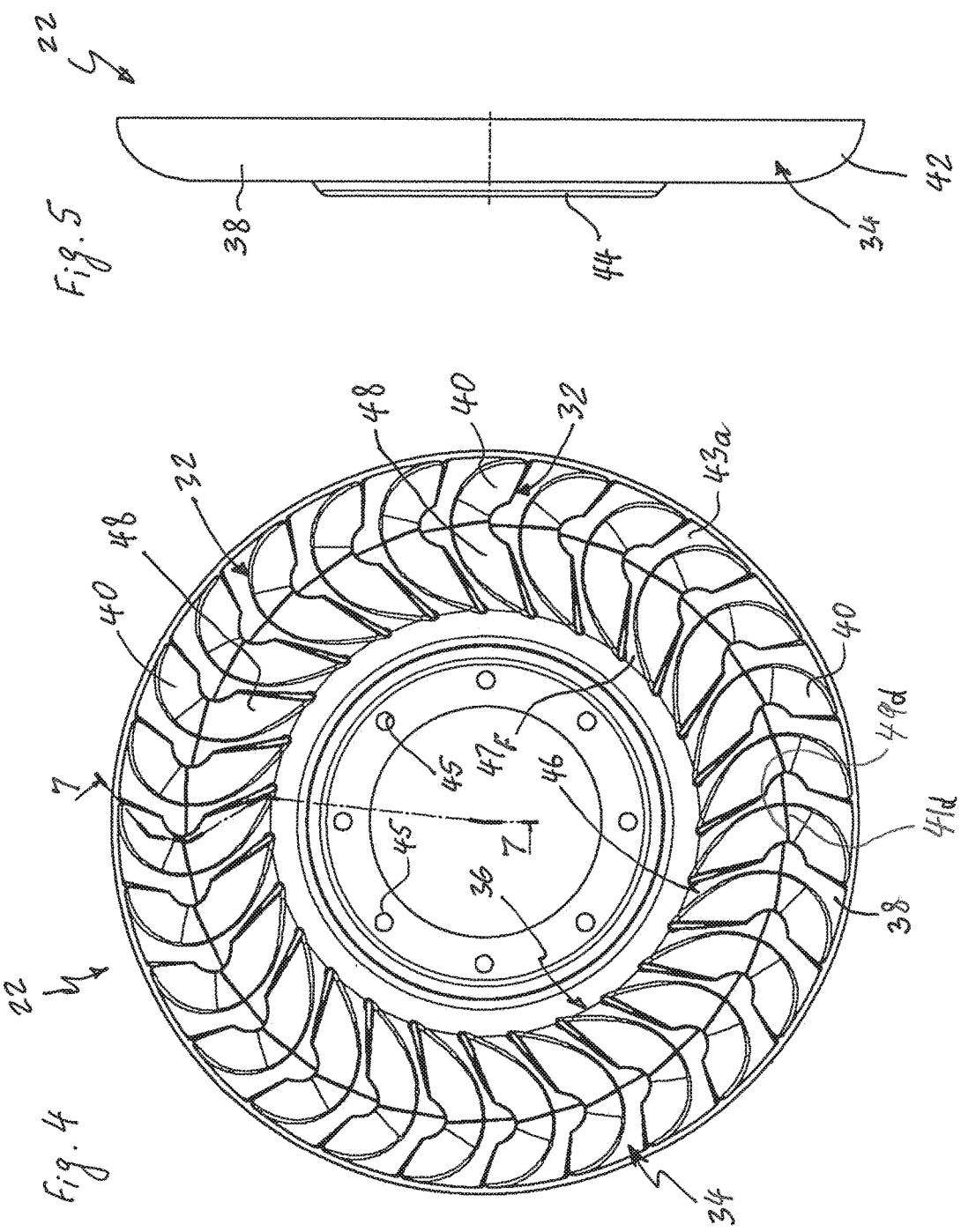

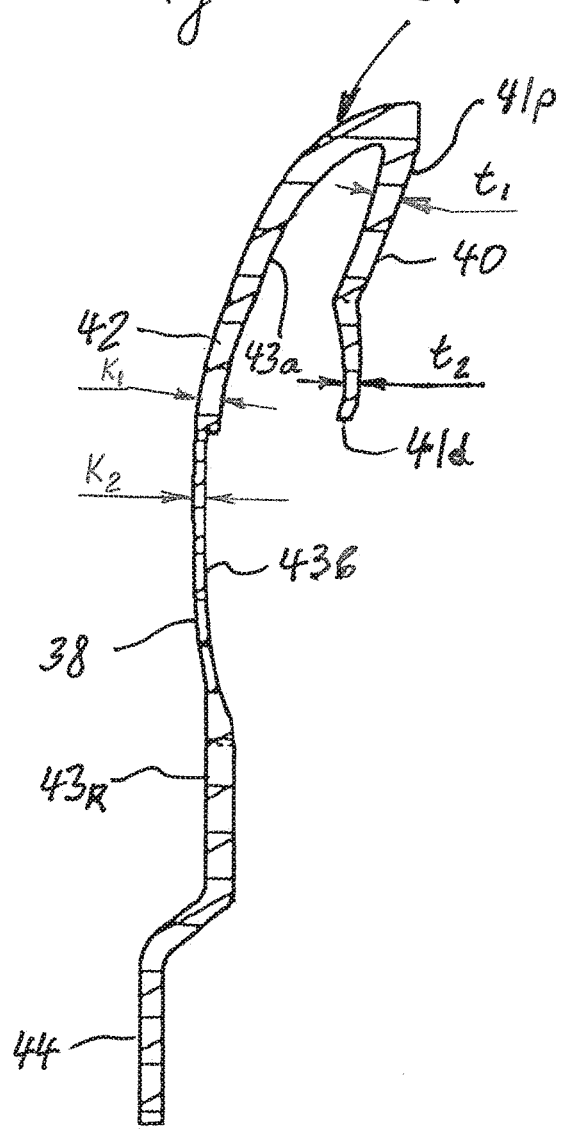

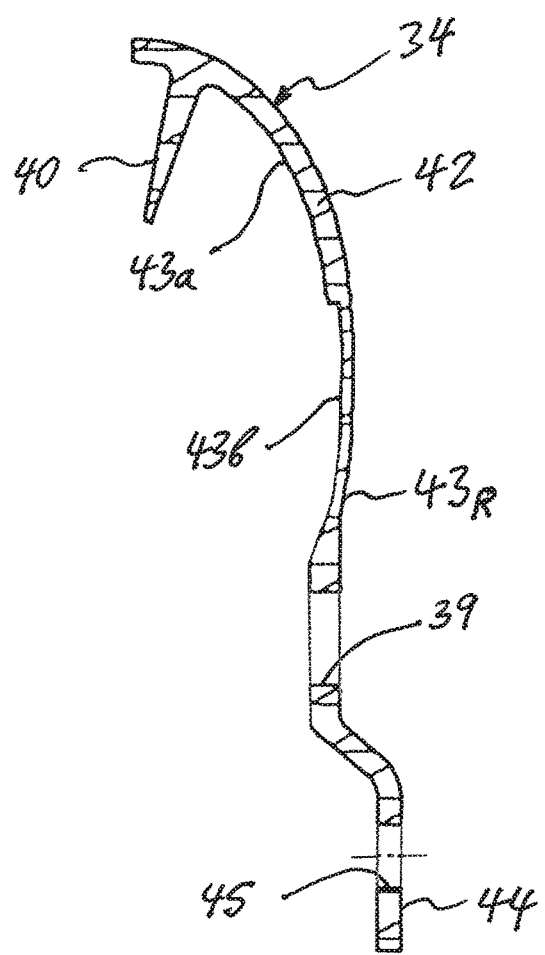

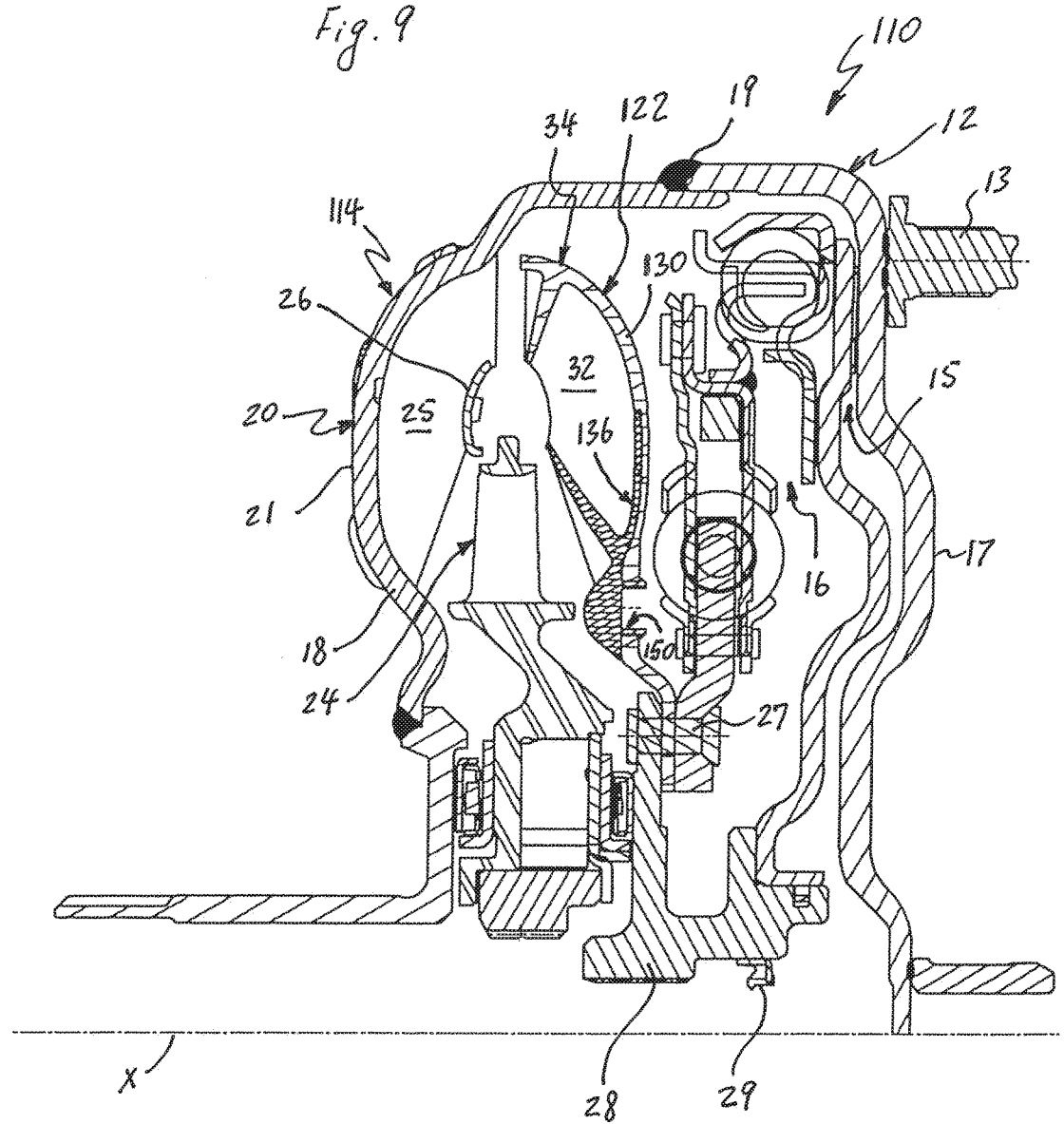

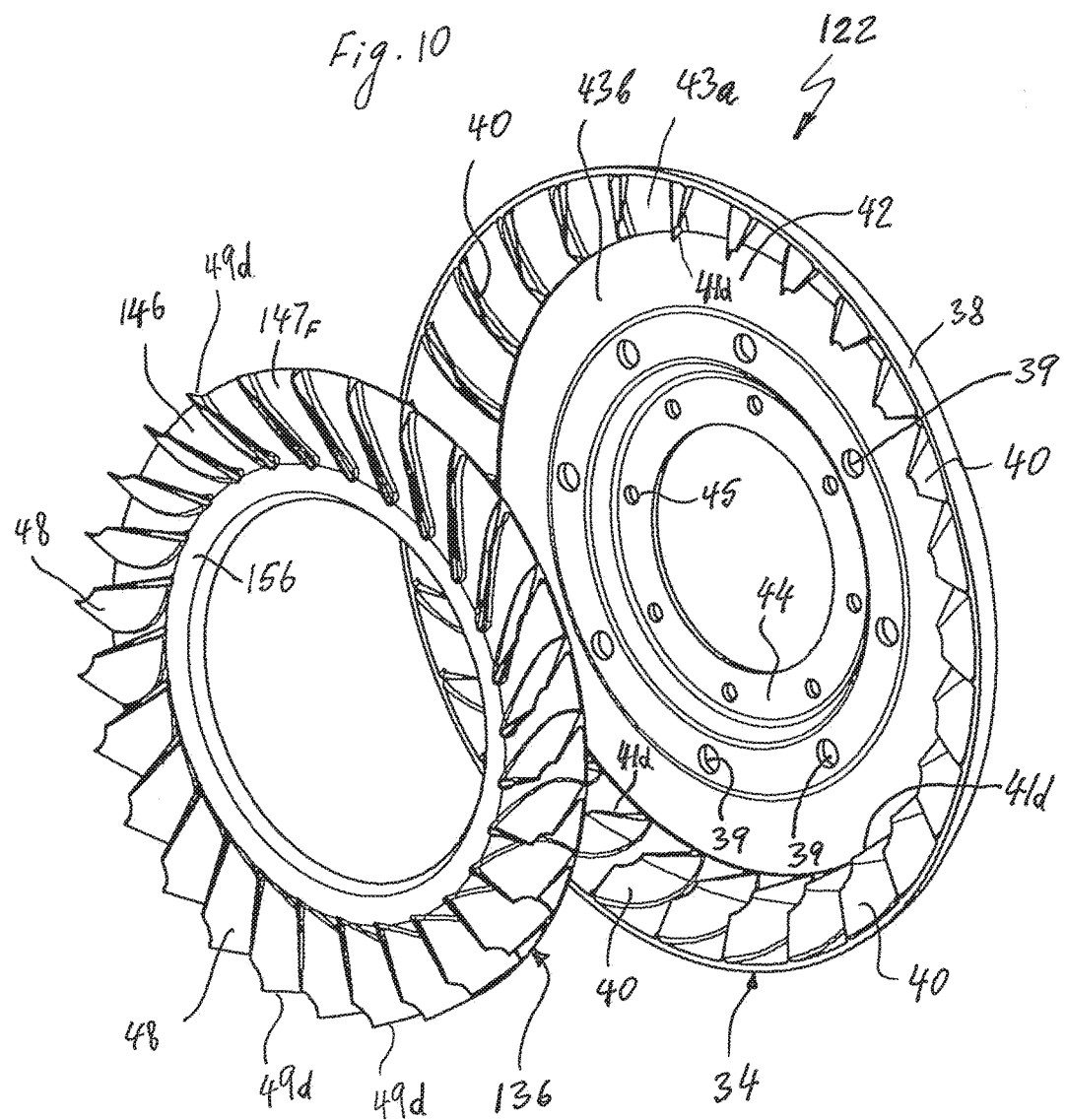

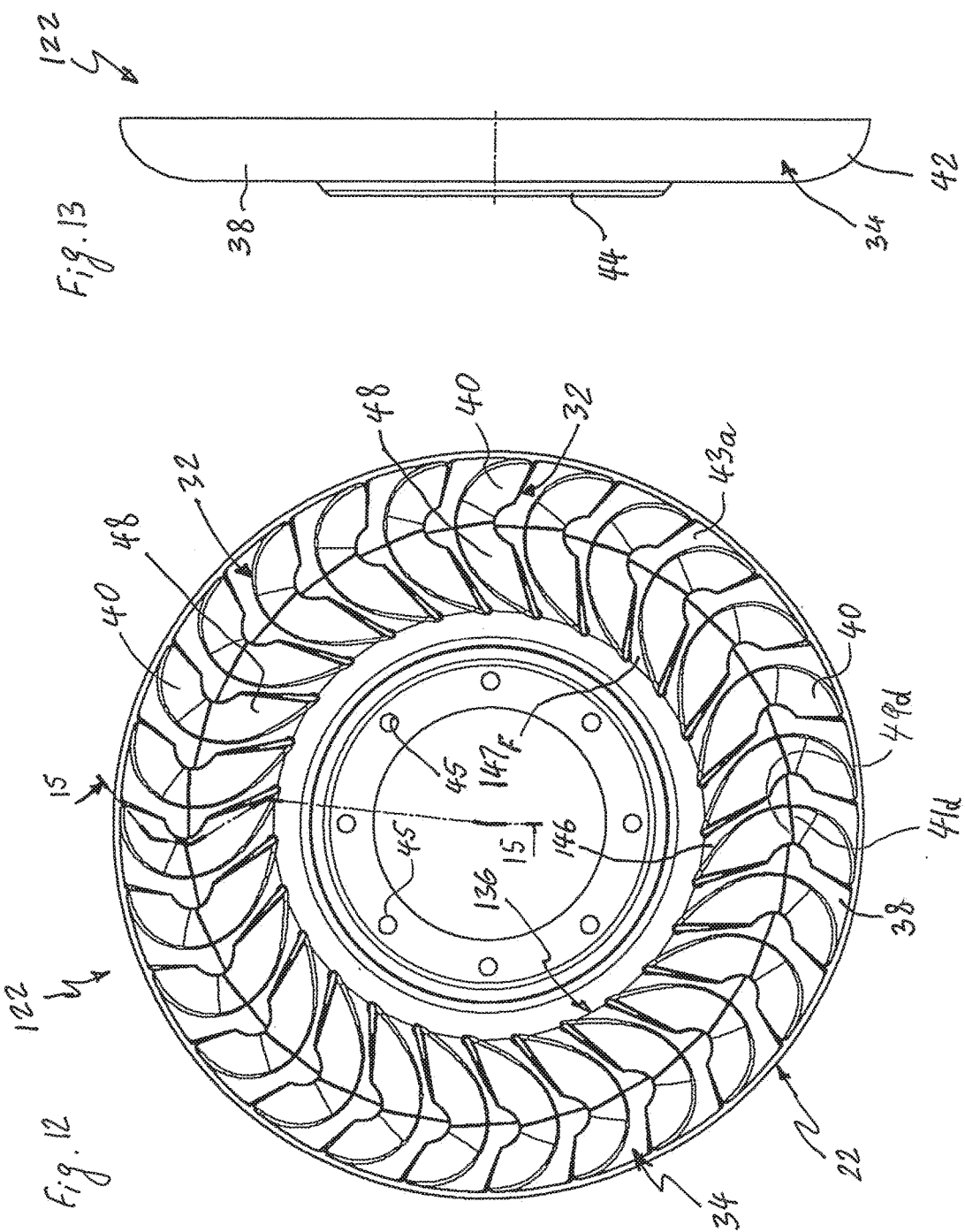

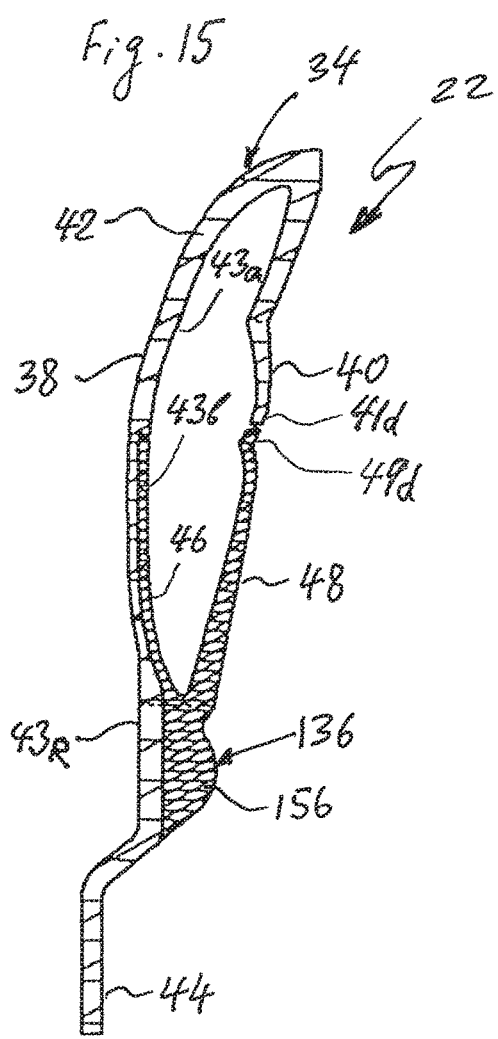

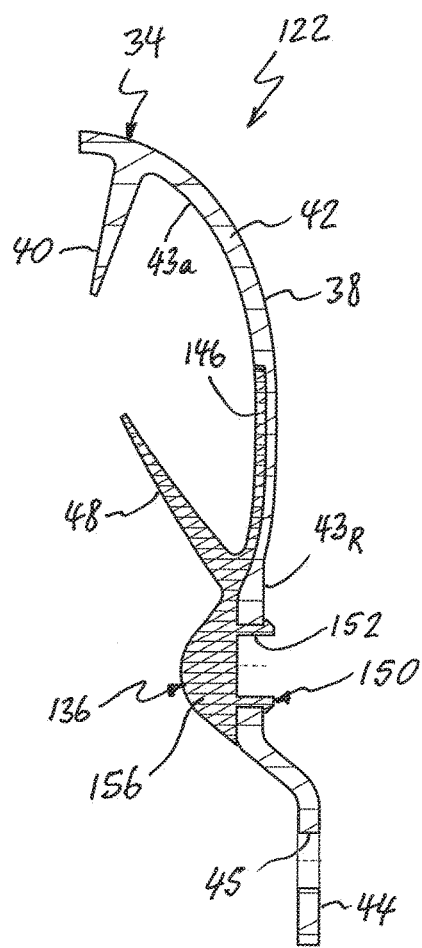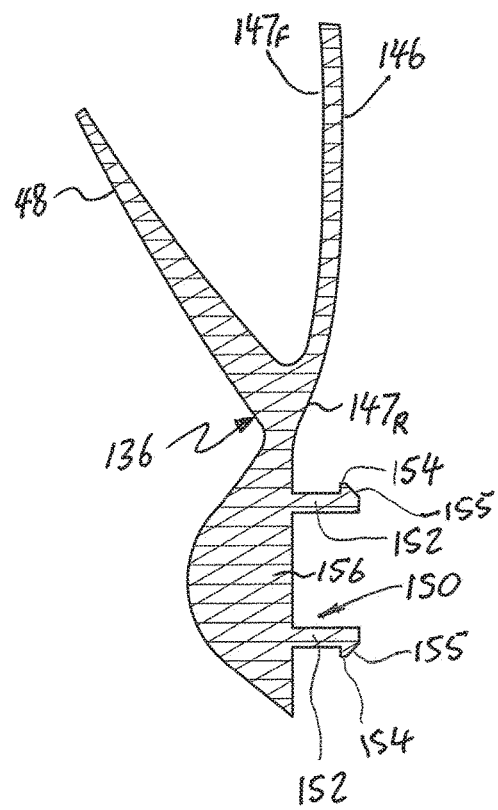
Fig. 16A
Fig. 16B

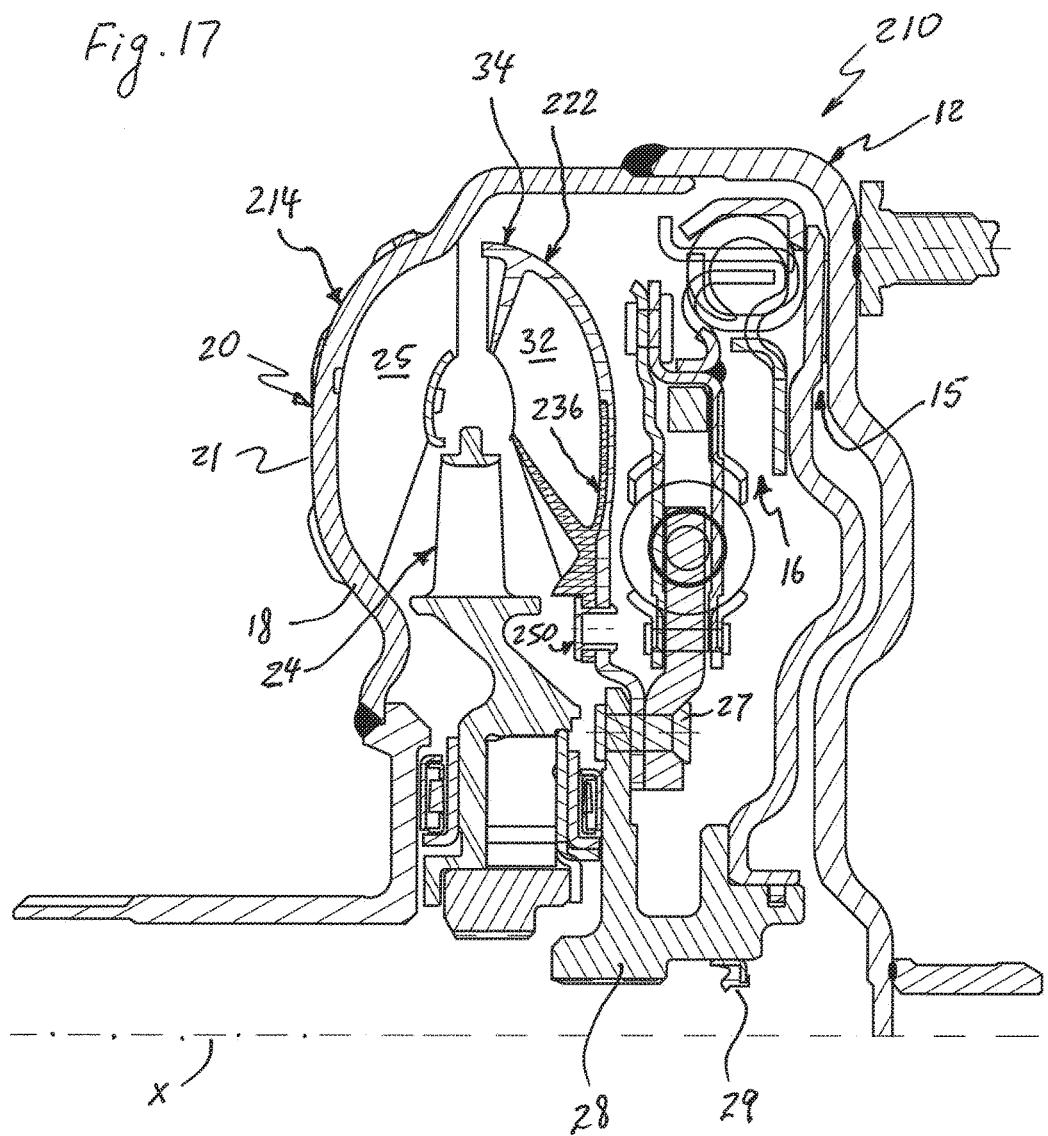

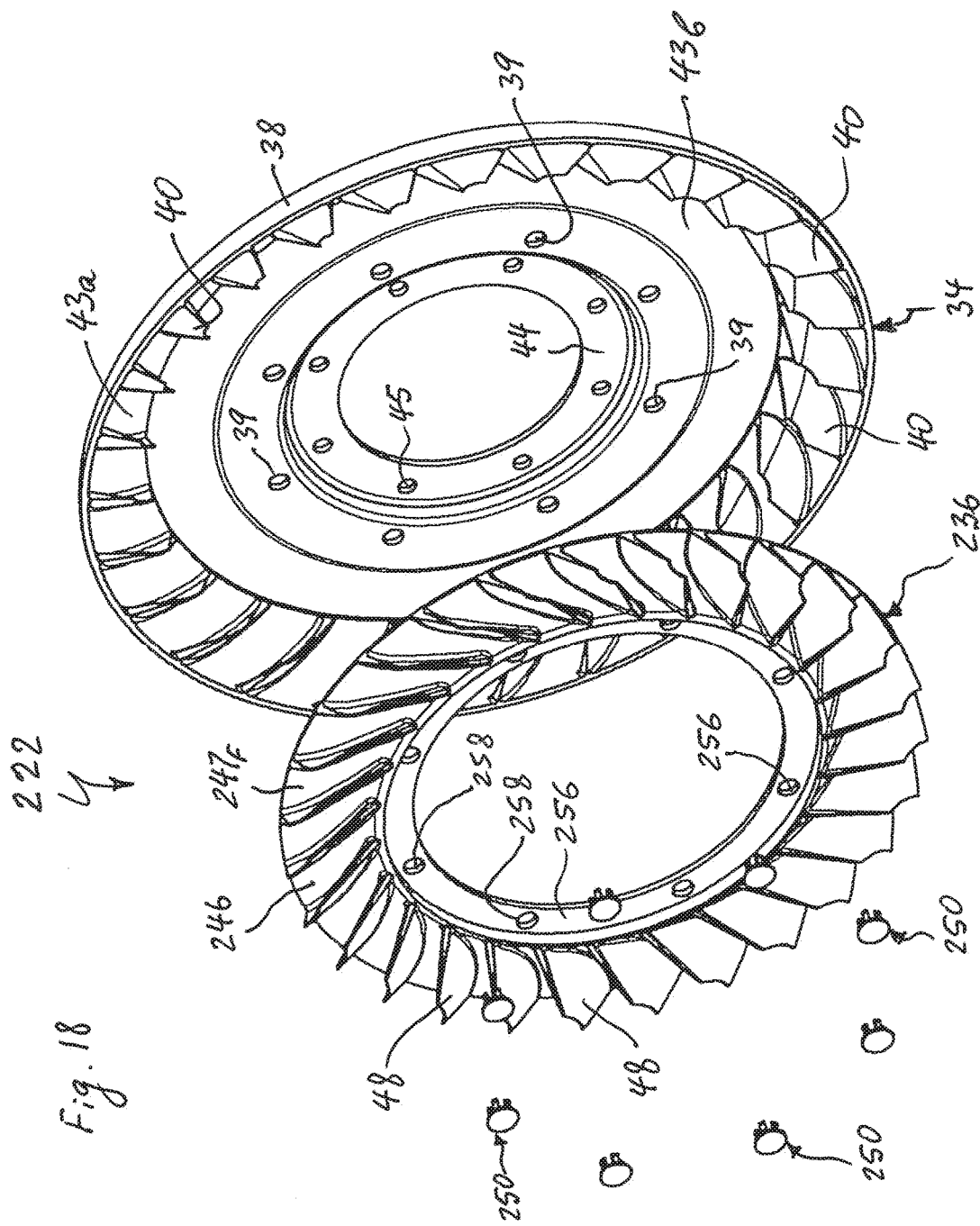

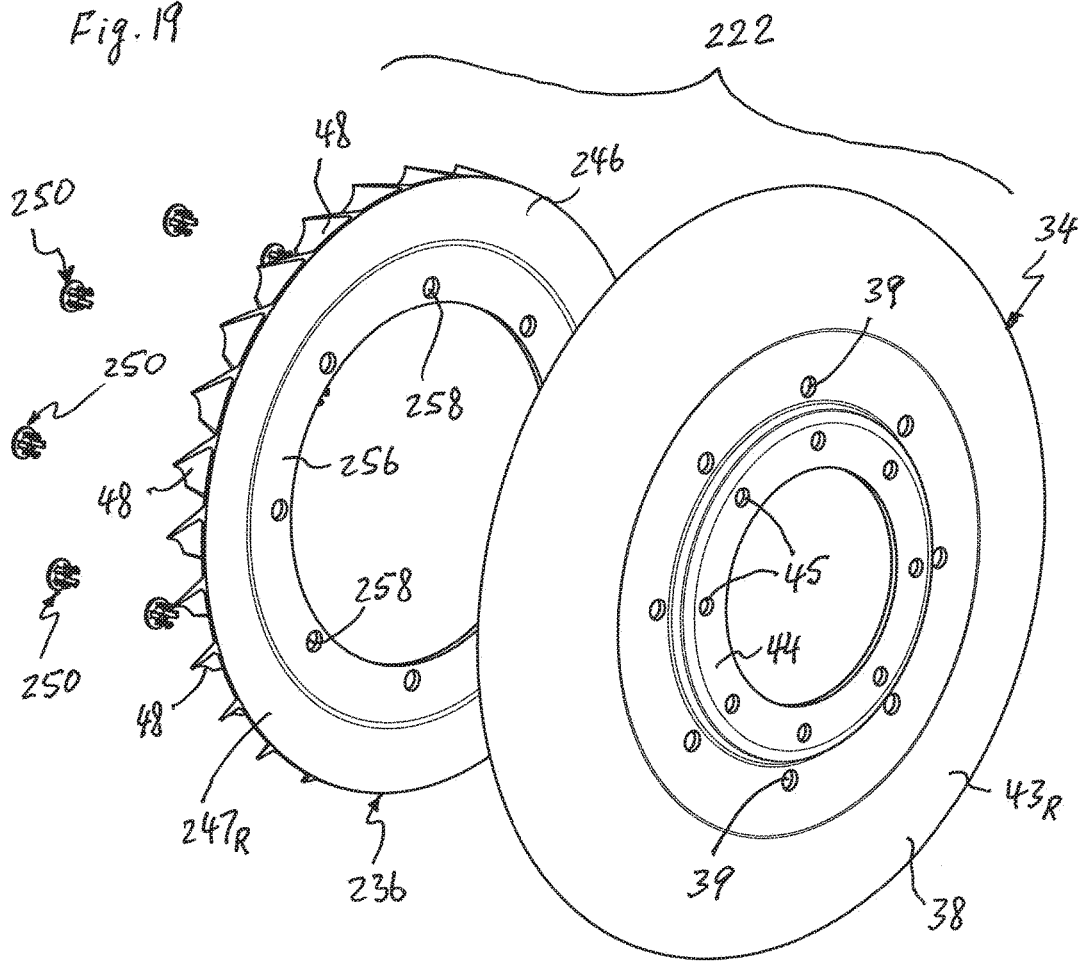
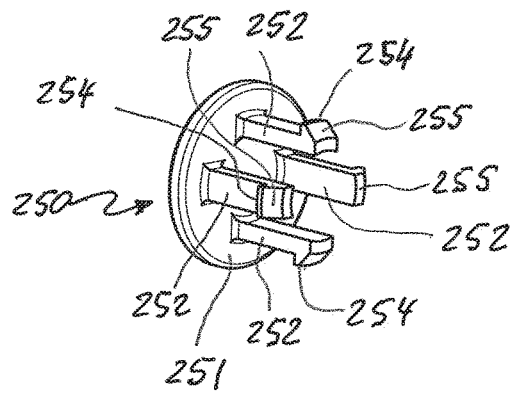

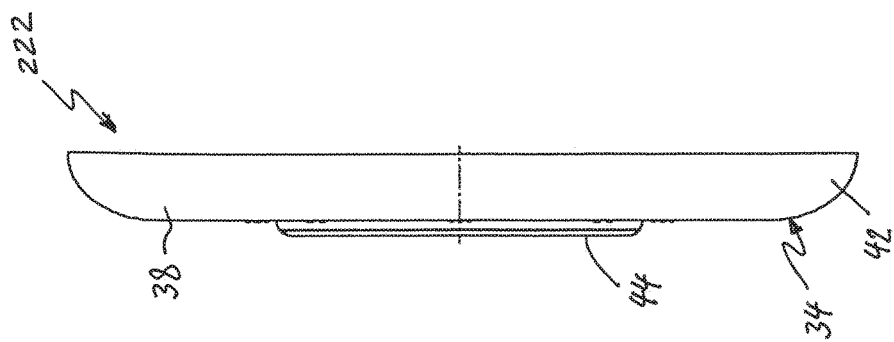
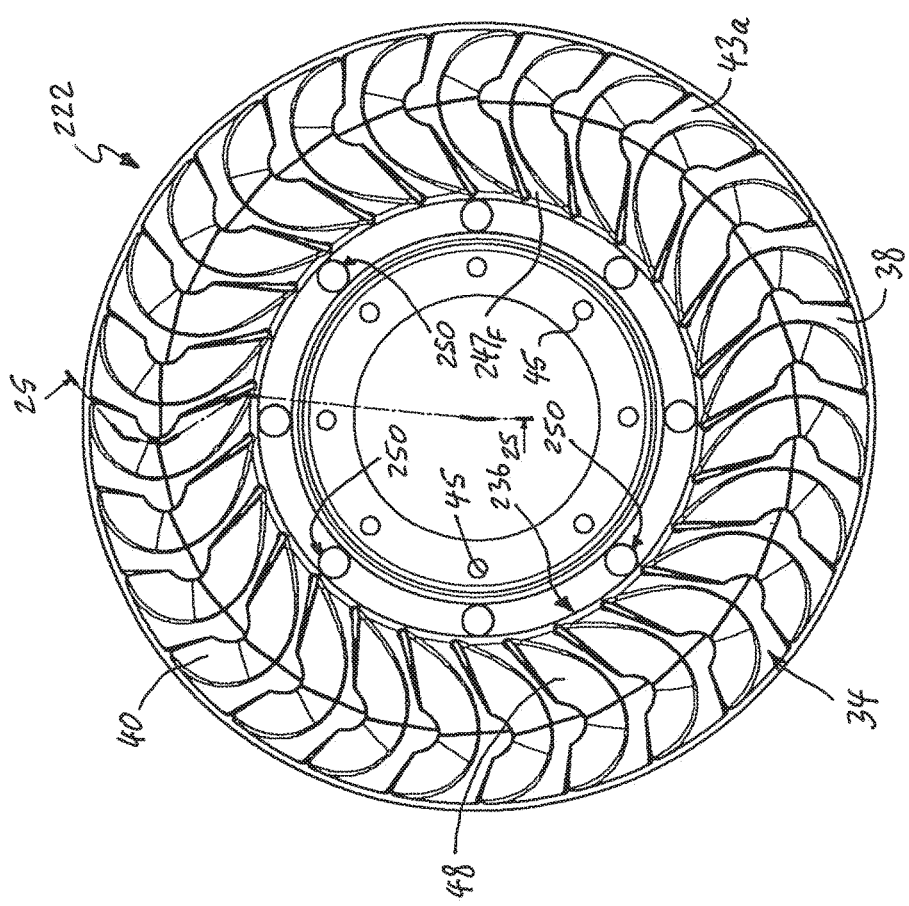

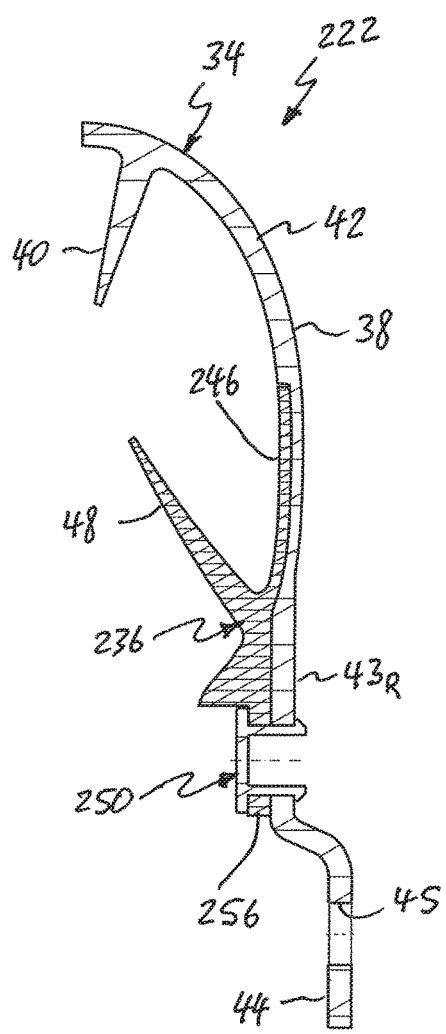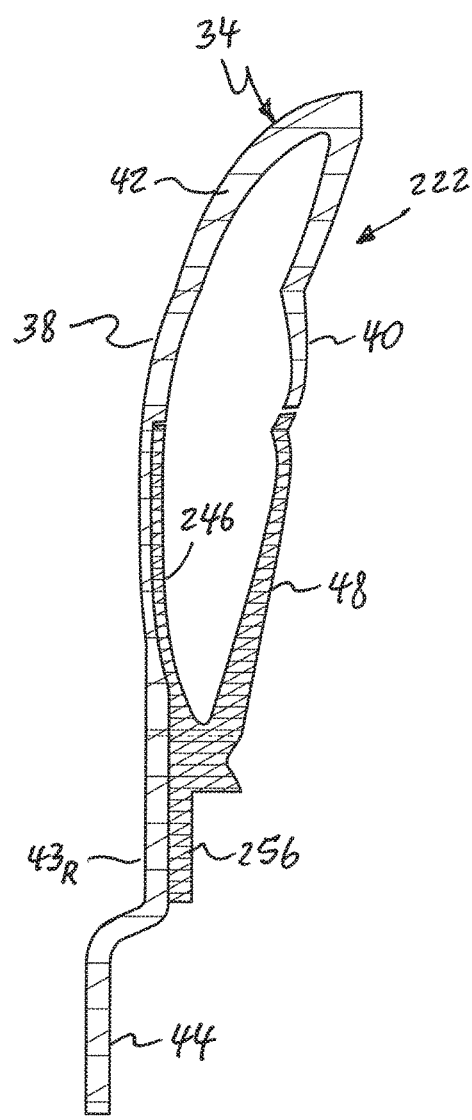

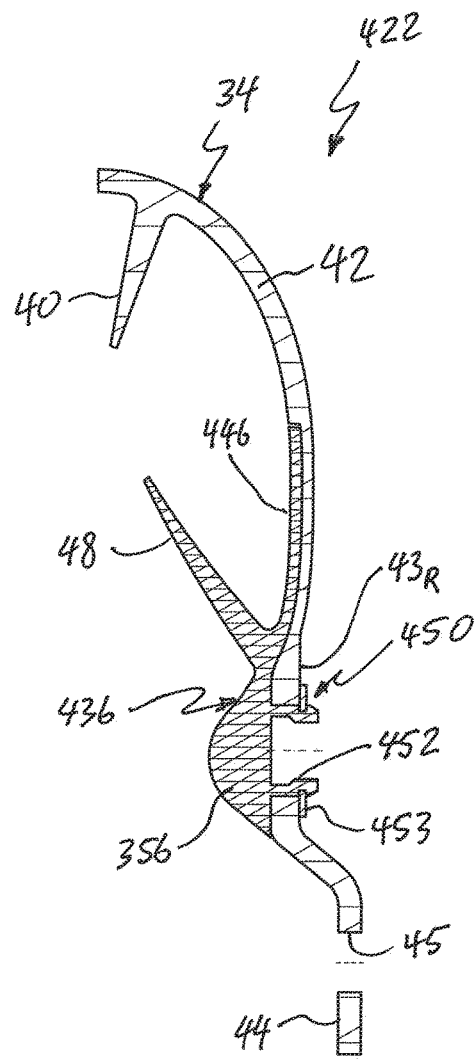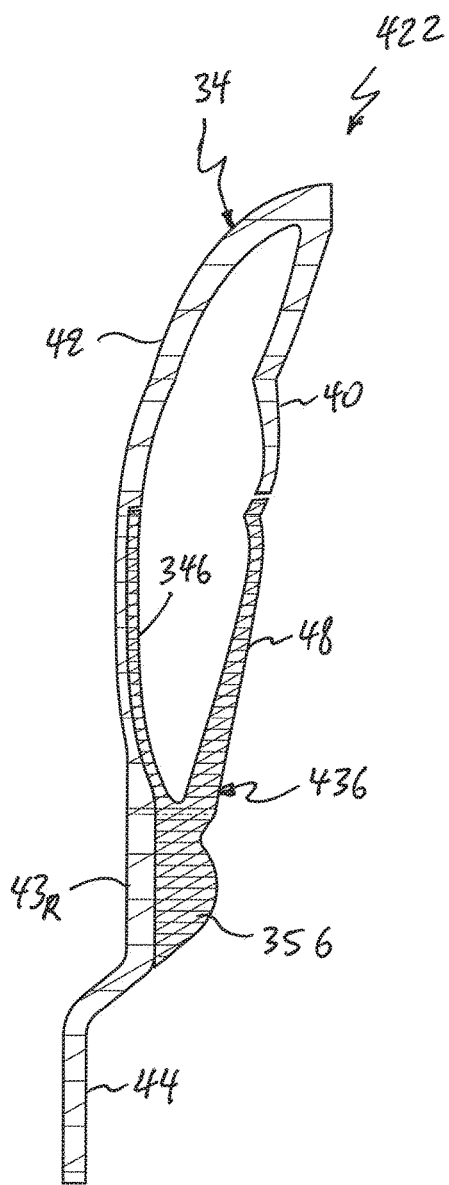
Fig. 40
Fig. 41

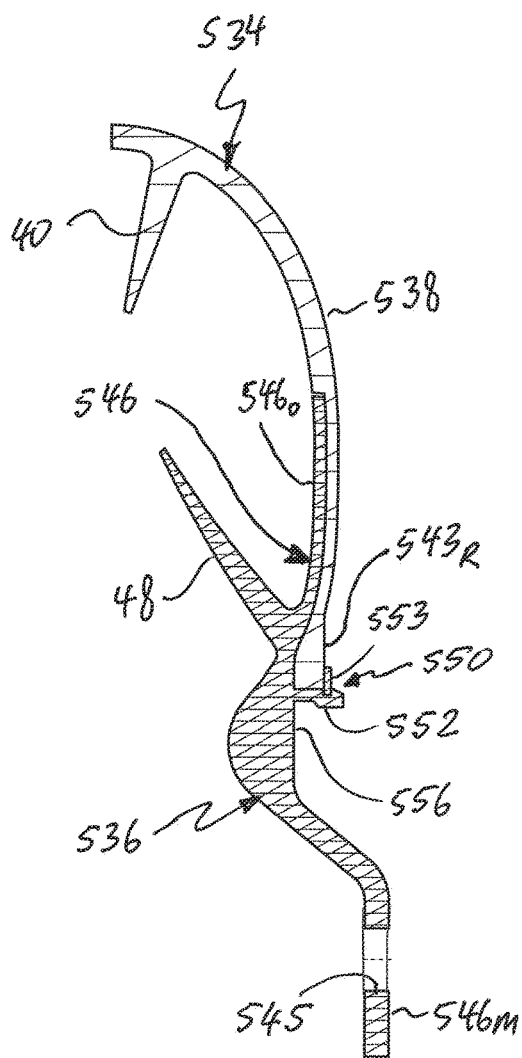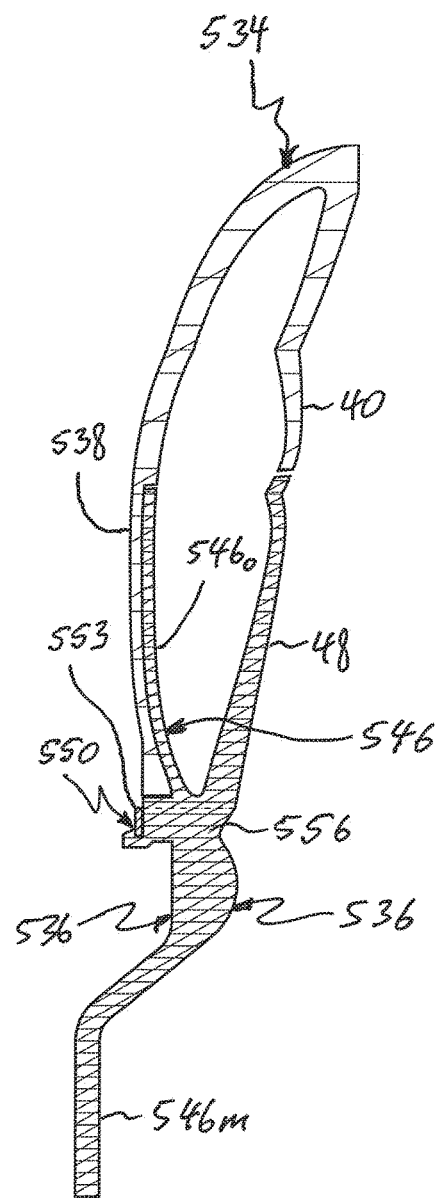

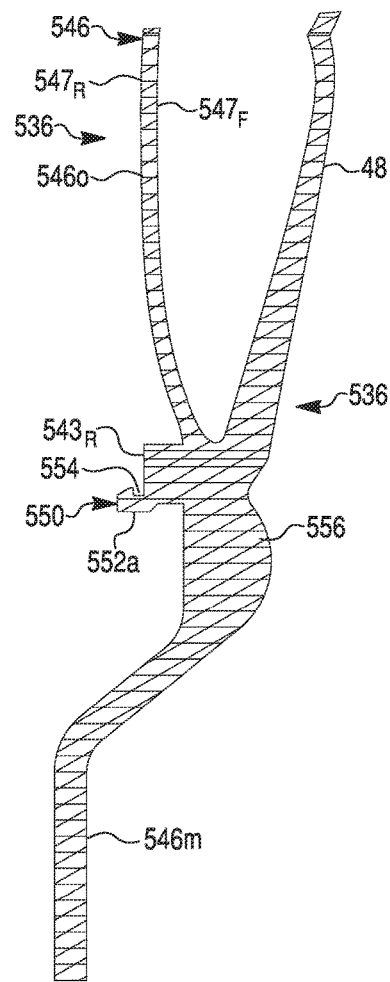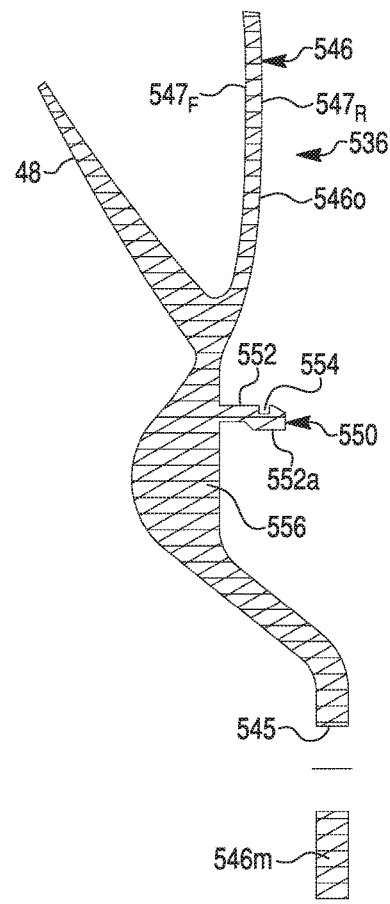

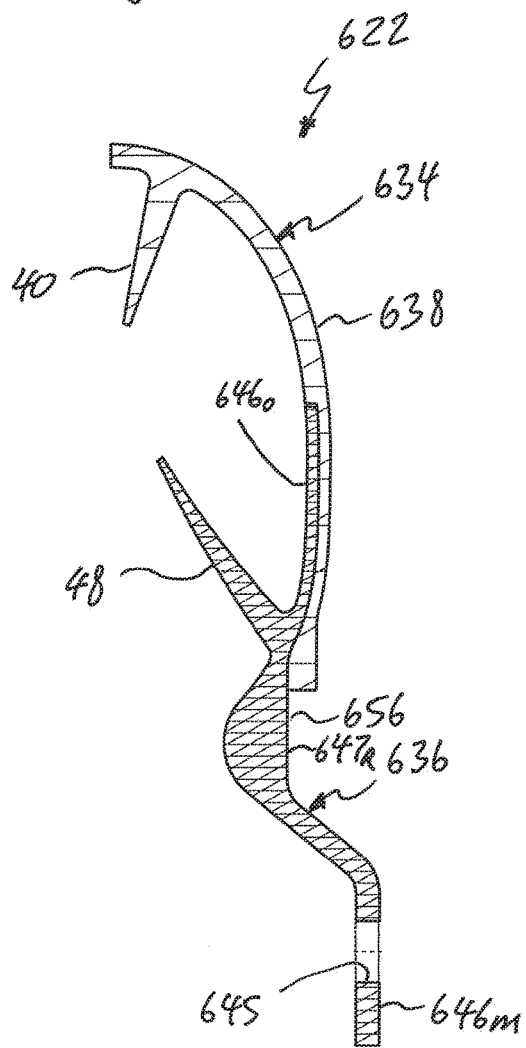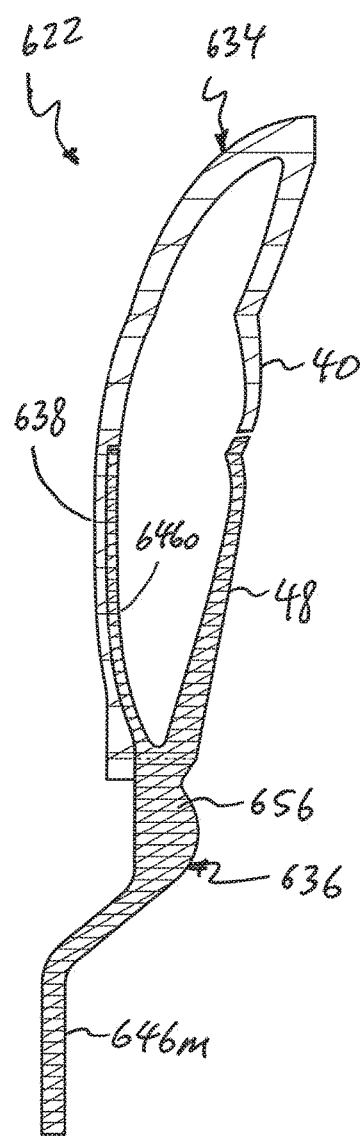

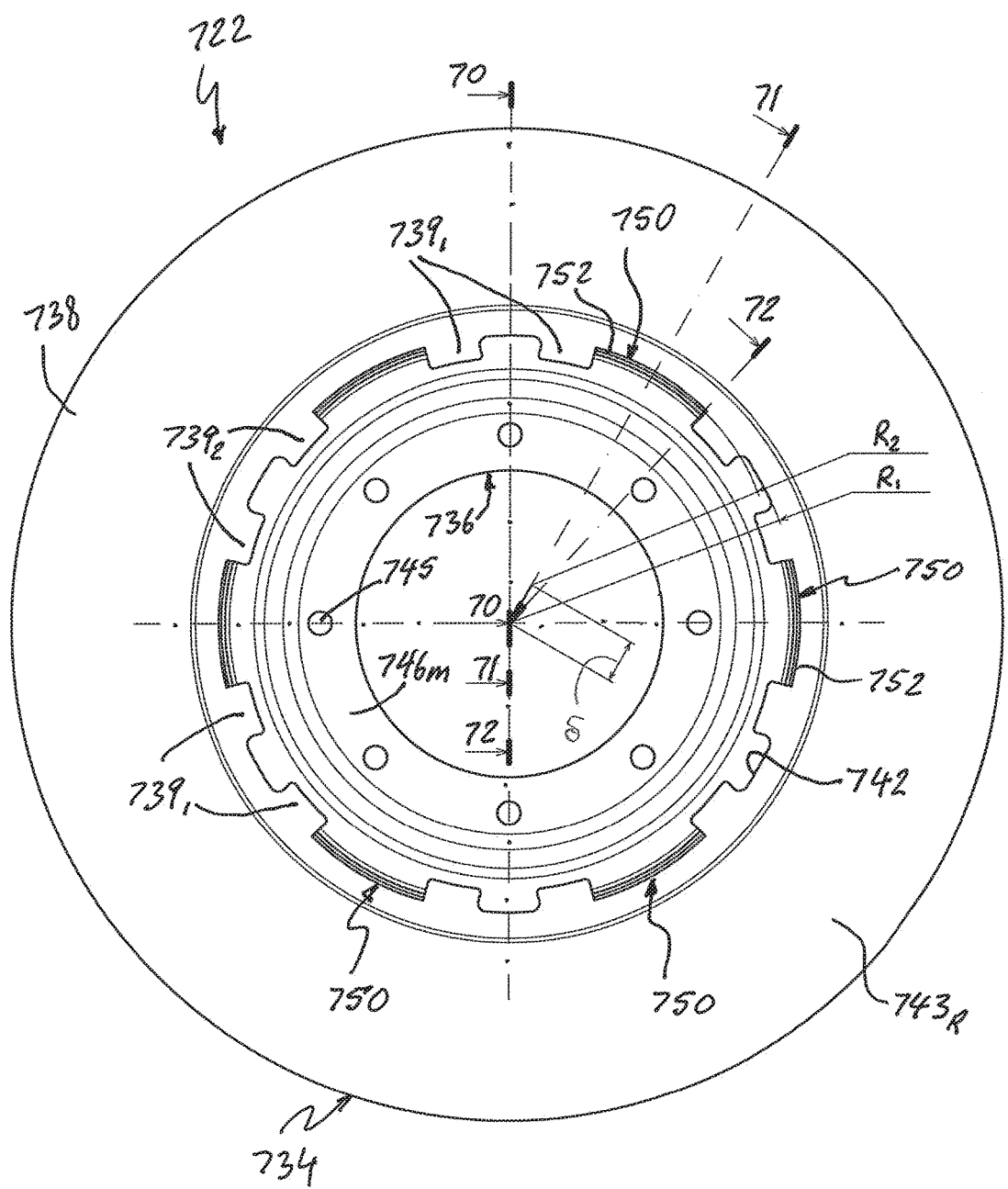

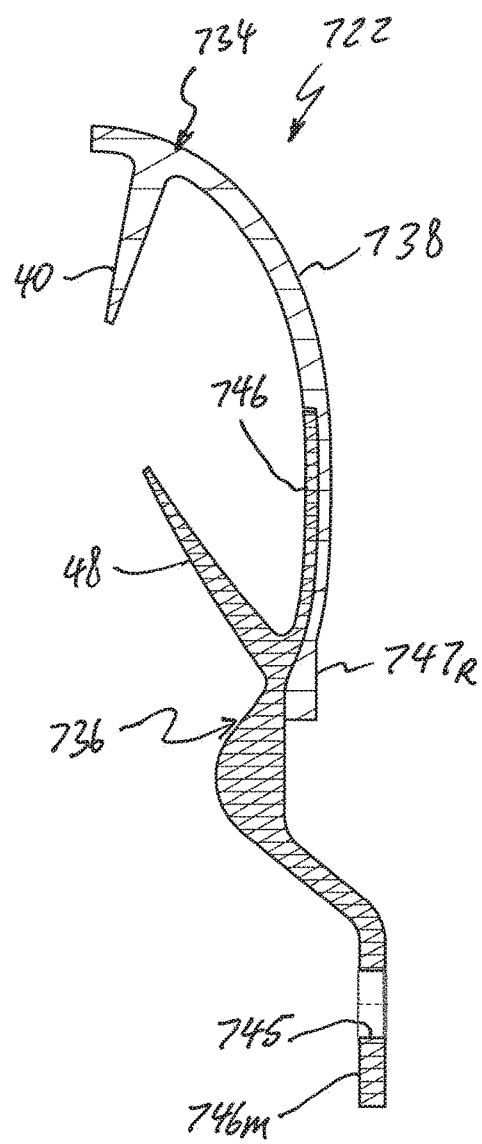
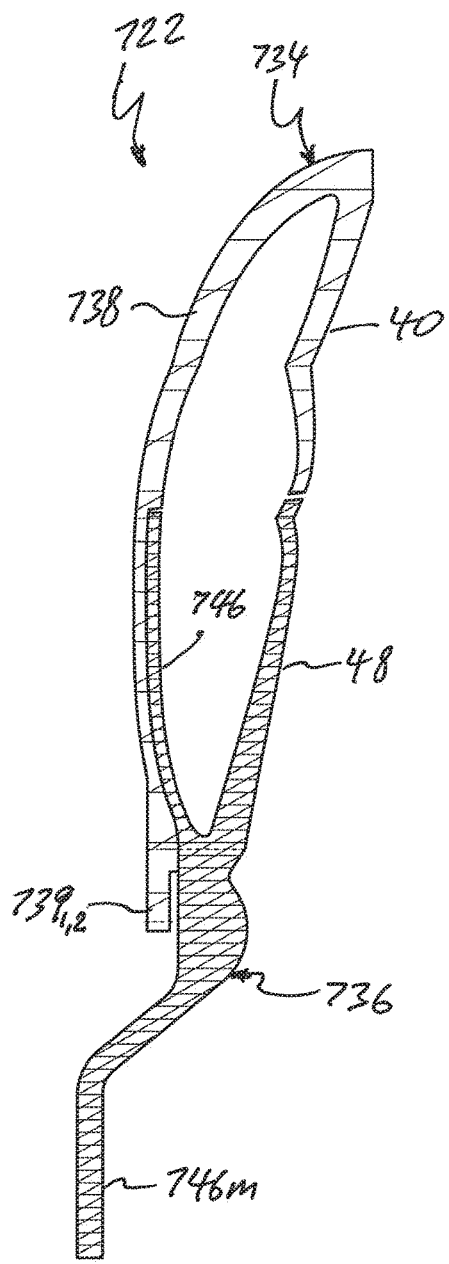
Fig. 70
Fig. 69

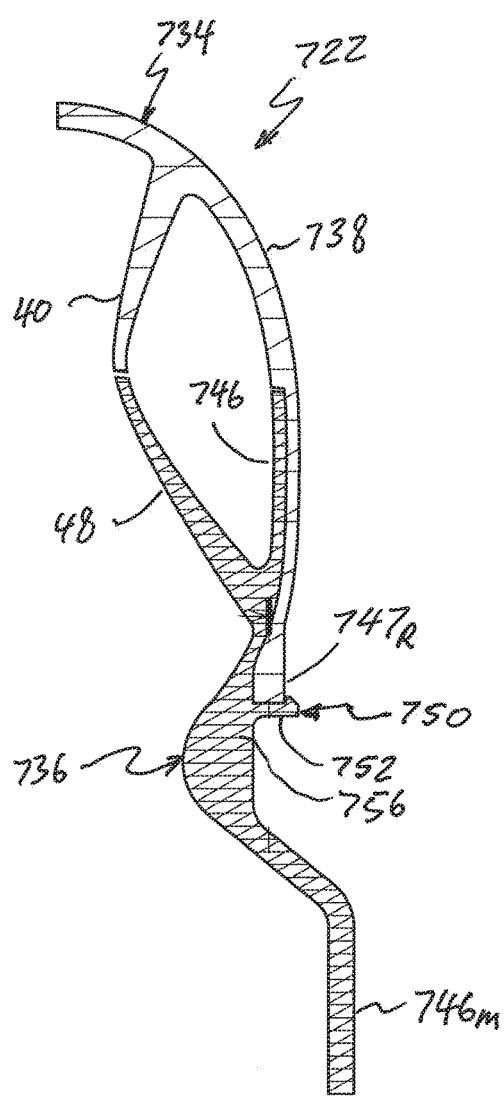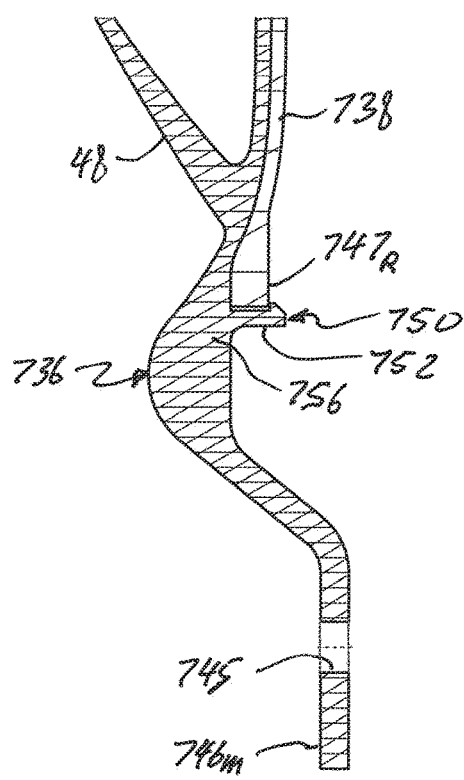

US 10,267,397 B2

TURBINE ASSEMBLY FOR HYDROKINETIC TORQUE CONVERTER, AND METHOD FOR MAKING THE SAME

BACKGROUND OF THE INVENTION

1. Field of the Invention

The present invention generally relates to fluid coupling devices, and more particularly to a turbine assembly for hydrokinetic torque converters, and a method for making the same.

2. Background of the Invention

Typically, a hydrokinetic torque converter includes an impeller assembly, a turbine assembly, a stator (or reactor) fixed to a casing of the torque converter, and a one-way clutch for restricting rotational direction of the stator to one direction. The turbine assembly is integrally or operatively connected with a hub linked in rotation to a driven shaft, which is itself linked to an input shaft of a transmission of a vehicle. The casing of the torque converter generally includes a front cover and an impeller shell which together define a fluid filled chamber. Impeller blades are fixed to an impeller shell within the fluid filled chamber to define the impeller assembly. The turbine assembly and the stator are also disposed within the chamber, with both the turbine assembly and the stator being relatively rotatable with respect to the front cover and the impeller shell. The turbine assembly includes a turbine shell with a plurality of turbine blades fixed to one side of the turbine shell facing the impeller blades of the impeller.

The turbine assembly works together with the impeller assembly, which is linked in rotation to the casing that is linked in rotation to a driving shaft driven by an internal combustion engine. The stator is interposed axially between the turbine assembly and the impeller assembly, and is mounted so as to rotate on the driven shaft with the interposition of the one-way clutch.

Conventionally, the turbine shell and the turbine blades are generally formed separately by stamping from steel blanks. The turbine shell is typically slotted to receive, through the slots, tabs formed on the turbine blades. After the turbine blades are located within the turbine shell, the tabs are bent or rolled over to form a mechanical attachment on the turbine shell that holds the turbine blades fixed in position.

Current hydrokinetic torque converters and methods for assembly thereof are quite complex, cumbersome and expensive. Therefore, while conventional hydrokinetic torque converters, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a turbine assembly for a hydrokinetic torque converter. The turbine assembly is rotatable about a rotational axis and comprises a first turbine component coaxial with the rotational axis, and a second turbine component non-moveably secured to the turbine component coaxially therewith. The first turbine component is formed separately from the second turbine component. The first turbine component has a plurality of first turbine blade members integrally formed therewith.

According to a second aspect of the present invention, there is provided a hydrokinetic torque converter, comprising an impeller assembly rotatable about a rotational axis, and a turbine assembly rotatable about the rotational axis and disposed axially opposite to the impeller assembly. The turbine assembly is coaxially aligned with and hydro-dynamically drivable by the impeller assembly. The impeller assembly includes an impeller shell and a plurality of impeller blades outwardly extending from the impeller shell. The turbine comprises a first turbine component coaxial with the rotational axis, and a second turbine component formed separately from and non-moveably secured to the turbine component coaxially therewith. The first turbine component has a plurality of first turbine blade members integrally formed therewith. The hydrokinetic torque converter further comprises a turbine hub rotatable about the rotational axis and non-moveably secured to one of the first turbine component and the second turbine component of the turbine assembly.

According to a third aspect of the present invention, there is provided a method for assembling a turbine assembly of a hydrokinetic torque converter. The method involves the steps of providing a first turbine component, providing a second turbine formed separately from the first turbine component, providing a plurality of fasteners each including at least one fastener arm, and non-moveably securing the second turbine component to the first turbine component by means of the fasteners such that the at least one fastener arm extending axially outward from the second turbine component through the first turbine component.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 3A is a rear partial exploded perspective view of the turbine assembly in accordance with the first exemplary embodiment of the present invention;

FIG. 4 is a front elevational view of the turbine assembly in accordance with the first exemplary embodiment of the present invention;

FIG. 5 is a side elevational view of the turbine assembly in accordance with the first exemplary embodiment of the present invention;

FIG. 7B is a partial sectional view of a first turbine component of the turbine assembly taken along the line 7-7 in FIG. 4;

FIG. 8B is a partial sectional view of the first turbine component of the turbine assembly taken along the line 8-8 in FIG. 6;

FIG. 9 is a fragmented half-view in axial section of a hydrokinetic torque coupling device with a turbine assembly in accordance with a second exemplary embodiment of the present invention;

FIG. 10 is a front partial exploded perspective view of the turbine assembly in accordance with the second exemplary embodiment of the present invention;

FIG. 12 is a front elevational view of the turbine assembly in accordance with the second exemplary embodiment of the present invention;

FIG. 13 is a side elevational view of the turbine assembly in accordance with the second exemplary embodiment of the present invention;

FIG. 15 is a partial sectional view the turbine assembly taken along the line 15-15 in FIG. 12;

FIG. 16A is a partial sectional view of the turbine assembly taken along the line 16-16 in FIG. 14;

FIG. 16B is a partial sectional view of a second turbine component of the turbine assembly only taken along the line 16-16 in FIG. 14;

FIG. 17 is a fragmented half-view in axial section of a hydrokinetic torque coupling device with a turbine assembly in accordance with a third exemplary embodiment of the present invention;

FIG. 18 is a front partial exploded perspective view of the turbine assembly in accordance with the third exemplary embodiment of the present invention;

FIG. 19 is a rear partial exploded perspective view of the turbine assembly in accordance with the third exemplary embodiment of the present invention;

FIG. 20 is a perspective view of a snap fastener of the turbine assembly in accordance with the third exemplary embodiment of the present invention;

FIG. 21 is a front elevational view of the turbine assembly in accordance with the third exemplary embodiment of the present invention;

FIG. 22 is a side elevational view of the turbine assembly in accordance with the third exemplary embodiment of the present invention;

FIG. 24 is a partial sectional view the turbine assembly taken along the line 24-24 in FIG. 23;

FIG. 25 is a partial sectional view of the turbine assembly taken along the line 25-25 in FIG. 21;

FIG. 40 is a partial sectional view the turbine assembly taken along the line 40-40 in FIG. 39;

FIG. 41 is a partial sectional view the turbine assembly taken along the line 41-41 in FIG. 37;

FIG. 48 is a partial sectional view the turbine assembly taken along the line 48-48 in FIG. 46;

FIG. 49 is a partial sectional view the turbine assembly taken along the line 49-49 in FIG. 47;

FIG. 50 is a partial sectional view of the second turbine component only of the turbine assembly taken along the line 48-48 in FIG. 46;

FIG. 51 is a partial sectional view of the second turbine component only of the turbine assembly taken along the line 49-49 in FIG. 47;

FIG. 59 is a partial sectional view the turbine assembly taken along the line 59-59 in FIG. 57;

FIG. 60 is a partial sectional view the turbine assembly taken along the line 60-60 in FIG. 58;

FIG. 68 is a rear elevational view of the turbine assembly in accordance with the eighth exemplary embodiment of the present invention;

FIG. 69 is a partial sectional view the turbine assembly taken along the line 69-69 in FIG. 67;

FIG. 70 is a partial sectional view the turbine assembly taken along the line 70-70 in FIG. 68;

FIG. 71 is a partial sectional view the turbine assembly taken along the line 71-71 in FIG. 68; and FIG. 72 is a partial sectional view the turbine assembly taken along the line 72-72 in FIG. 68.

Figure 1:
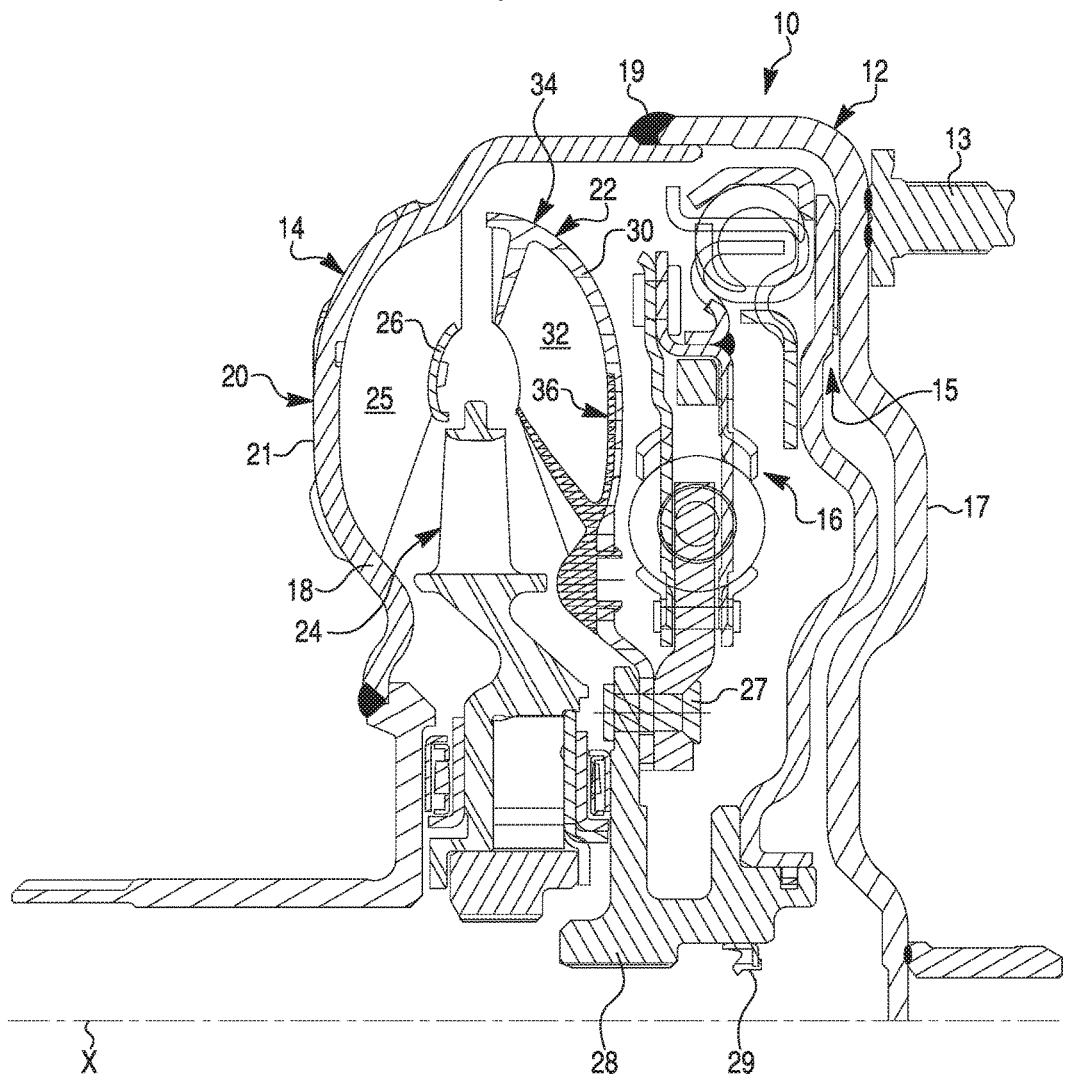
FIG. 1 is a fragmented half-view in axial section of a hydrokinetic torque coupling device with a turbine assembly in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

A first exemplary embodiment of a hydrokinetic torque coupling device is generally represented in FIG. 1 by reference numeral 10. The hydrokinetic torque coupling device 10 is intended to couple driving and driven shafts, for example in a motor vehicle. In this case, the driving shaft is an output shaft of an internal combustion engine (not shown) of the motor vehicle and the driven shaft is connected to an automatic transmission (not shown) of the motor vehicle.

The hydrokinetic torque coupling device 10 comprises a sealed casing 12 filled with a fluid, such as oil or transmission fluid, and rotatable about a rotational axis X of rotation, a hydrokinetic torque converter 14 disposed in the casing 12, a lock-up clutch 15 and a torsional vibration damper (also referred to herein as a damper assembly) 16 also disposed in the casing 12. The torsional vibration damper assembly 16 is mounted to the torque converter 14. The sealed casing 12, the torque converter 14, the lock-up clutch 15 and the torsional vibration damper 16 are all rotatable about the rotational axis X. The drawings discussed herein show half-views, that is, a cross-section of the portion or fragment of the hydrokinetic torque coupling device 10 above rotational axis X. As is known in the art, the device 10 is symmetrical about the rotational axis X. Hereinafter the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 17, and a second casing shell 18 disposed coaxially with and axially opposite to the first casing shell 17. The first and second casing shells 17, 18 are non-movably (i.e., fixedly) interconnected and sealed together about their outer peripheries, such as by weld 19. The second casing shell 18 is non-movably (i.e., fixedly) connected to the driving shaft, more typically to a flywheel (not shown) that is non-rotatably fixed to the driving shaft, so that the casing 12 turns at the same speed at which the engine operates for transmitting torque. Specifically, in the illustrated embodiment of FIG. 1 the casing 12 is rotatably driven by the internal combustion engine and is non-rotatably coupled to the flywheel thereof, such as with studs 13. As shown in FIG. 1, the studs 13 are fixedly secured, such as by welding, to the first casing shell 17. Each of the first and second casing shells 17, 18 are integral or one-piece and may be made, for example, by press-forming one-piece metal sheets.

The torque converter 14 comprises an impeller assembly (sometimes referred to as the pump or impeller wheel) 20, a turbine assembly (sometimes referred to as the turbine wheel) 22, and a stator assembly (sometimes referred to as the reactor) 24 interposed axially between the impeller assembly 20 and the turbine assembly 22. The impeller assembly 20, the turbine assembly 22, and the stator assembly 24 are coaxially aligned with one another and the rotational axis X. The impeller assembly 20, the turbine assembly 22, and the stator assembly 24 collectively form a torus. The impeller assembly 20 and the turbine assembly 22 may be fluidly coupled to one another in operation as known in the art. The torque coupling device 10 also includes a substantially annular turbine (or output) hub 28 (as best shown in FIG. 1) rotatable about the rotational axis X, which is arranged to non-rotatably couple together the driven shaft and the turbine assembly 22. A sealing member 29, mounted to a radially inner peripheral surface of the turbine hub 28, creates a seal at the interface of the transmission input shaft and the turbine hub 28.

The impeller assembly 20 includes a substantially annular, semi-toroidal (or concave) impeller shell 21, a substantially annular impeller core ring 26, and a plurality of impeller blades 25 fixedly (i.e., non-moveably) attached, such as by brazing, to the impeller shell 21 and the impeller core ring 26. Thus, a portion of the second casing shell 18 of the casing 12 also forms and serves as the impeller shell 21 of the impeller assembly 20. Accordingly, the impeller shell 21 sometimes is referred to as part of the casing 12. The impeller assembly 20, including the impeller shell 21, the impeller core ring 26 and the impeller blades 25, is non-rotatably secured to the first casing shell 18 and hence to the drive shaft (or flywheel) of the engine to rotate at the same speed as the engine output.

The turbine assembly 22, as best shown in FIGS. 1-4, comprises a substantially annular, semi-toroidal (or concave) turbine shell 30 rotatable about the rotational axis X, and a plurality of turbine blades 32 fixedly (i.e., non-moveably) secured to the turbine shell 30 and outwardly extending from the turbine shell 30 so as to face the impeller blades 25 of the impeller assembly 20. The turbine shell 30 of the turbine assembly 22 is non-movably (i.e., fixedly) secured to the turbine hub 28 by appropriate means, such as by rivets 27 or welding.

Furthermore, the turbine assembly 22 comprises a first turbine component 34 rotatable about the rotational axis X, and a second turbine component 36 formed separately from and non-moveably secured to the first turbine component 34 coaxially therewith, as best shown in FIGS. 2-4, 7 and 8. As illustrated in FIGS. 2-4, 7A and 8A, the first turbine component 34 includes a substantially annular first turbine shell member 38 and a plurality of first turbine blade members 40 integrally formed therewith and outwardly extending from the first turbine shell member 38 so as to face the impeller blades 25 of the impeller assembly 20. Preferably, the first turbine shell member 38 and the first turbine blade members 40 are made of a single or unitary (i.e., one-piece) component, but may be separate components fixedly (i.e., non-moveably) connected together. The first turbine shell member 38 has a substantially semi-toroidal radially outer portion 42 and a substantially annular mounting portion 44 located radially within the radially outer portion 42 of the first turbine shell member 38. The mounting portion 44 of the first turbine shell member 38 is provided with a plurality of equiangularly circumferentially spaced holes 45. The first turbine shell member 38 is fixedly secured to the turbine hub 28 by the rivets 27 extending through the holes 45 in the mounting portion 44 of the first turbine shell member 38.

Figure 2:
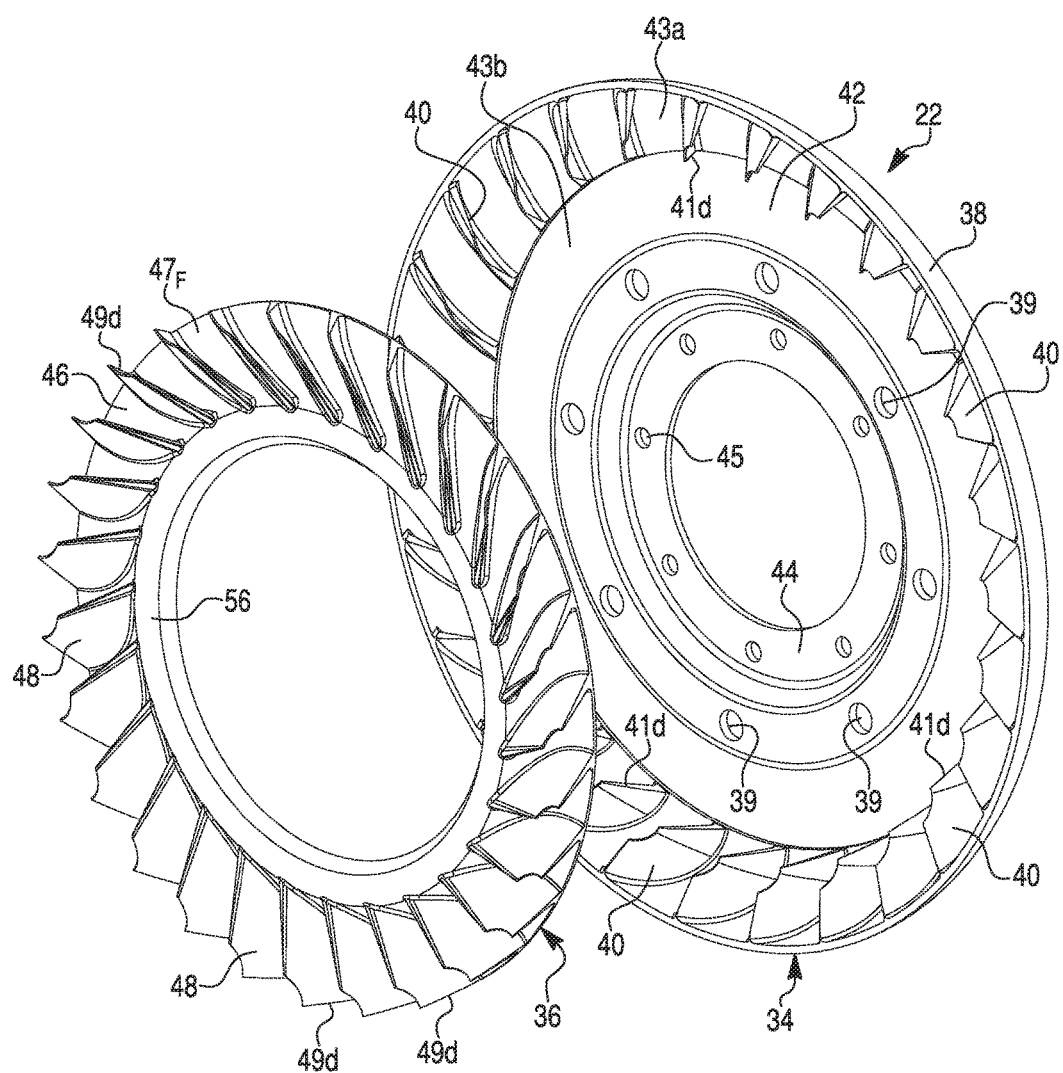
FIG. 2 is a front partial exploded perspective view of the turbine assembly in accordance with the first exemplary embodiment of the present invention.

The radially outer portion 42 of the first turbine shell member 38 has a substantially annular, semi-toroidal (i.e., concave) inner surface 43a and a substantially annular support surface 43b located radially within the inner surface 43a of the radially outer portion 42 of the first turbine shell member 38. Both the inner surface 43a and the support surface 43b of the radially outer portion 42 of the first turbine shell member 38 face the impeller assembly 20. As best shown in FIG. 2, the turbine blade members 40 are integrally formed on and outwardly extend from the inner surface 43a of the radially outer portion 42 of the first turbine shell member 38 of the first turbine component 34 of the turbine assembly 22. The radially outer portion 42 of the first turbine shell member 38 is also provided with a plurality of equiangularly circumferentially spaced holes 39, as best shown in FIGS. 2 and 3.

As further illustrated in FIGS. 2-4, 7 and 8, the second turbine component 36 is formed separately from the first turbine component 34 and includes a substantially annular second turbine shell member 46, and a plurality of second turbine blade members 48 integrally formed therewith and outwardly extending from an annular, substantially semi-toroidal (i.e., concave) inner surface $47_F$ of the second turbine shell member 46 so as to face the impeller blades 25 of the impeller assembly 20. Preferably, the second turbine shell member 46 and the second turbine blade members 48 are made of a single or unitary (i.e., one-piece) component, but may be separate components fixedly (i.e., non-moveably) connected together.

An annular outer surface $47_R$ of the second turbine shell member 46 of the second turbine component 36 non-moveably engages the support surface 43b of the radially outer portion 42 the first turbine component 34 by appropriate means known in the art, such as adhesive bonding, friction welding, snap-on connection, etc. In other words, the second turbine shell member 46 of the second turbine component 36 overlaps the first turbine shell member 38 of the first turbine component 34. The second turbine shell member 46 of the second turbine component 36 non-moveably engages the first turbine shell member 38 of the first turbine component 34 so as to define together the turbine shell 30 of the turbine assembly 22. An annular rear surface $43_R$ of the first turbine shell member 38 faces away from the annular outer surface $47_R$ of the second turbine shell member 46 of the second turbine component 36.

Figure 7A:
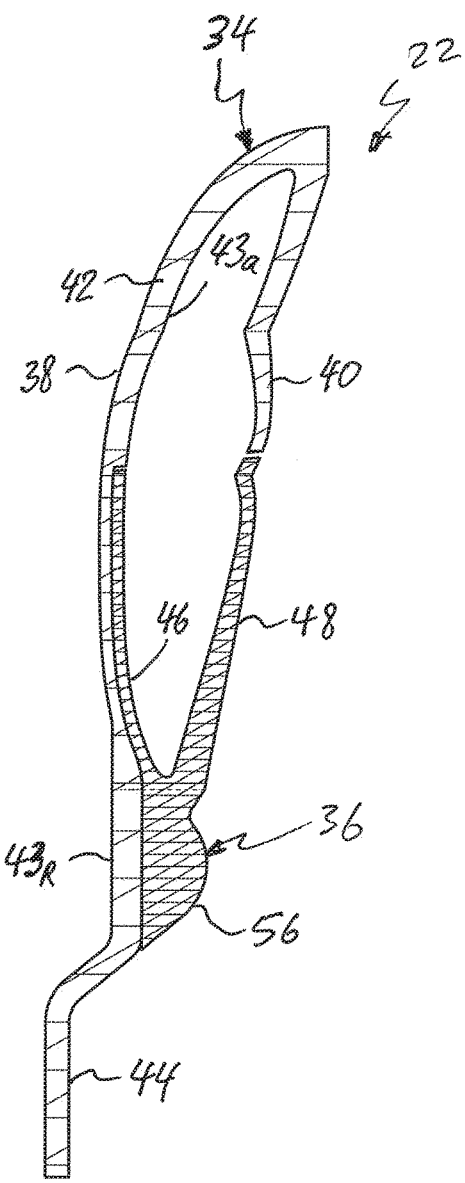
FIG. 7A is a partial sectional view the turbine assembly taken along the line 7-7 in FIG. 4.

The first turbine component 34 and the second turbine component 36 are formed separately, and then non-moveably, coaxially assembled together so as to form the turbine assembly 22. As best illustrated in FIGS. 4 and 7A, each of the first turbine blade members 40 is oriented adjacent to one of the second turbine blade members 48 so as to define together the turbine blade 32 of the turbine assembly 22. Specifically, radially inner distal ends 41d of the first turbine blade members 40 are disposed adjacent to or engaged with radially outer distal ends 49d of the second turbine blade members 48. Also, the second turbine shell member 46 of the second turbine component 36 non-moveably engages the first turbine shell member 38 of the first turbine component 34 so as to define together the turbine shell 30 of the turbine assembly 22.

According to the present invention, the first and second turbine components 34 and 36, respectively, are made by casting in aluminum or magnesium alloys or by molding in a thermoplastic or thermosetting plastic materials, or they may be formed by plastic deformation of a metallic material such as sheet steel. Preferably, the first turbine component 34 is made by casting of an aluminum or magnesium alloy, while the second turbine component 36 is made by injection molding of a thermoplastic polymer, such as a polyetheretherketone (PEEK) thermoplastic polymer, a polytetrafluoroethylene (PTFE) based material, or a thermosetting polymer. PEEK polymer provides fatigue and chemical resistance, can operate at high temperatures and retains outstanding mechanical properties at continuous-use temperatures up to 240° C. (464° F.), allowing it to replace metal even in the most severe end-use environments. Glass fiber-reinforced and carbon fiber-reinforced grades of PEEK provide a wide range of performance options. For example, the second turbine component 36 made be made of a glass fiber and carbon fiber reinforced PEEK, such as the KetaSpire® KT-880 CF30 polyetheretherketone, which is a high flow, 30% carbon fiber reinforced grade of polyetheretherketone. In other words, the first turbine component 34 and the second turbine component 36 could be made of the same or different materials having different mechanical characteristics, such as a specific strength, specific weight, density, modulus of elasticity, etc.

Figure 7C:
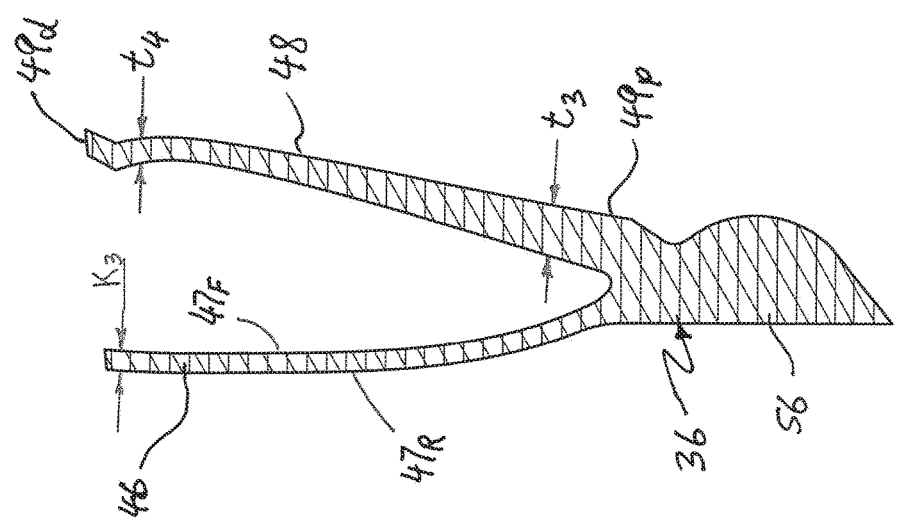
FIG. 7C is a partial sectional view of a second turbine component of the turbine assembly taken along the line 7-7 in FIG. 4.

Moreover, as best shown in FIGS. 7B and 7C, the first turbine component 34 and the second turbine component 36 have a variable thickness. In fact, both the first turbine shell member 38 and the first turbine blade members 40 of the first turbine component 34 have a variable thickness, as best shown in FIGS. 7B and 8B. Similarly, both the second turbine shell member 46 and the second turbine blade members 48 of the second turbine component 36 have a variable thickness, as best shown in FIGS. 7B and 7C. For instance, an axial thickness $k_1$ of the radially outer portion 42 of the first turbine shell member 38 in a region of the inner surface 43a is larger than an axial thickness $k_2$ of the radially outer portion 42 of the first turbine shell member 38 in a region of the support surface 43b, as best shown in FIG. 7B.

Furthermore, as best illustrated in FIG. 7B, the axial thickness $k_1$ of the radially outer portion 42 of the first turbine shell member 38 in the region of the inner surface 43a substantially equals the sum of the axial thickness $k_2$ of the radially outer portion 42 in the region of the support surface 43b and an axial thickness $k_3$ of the second turbine shell member 46 (shown in FIG. 7C). Also, an axial thickness $t_1$ of a radially outer proximal end 41p of the first turbine blade members 40 is larger than an axial thickness $t_2$ of the radially inner distal ends 41d of the first turbine blade members 40, as best shown in FIG. 7B. Similarly, an axial thickness $t_3$ of a radially inner proximal end 49p of the second turbine blade members 48 is larger than an axial thickness $t_4$ of the radially outer distal ends 49d of the second turbine blade members 48, as best shown in FIG. 7C.

Accordingly, the molded turbine assembly 22 can have variation in thickness, and be formed in a very particular form and shape. Also, the molded turbine assembly can have reinforcing ribs. Thus, with the molded turbine assembly of the present invention there is a possibility for mass optimization by putting the thickness where it is needed for strength and reducing the thickness where it is not needed, where stress and deformation are low.

The second turbine component 36 further includes a plurality of circumferentially (or angularly) spaced snap fasteners 50, as best shown in FIGS. 3, 6, 8A and 8C. The snap fasteners 50 are configured to axially extend through the holes 39 in the radially outer portion 42 of the first turbine shell member 38 in order to fixedly (i.e., non-moveably) secured the second turbine shell member 46 to the first turbine shell member 38.

Figure 3B:
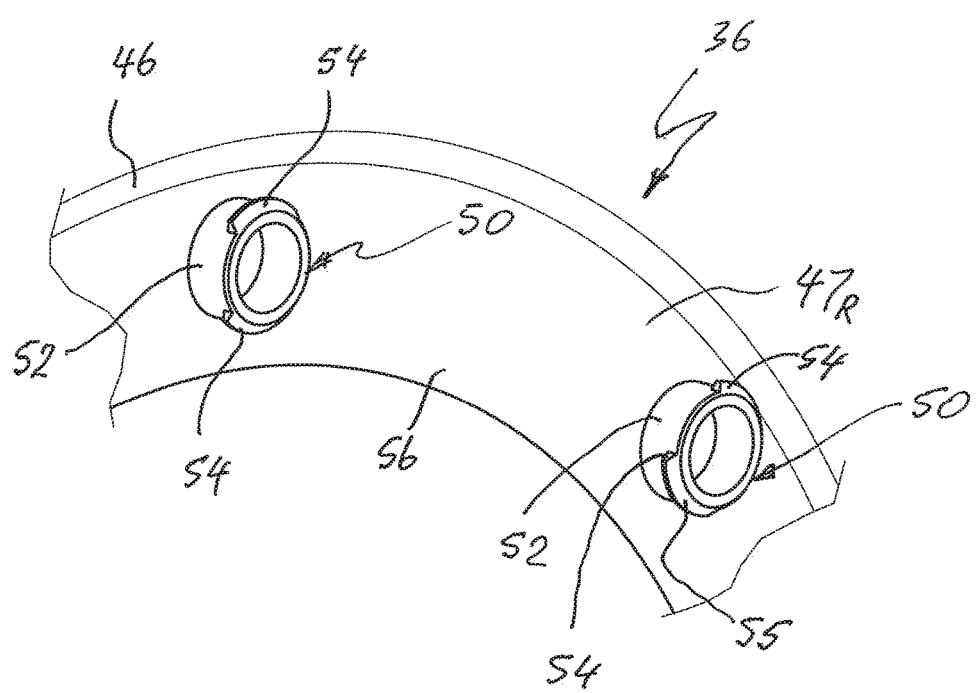
FIG. 3B is an enlarged view of a fragment of the turbine assembly shown in the circle "3B" of FIG. 3A.
Figure 6A:
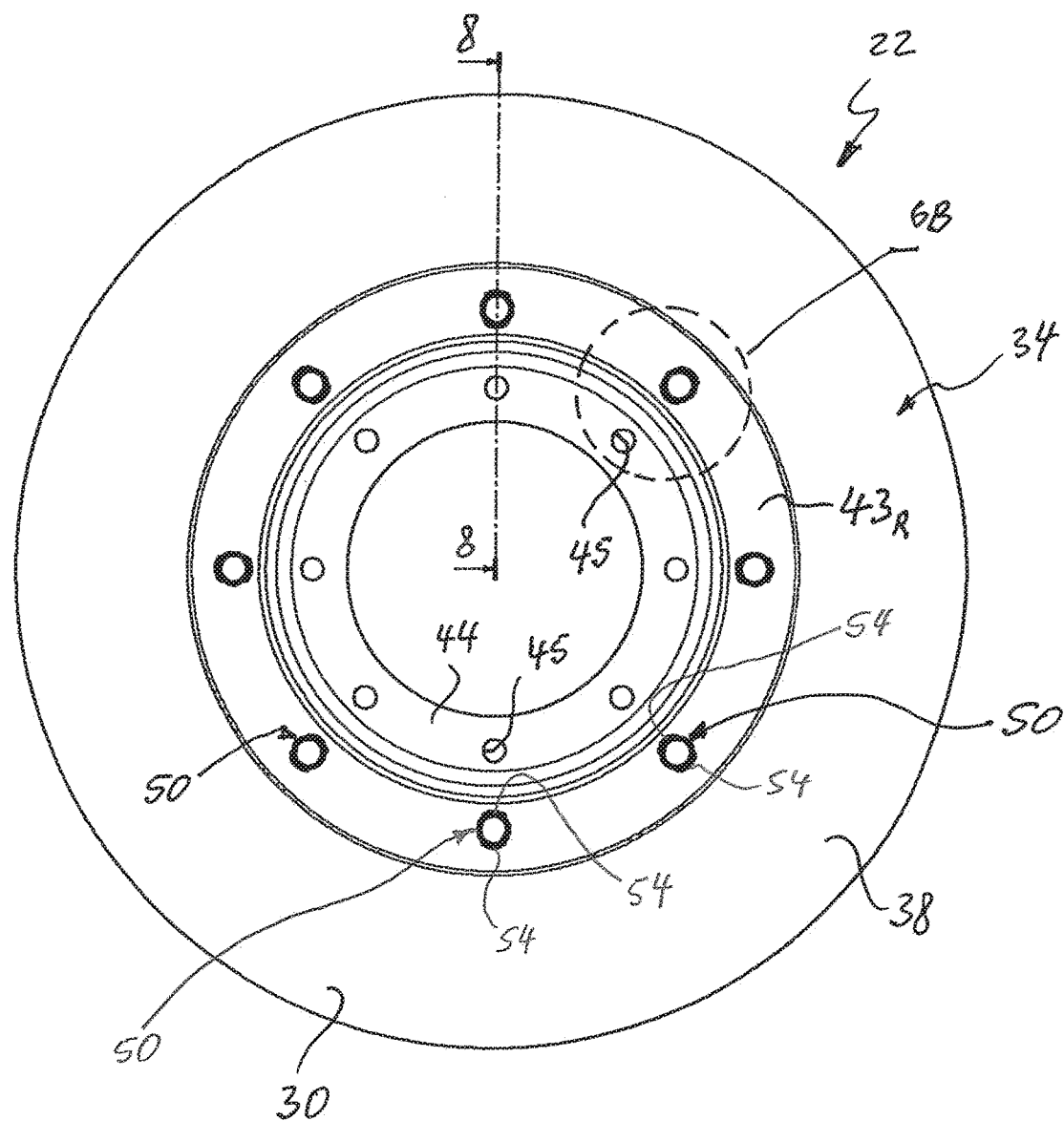
FIG. 6A is a rear elevational view of the turbine assembly in accordance with the first exemplary embodiment of the present invention.
Figure 6B:
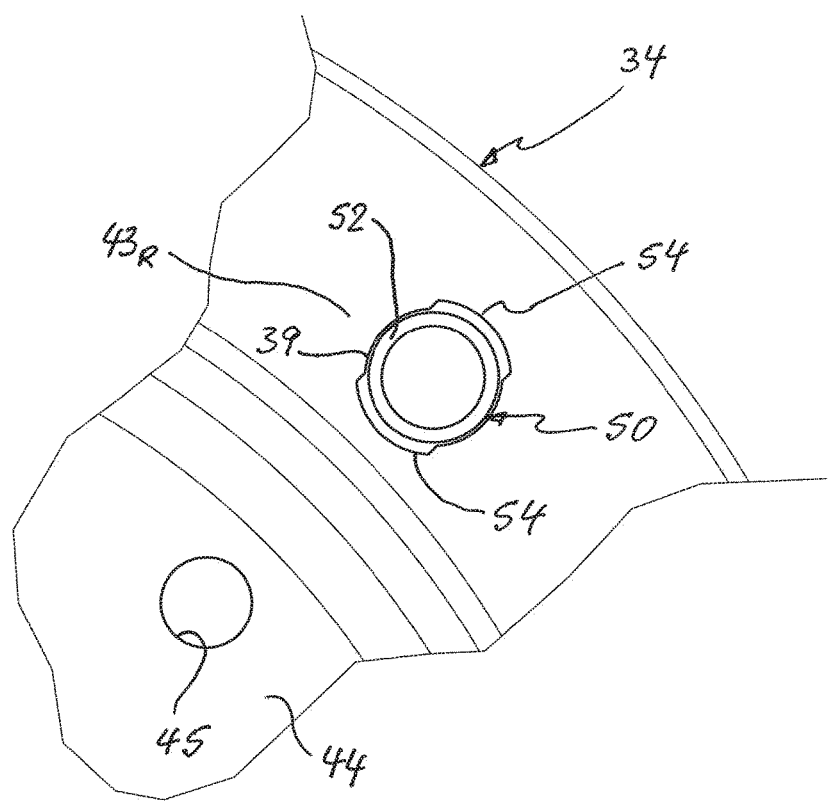
FIG. 6B is an enlarged view of a fragment of the turbine assembly shown in the circle "6B" of FIG. 6A.
Figure 8A:
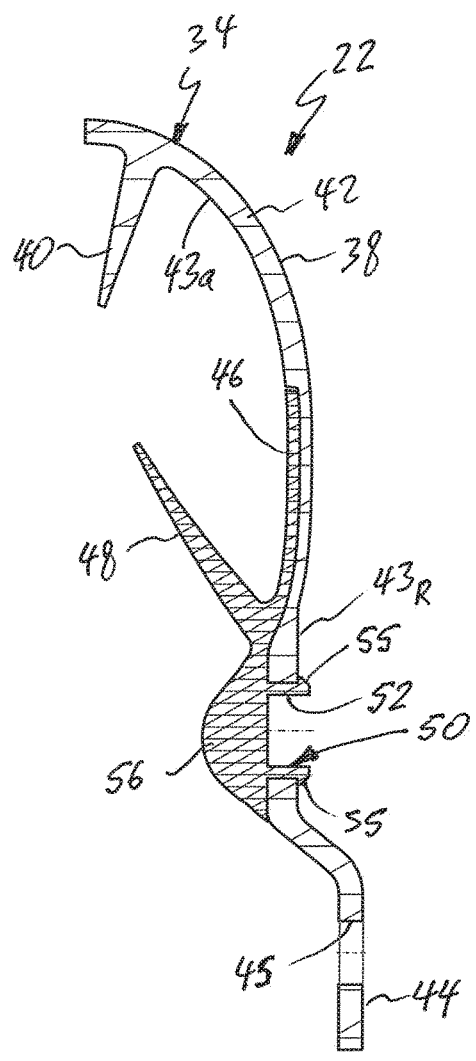
FIG. 8A is a partial sectional view of the turbine assembly taken along the line 8-8 in FIG. 6.
Figure 8C:
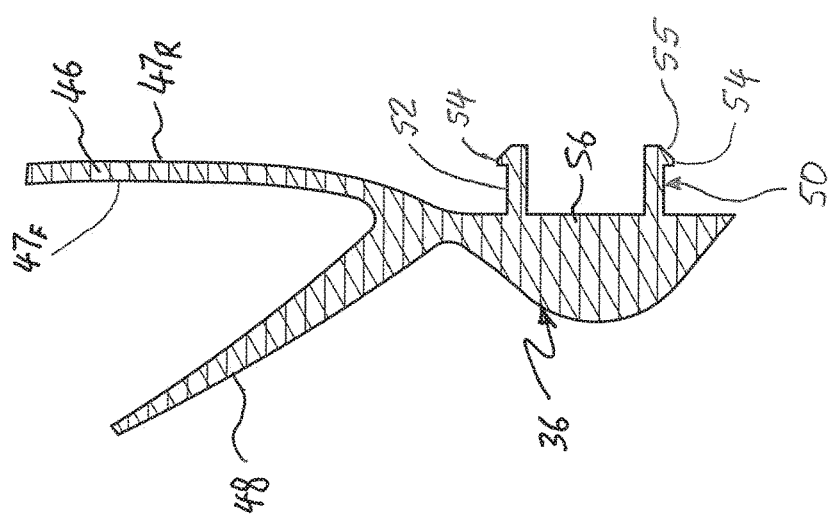
FIG. 8C is a partial sectional view of the second turbine component of the turbine assembly taken along the line 8-8 in FIG. 6.

Each of the snap fasteners 50 according to the first exemplary embodiment of the present invention, as best shown in FIG. 6B, includes a resilient cylindrical, hollow snap arm (or fastener arm) 52 integrally formed with a base portion 56 of the second turbine shell member 46 on the annular outer surface $47_R$ thereof so as to extend axially outward from the outer surface $47_R$ of the second turbine shell member 46 toward the first turbine shell member 38 of the first turbine component 34. Preferably, the cylindrical snap arm 52 extends substantially perpendicularly to the outer surface $47_R$ of the second turbine shell member 46, or substantially parallel to the rotational axis X. An axially distal free end of the cylindrical snap arm 52 is formed with one or more arc-shaped barbs or ledges 54 extending radially outwardly from the axially distal end of the snap arm 52. According to the first exemplary embodiment of the present invention, each of the snap fasteners 50 has two radially opposite barbs 54, as best shown in FIGS. 3B and 6B. Moreover, as best shown in FIG. 8C, each of the barbs 54 has an outwardly tapered exterior end surface 55 forming a ramp surface. The opposite barbs 54 on the axially distal end of each of the snap arms 52 are similar but are oriented in opposite directions so as to face one another. The axially distal end of the cylindrical snap arm 52 is elastically deformable in the radial direction.

The second turbine shell member 46 is fixedly (i.e., non-moveably) secured to the first turbine shell member 38 by the male snap fasteners 50 extending through the holes 39 in the radially outer portion 42 of the first turbine shell member 38.

A method for assembling the turbine assembly 22 by securing the second turbine component 36 to the first turbine component 34 is as follows. First, the snap arms 52 of the snap fasteners 50 of the second turbine component 36 are inserted into the holes 39 of the first turbine component 34. Then, the snap fasteners 50 are pressed through or into the holes 39 (manually or by machine), causing the snap arms 52 of the snap fasteners 50 to resiliently deform inwardly as a result of the pressure applied by edges of the holes 39 against the tapered exterior end surfaces 55 of the opposite barbs 54. During insertion, the outwardly inclined tapered exterior end surfaces 55 of the opposite barbs 54 also act to guide the snap arms 52 into the holes 39. The snap arms 52 of the snap fasteners 50 advance through the holes 39 until the snap arms 52 spring back to their original position as soon as the opposite barbs 54 pass (or clear) the edges of the holes 39, i.e. until the barbs 54 of the snap fasteners 50 of the second turbine component 36 positively engage the annular rear surface $43_R$ of the first turbine shell member 38 so that the annular outer surface $47_R$ of the second turbine shell member 46 engages the annular support surface 43b of the radially outer portion 42 of the first turbine shell member 38.

Various modifications, changes, and alterations may be practiced with the above-described embodiment, including but not limited to the additional embodiments shown in FIGS. 9-30. In the interest of brevity, reference characters in FIGS. 9-30 that are discussed above in connection with FIGS. 1-8C are not further elaborated upon below, except to the extent necessary or useful to explain the additional embodiments of FIGS. 9-30. Modified components and parts are indicated by the addition of a hundred digits to the reference numerals of the components or parts.

In a hydrokinetic torque coupling device 110 of a second exemplary embodiment illustrated in FIGS. 9-16B, the second turbine component 36 of the turbine assembly 22 is replaced by a second turbine component 136 of a turbine assembly 122. The hydrokinetic torque coupling device 110 of FIGS. 9-16B corresponds substantially to the hydrokinetic torque coupling device 10 of FIGS. 1-8C, and only the portions of the second turbine component 136 which differ will therefore be explained in detail below. In the second exemplary embodiment of the present invention illustrated in FIGS. 9-16B, the second turbine component 136 includes two or more equiangularly circumferentially (or angularly) spaced snap fasteners 150, as best shown in FIGS. 11, 14, 16A and 16B. The second turbine shell member 146 of the second turbine component 136 non-moveably engages first turbine shell member 38 of a first turbine component 34 so as to define together a turbine shell 130 of the turbine assembly 122.

The snap fasteners 150 are configured to axially extend through the holes 39 in the radially outer portion 42 of the first turbine shell member 38 in order to fixedly (i.e., non-moveably) secure the second turbine shell member 146 to the first turbine shell member 38.

Figure 11A:
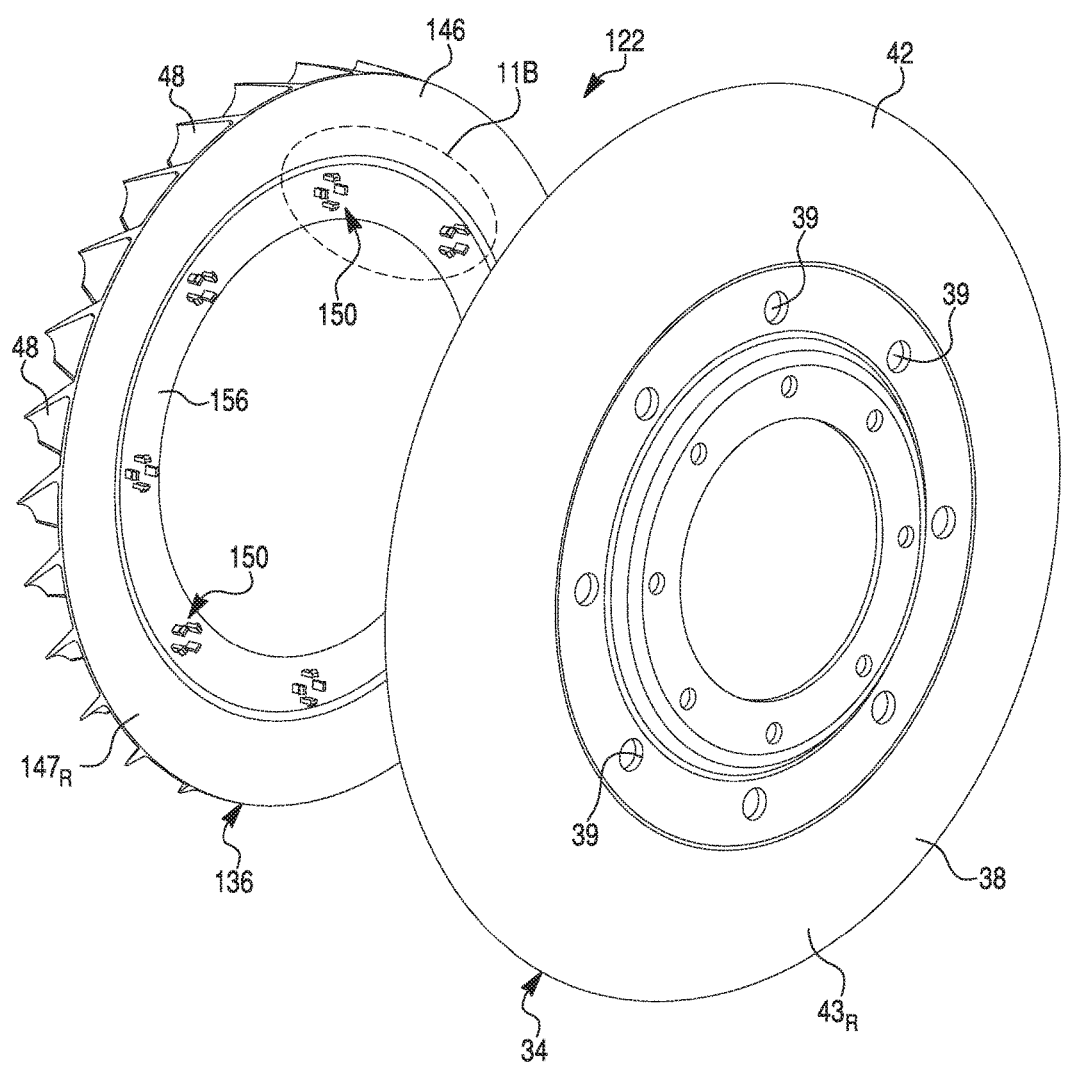
FIG. 11A is a rear partial exploded perspective view of the turbine assembly in accordance with the second exemplary embodiment of the present invention.
Figure 11B:
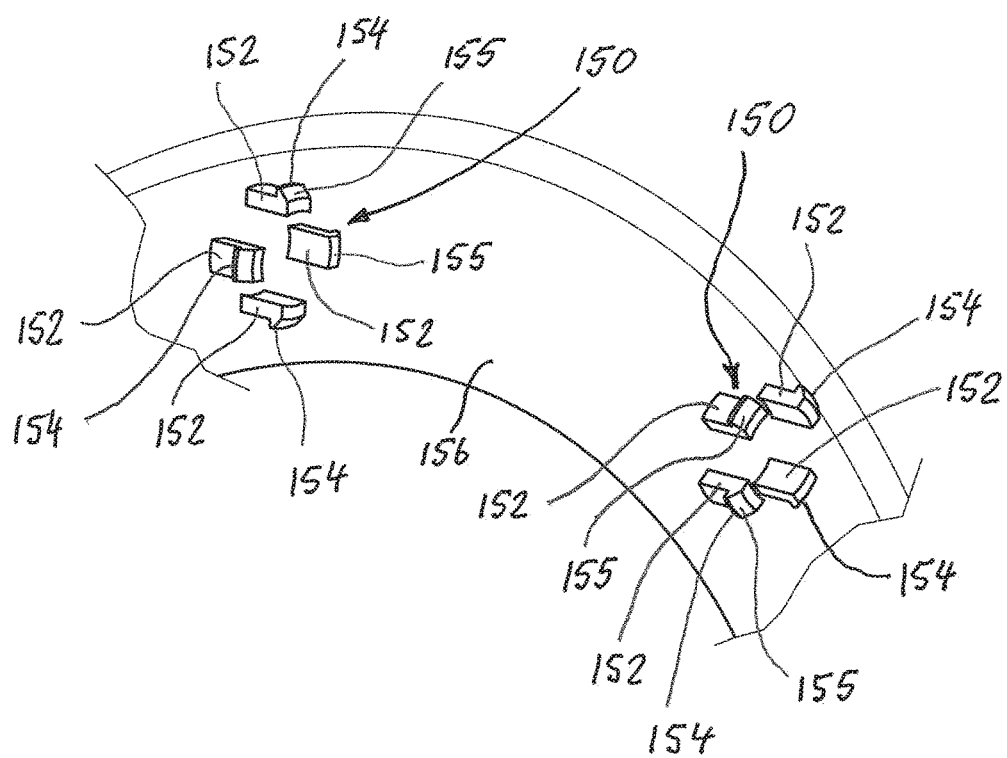
FIG. 11B is an enlarged view of a fragment of the turbine assembly shown in the circle "11B" of FIG. 11A.
Figure 14:
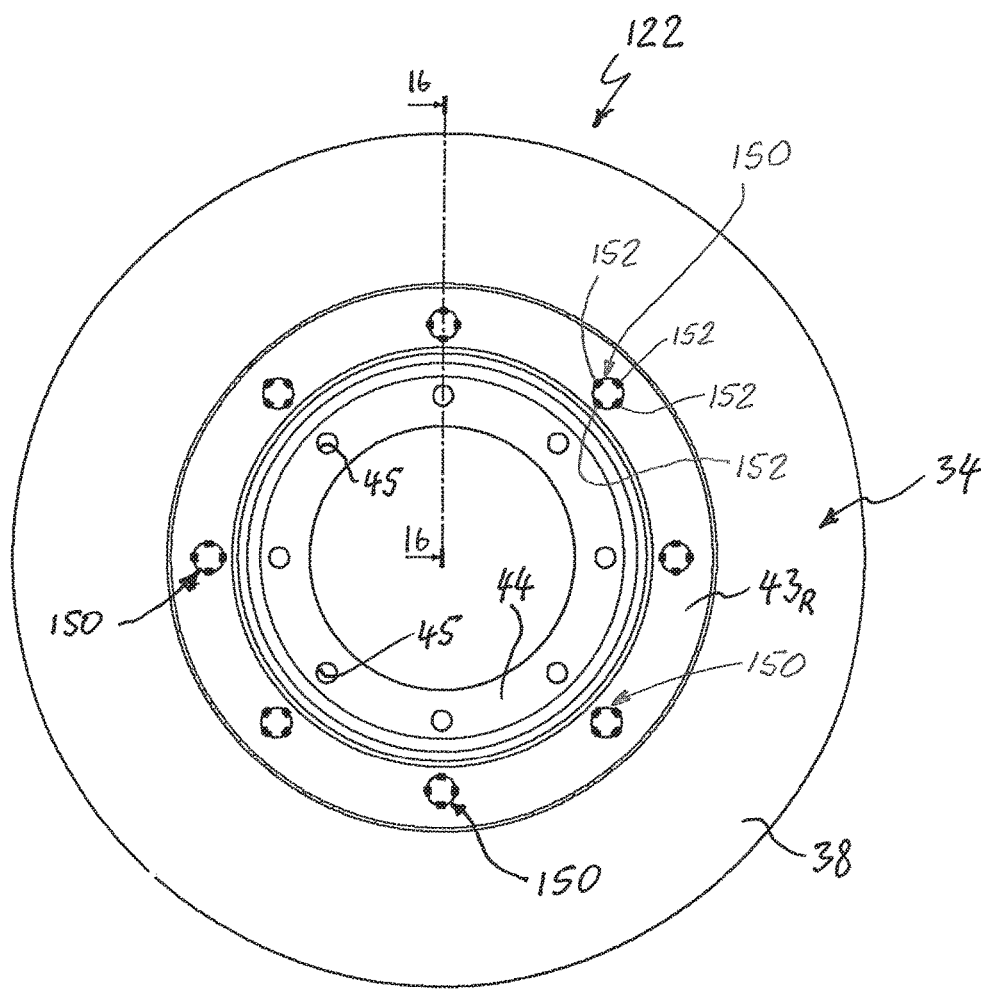
FIG. 14 is a rear elevational view of the turbine assembly in accordance with the second exemplary embodiment of the present invention.

Each of the snap fasteners 150 according to the second exemplary embodiment of the present invention includes one or more resilient snap arms 152 integrally formed with a base portion 156 of a second turbine shell member 146 on an annular outer surface $147_R$ thereof so as to extend axially outwardly from the outer surface $147_R$ of the second turbine shell member 146 toward the first turbine shell member 38 of the first turbine component 34. Preferably, the snap arms 152 extend substantially perpendicular to the outer surface $147_R$ of the second turbine shell member 146, or substantially parallel to the rotational axis X. According to the second exemplary embodiment of the present invention, the snap fastener 150 includes four snap arms 152 oriented diagonally opposite to one another, as best shown in FIGS. 11A and 14. However, the snap fastener 150 may include more or fewer than four snap arms 152.

An axially distal free end of each of the snap arms 152 is formed with a barb or ledge 154 extending outwardly from the axially distal end of the snap arm 152. Moreover, as best shown in FIGS. 16A and 16B, each of the barbs 154 has an outwardly tapered exterior end surface 155 forming a ramp surface. The barbs 154 on the axially distal ends of the snap arms 152 are similar to but oriented in opposite directions so as to face away from each other. The snap arms 152 are elastically deformable in the radial direction.

The second turbine shell member 146 of the second turbine component 136 is fixedly (i.e., non-moveably) secured to the first turbine shell member 38 of the first turbine component 34 by the snap fasteners 150 extending through the holes 39 in the radially outer portion 42 of the first turbine shell member 38.

A method of securing the second turbine component 136 to the first turbine component 34 is as follows. First, the snap arms 152 of the snap fasteners 150 of the second turbine component 136 are inserted into the holes 39 of the first turbine component 34. Then, the snap fasteners 150 are pressed into the holes 39 (by applying an axial force to the second turbine component 136 toward the first turbine component 34 or to the first turbine component 34 toward the second turbine component 136), causing the snap arms 152 of the snap fasteners 150 to resiliently deform inwardly as a result of the pressure applied by edges of the holes 39 against the tapered exterior end surfaces 155 of the barbs 154. This force can be applied either manually or using a machine. During insertion, the outwardly inclined tapered exterior end surfaces 155 of the barbs 154 also act to guide the snap arms 152 into the holes 39. The snap arms 152 of the snap fasteners 150 advance through the holes 39 until the snap arms 152 spring back to their original or undeformed position as soon as the barbs 154 pass (or clear) the edges of the holes 39, i.e. until the barbs 154 of the snap fasteners 150 of the second turbine component 136 positively engage an annular rear surface $43_R$ of the first turbine shell member 38 so that the annular outer surface $147_R$ of the second turbine shell member 146 engages the annular support surface 43b of the radially outer portion 42 of the first turbine shell member 38.

In a hydrokinetic torque coupling device 210 of a third exemplary embodiment illustrated in FIGS. 17-26, the second turbine component 36 of the turbine assembly 22 is replaced by a second turbine component 236 of a turbine assembly 222, and further comprises two or more of snap fasteners 250. The hydrokinetic torque coupling device 210 of FIGS. 17-26 corresponds substantially to the hydrokinetic torque coupling device 10 of FIGS. 1-8C, and only the portions of the second turbine component 236 and the snap fasteners 250, which differ, will therefore be explained in detail below. In the third exemplary embodiment of the present invention illustrated in FIGS. 17-26, a base portion 256 of a second turbine shell member 246 of the second turbine component 236 includes a plurality of circumferentially (or angularly) mounting holes 258 complementary to and having substantially the same diameter as holes 39 of a first turbine component 34.

Figure 23:
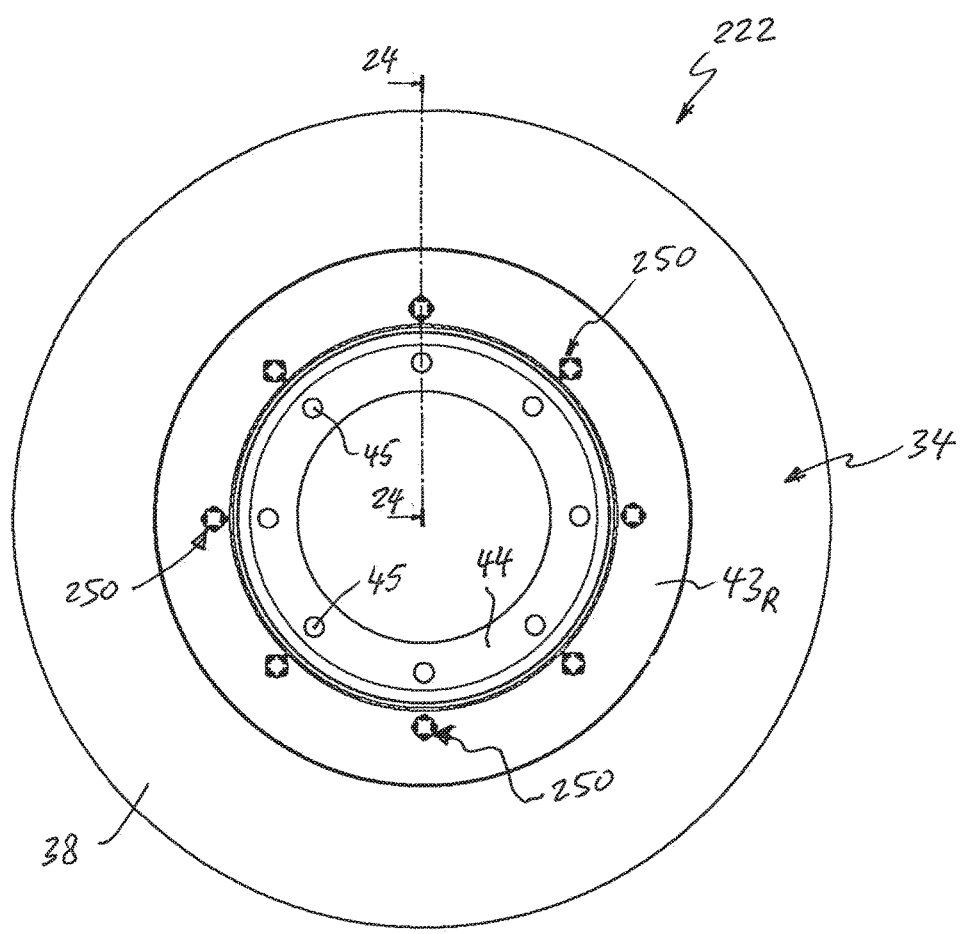
FIG. 23 is a rear elevational view of the turbine assembly in accordance with the third exemplary embodiment of the present invention.
Figure 26:
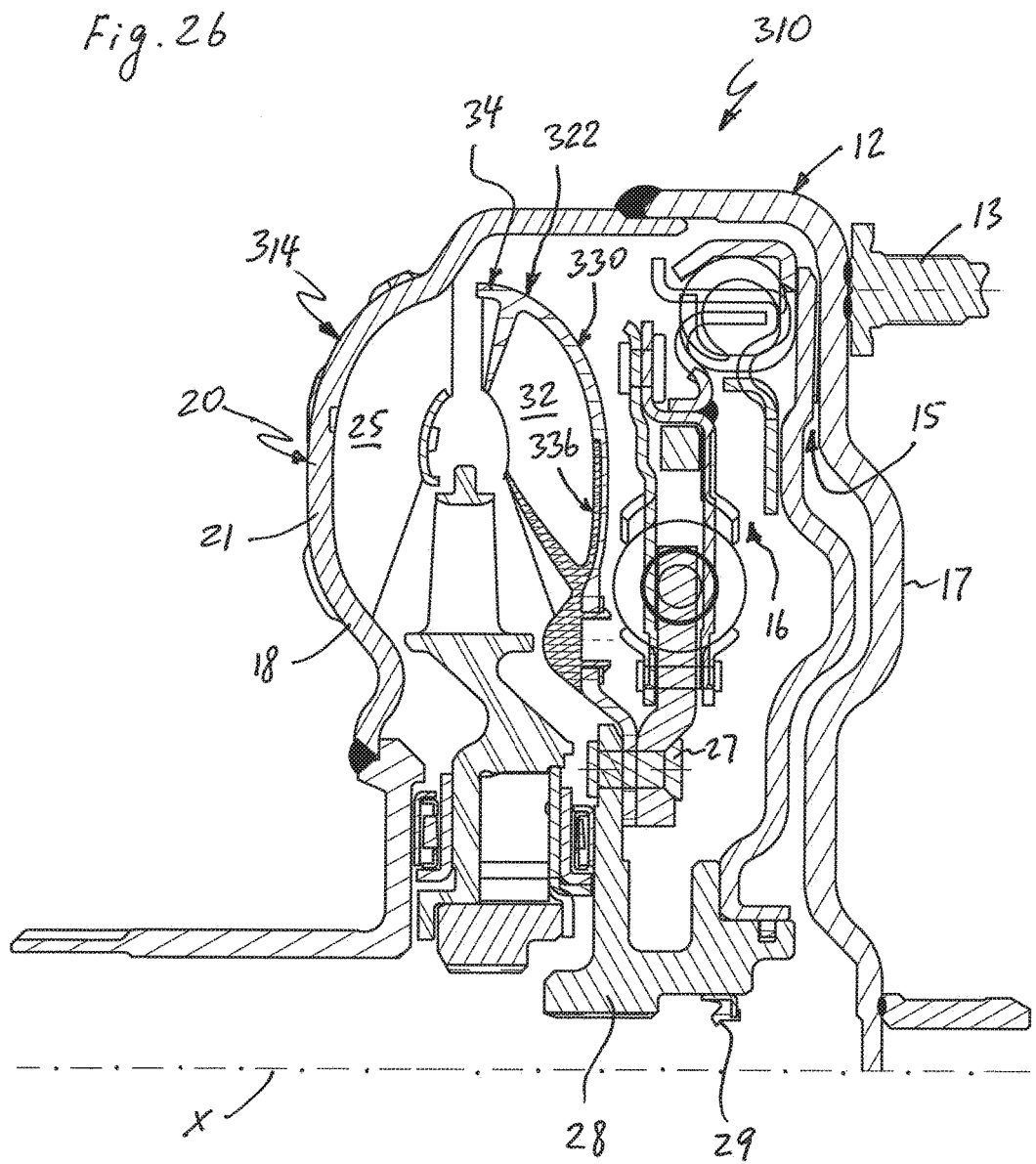
FIG. 26 is a fragmented half-view in axial section of a hydrokinetic torque coupling device with a turbine assembly in accordance with a fourth exemplary embodiment of the present invention.
Figure 27:
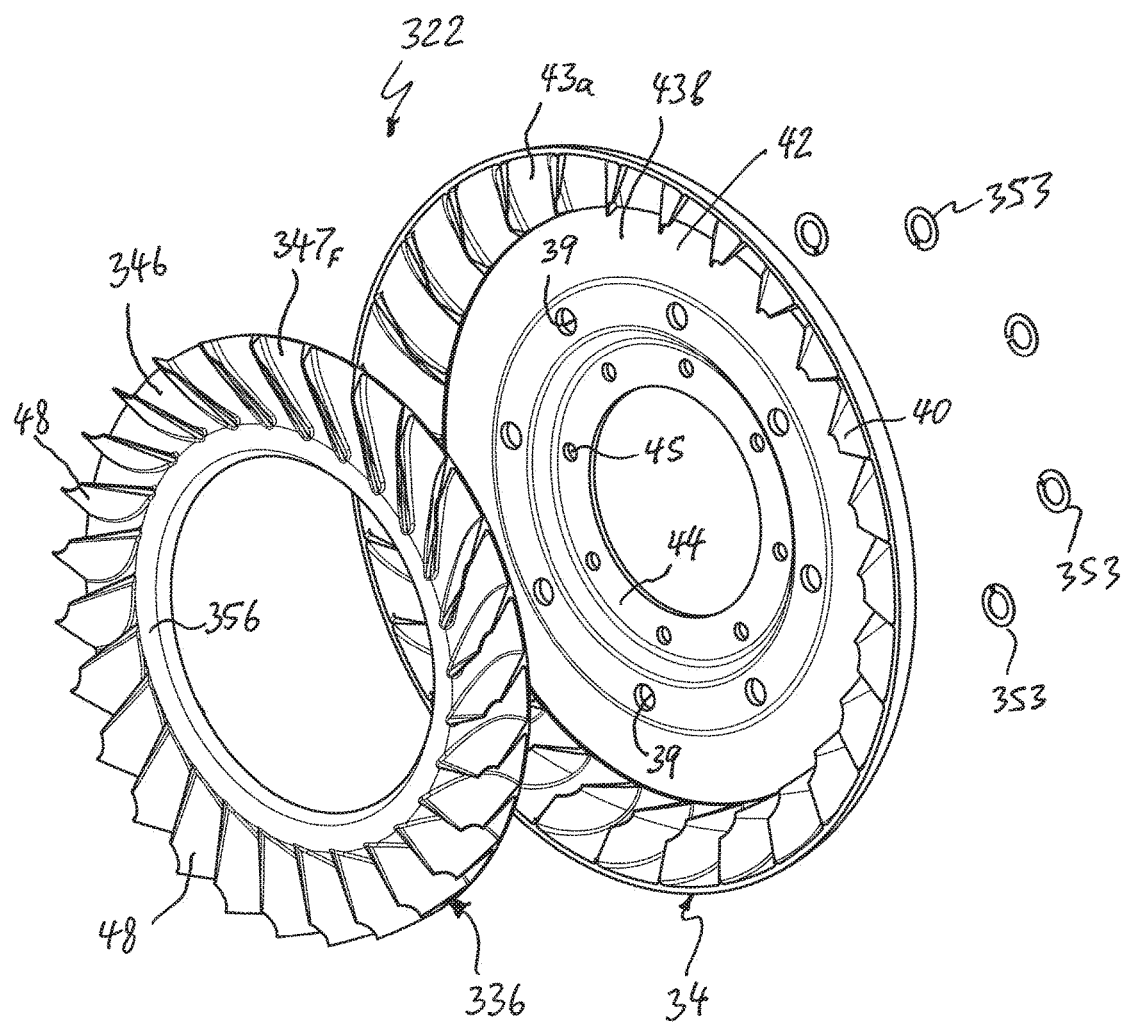
FIG. 27 is a front partial exploded perspective view of the turbine assembly in accordance with the fourth exemplary embodiment of the present invention.

The snap fasteners 250, as best shown in FIG. 20, are formed separately from the first and second turbine components 34 and 236, respectively. Accordingly, the snap fasteners 250 may be made of a material different from the material(s) of the first and second turbine components 34 and 236, respectively. Each of the snap fasteners 250 according to the third exemplary embodiment of the present invention includes a circular base 251, and one or more resilient snap arms 252 which extend axially outward from the base 251, as best shown in FIG. 20. The one or more resilient snap arms 252 of each of the snap fasteners 250 are configured to axially extend through the holes 39 in the radially outer portion 42 of the first turbine shell member 38 and the mounting holes 258 in the second turbine shell member 246 in order to fixedly (i.e., non-moveably) secure the second turbine shell member 246 to the first turbine shell member 38. In an assembled condition, the snap arms 252 extend axially from the second turbine shell member 146 toward the first turbine shell member 38. Preferably, the snap arms 252 extend substantially perpendicularly to the base 251 and an outer surface $247_R$ of the second turbine shell member 246, or substantially parallel to the rotational axis X. According to the third exemplary embodiment of the present invention, each of the snap fasteners 250 includes four snap arms 252 oriented diagonally opposite to one another, as best shown in FIGS. 20 and 23. However, the snap fastener 250 may include more or fewer than four snap arms 252.

An axially distal free end of each of the snap arms 252 is formed with a barb or ledge 254 extending radially outwardly from the axially distal end of the snap arm 252. Moreover, as best shown in FIG. 20, each of the barbs 254 has an outwardly tapered exterior end surface 255 forming a ramp surface. The barbs 254 on the axially distal ends of the snap arms 252 are similar to but are oriented in opposite directions so as to face one another. The snap arms 252 are elastically deformable in the radial direction.

The second turbine shell member 246 of the second turbine component 236 is fixedly (i.e., non-moveably) secured to the first turbine shell member 38 of the first turbine component 34 by the snap fasteners 250 extending through the holes 39 in the radially outer portion 42 of the first turbine shell member 38 and the mounting holes 258 in the second turbine shell member 246.

A method of securing the second turbine component 236 to the first turbine component 34 is as follows. First, the second turbine shell member 246 of the second turbine component 236 is brought in contact with the first turbine shell member 38 of the first turbine component 34 so that the mounting holes 258 in the second turbine shell member 246 are aligned with the holes 39 in the radially outer portion 42 of the first turbine shell member 38. Then the snap arms 252 of the snap fasteners 250 are inserted into the mounting holes 258 of the second turbine component 236. Then, the snap fasteners 250 are pressed into the mounting holes 258 (by applying an axial force to the bases 251 of the snap fasteners 250 toward the holes 39 of the first turbine component 34), causing the snap arms 252 of the snap fasteners 250 to resiliently deform inwardly as a result of the pressure applied by edges of the mounting holes 258 and the holes 39 against the tapered exterior end surfaces 255 of the barbs 254. This force can be applied either manually or using a machine. During insertion, the outwardly inclined tapered exterior end surfaces 255 of the barbs 254 also act to guide the snap arms 252 into the mounting holes 258 and the holes 39. The snap arms 252 of the snap fasteners 250 advance through the mounting holes 258 and the holes 39 until the snap arms 252 spring back to their original or undeformed position as soon as the barbs 254 pass (or clear) the edges of the holes 39, i.e. until the barbs 254 of the snap fasteners 250 of the second turbine component 236 positively engage an annular rear surface $43_R$ of the first turbine shell member 38 so that the annular outer surface $247_R$ of the second turbine shell member 246 engages the annular support surface 43b of the radially outer portion 42 of the first turbine shell member 38.

In a hydrokinetic torque coupling device 310 of a fourth exemplary embodiment illustrated in FIGS. 26-33, the second turbine component 36 of the turbine assembly 22 is replaced by a second turbine component 336 of a turbine assembly 322. The hydrokinetic torque coupling device 310 of FIGS. 26-33 corresponds substantially to the hydrokinetic torque coupling device 10 of FIGS. 1-8C, and only the portions of the second turbine component 336, which differ, will therefore be explained in detail below. In the fourth exemplary embodiment of the present invention illustrated in FIGS. 26-33, the second turbine component 336 includes two or more of circumferentially (or angularly) spaced snap fasteners 350, as best shown in FIGS. 26, 28A, 28B and 33. The snap fasteners 350 are configured to fixedly (i.e., non-moveably) secure the first turbine component 34 of the turbine assembly 322 to the second turbine component 336 thereof. The second turbine shell member 346 of the second turbine component 336 non-moveably engages first turbine shell member 38 of a first turbine component 34 so as to define together a turbine shell 330 of the turbine assembly 322. Moreover, the snap fasteners 350 are configured to axially extend through the holes 39 in the radially outer portion 42 of the first turbine shell member 38 in order to fixedly (i.e., non-moveably) secure the second turbine shell member 346 to the first turbine shell member 38.

Figure 28A:
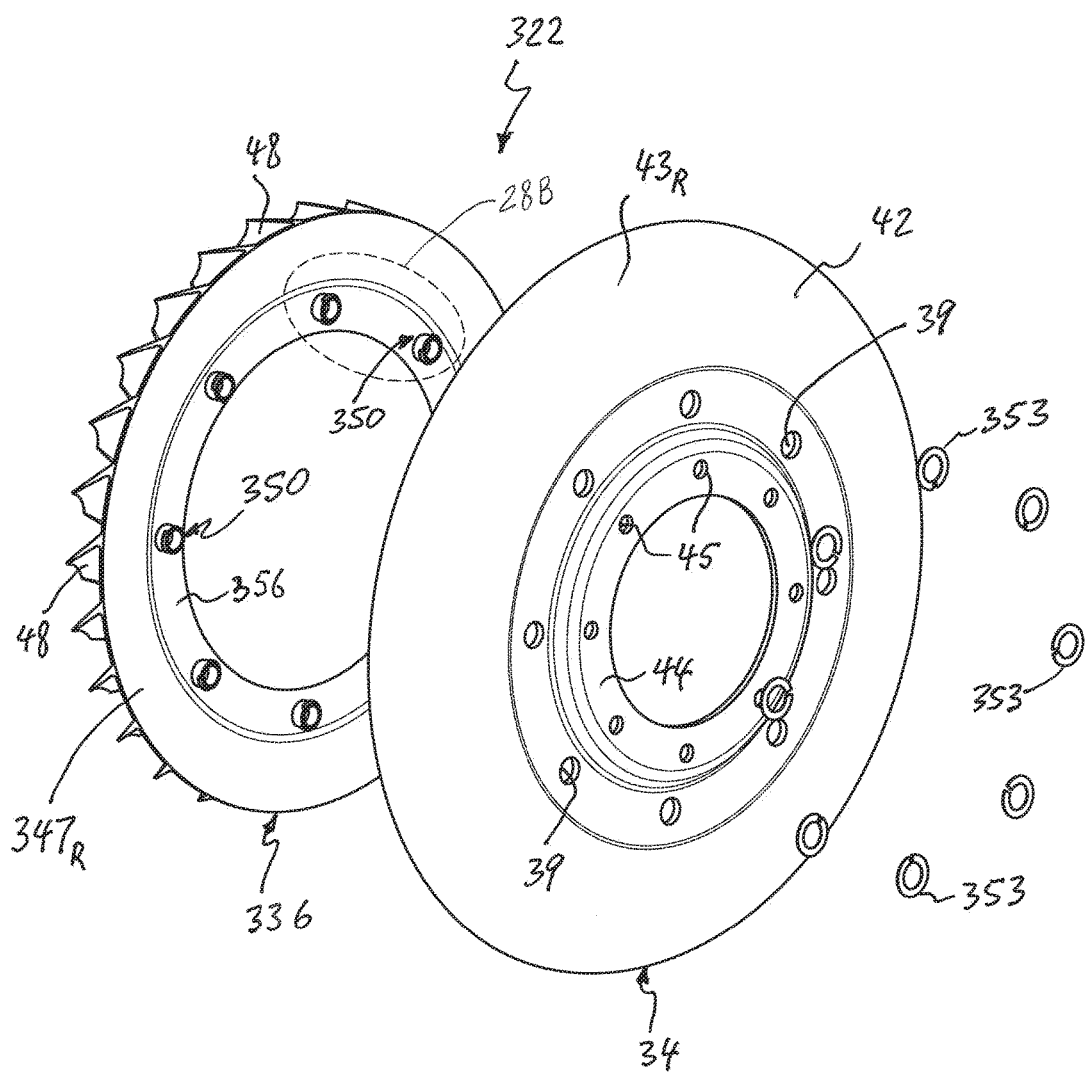
FIG. 28A is a rear partial exploded perspective view of the turbine assembly in accordance with the fourth exemplary embodiment of the present invention.
Figure 28B:
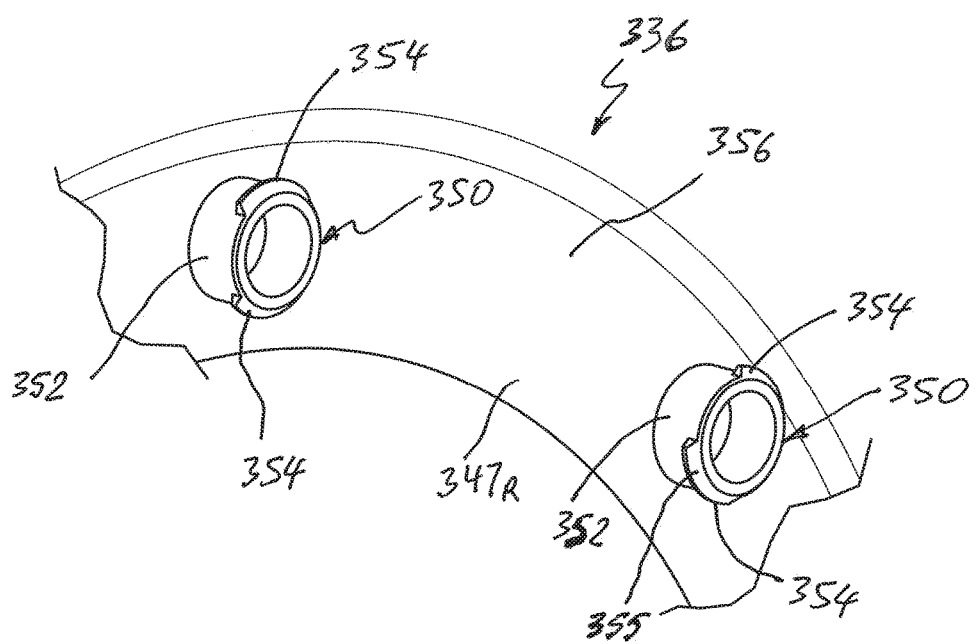
FIG. 28B is an enlarged view of a fragment of the turbine assembly shown in the circle "28B" of FIG. 28A.
Figure 29:
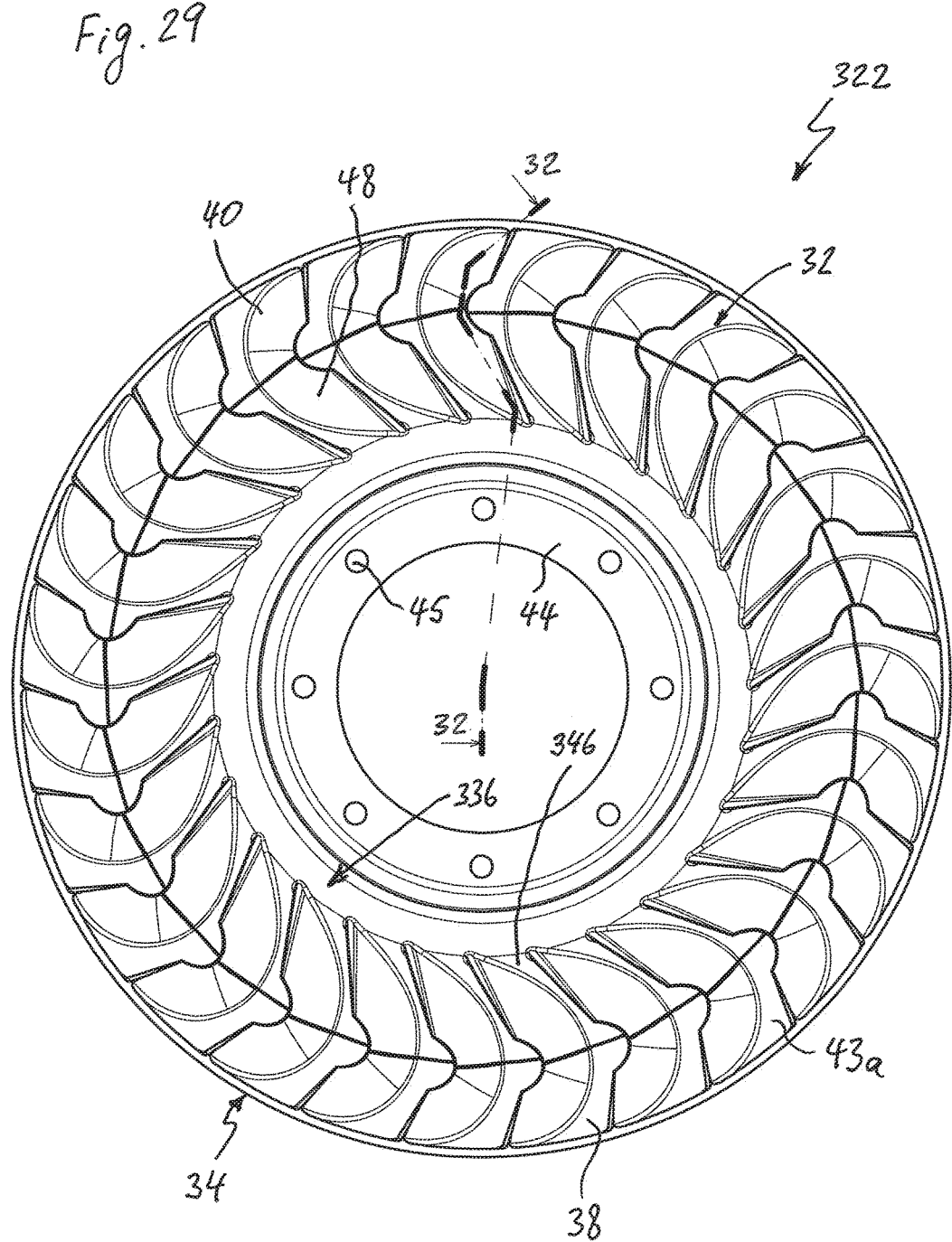
FIG. 29 is a front elevational view of the turbine assembly in accordance with the fourth exemplary embodiment of the present invention.
Figure 30:
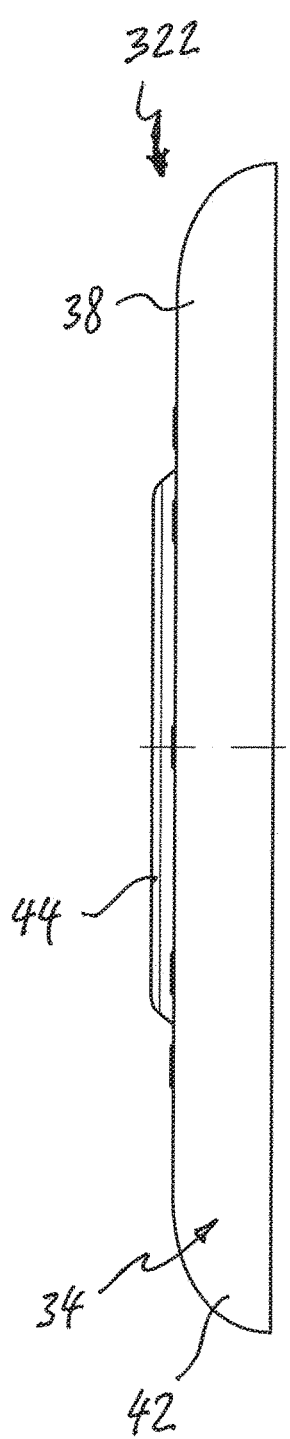
FIG. 30 is a side elevational view of the turbine assembly in accordance with the fourth exemplary embodiment of the present invention.
Figure 31A:
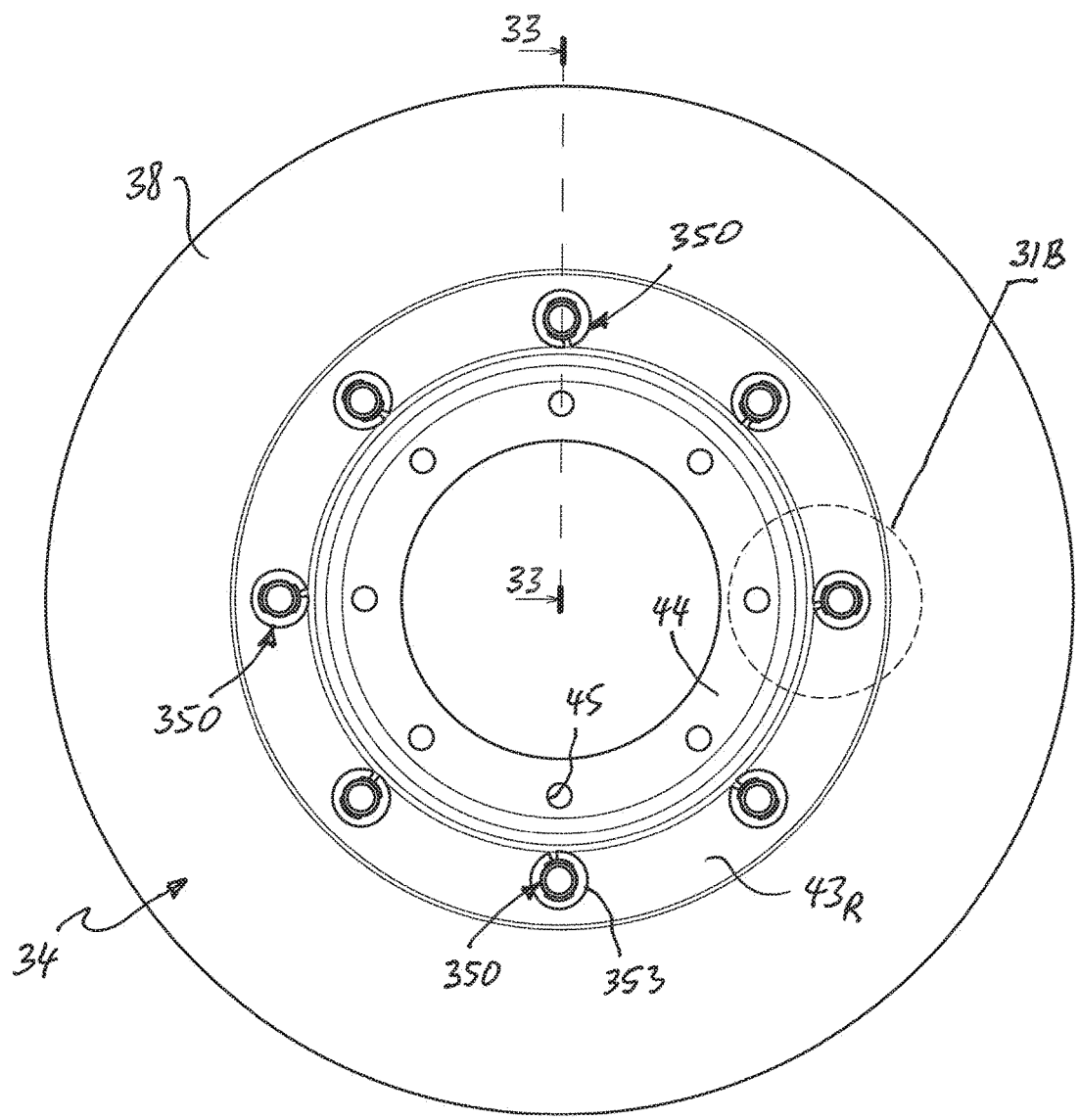
FIG. 31A is a rear elevational view of the turbine assembly in accordance with the fourth exemplary embodiment of the present invention.
Figure 31B:
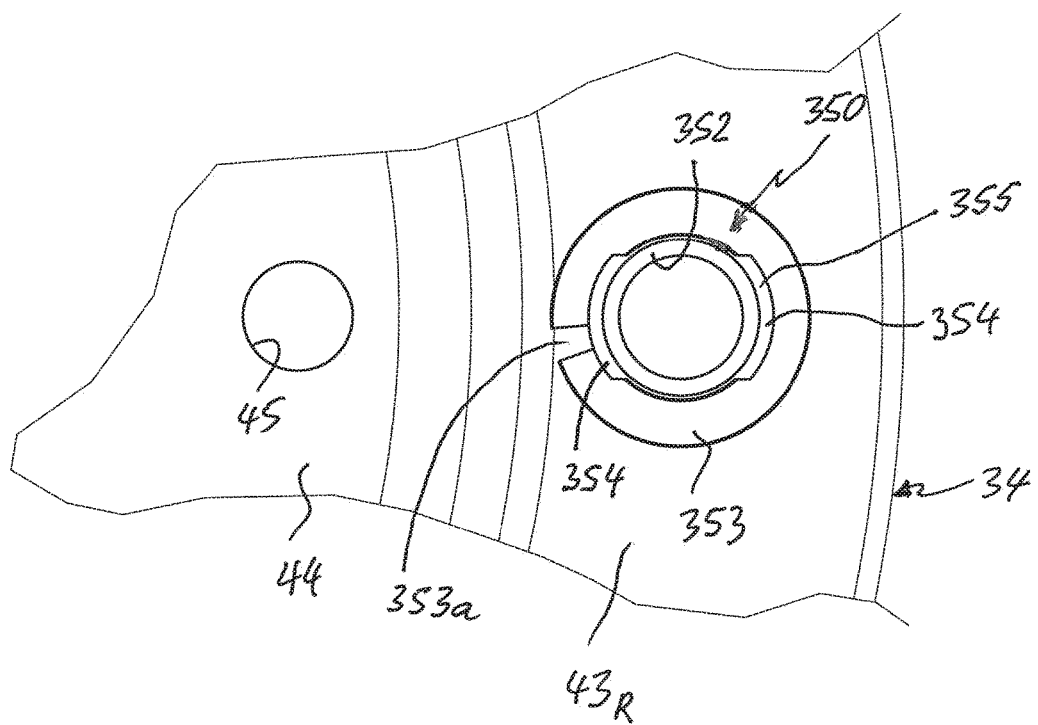
FIG. 31B is an enlarged view of a fragment of the turbine assembly shown in the circle "31B" of FIG. 31A.
Figure 33:
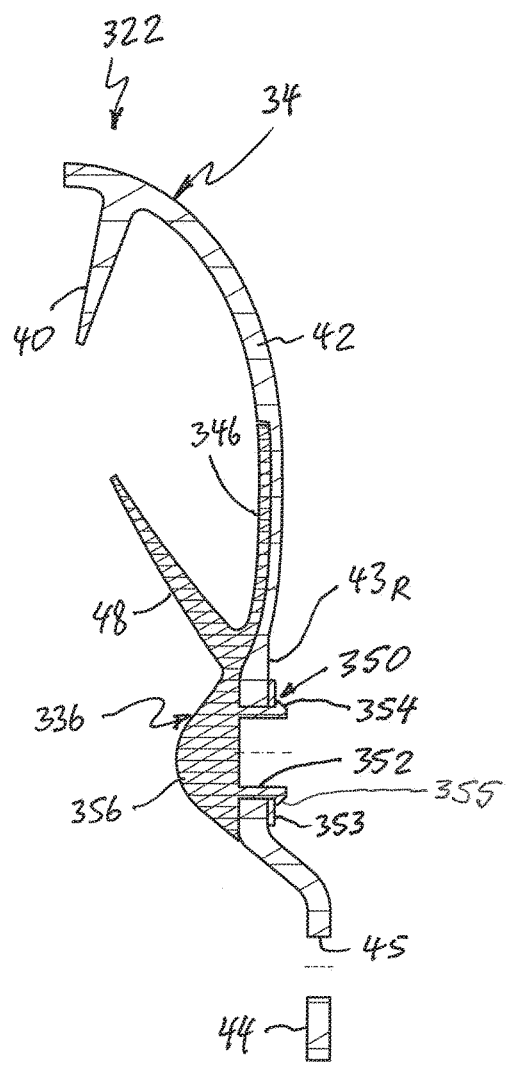
FIG. 33 is a partial sectional view the turbine assembly taken along the line 33-33 in FIG. 31A.
Figure 32:
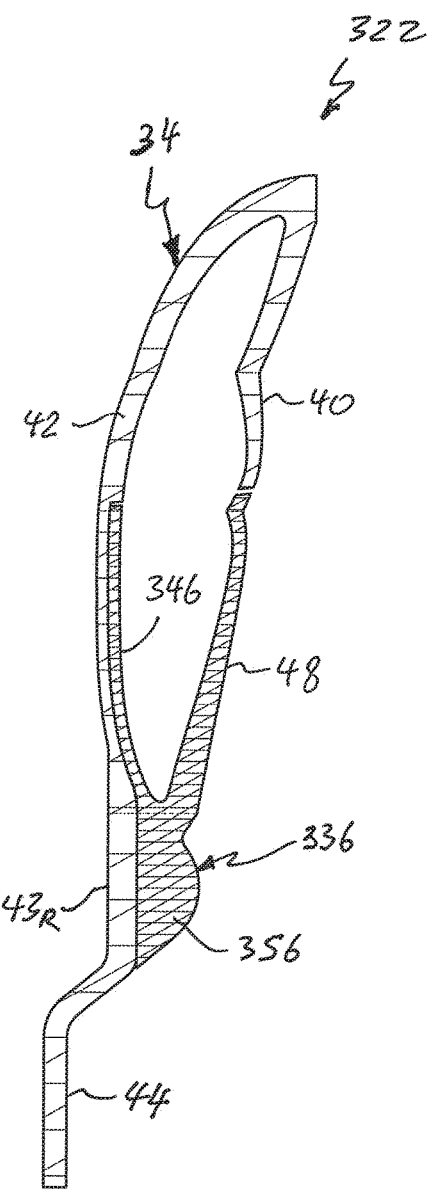
FIG. 32 is a partial sectional view the turbine assembly taken along the line 32-32 in FIG. 29.

Each of the snap fasteners 350 according to the fourth exemplary embodiment of the present invention includes a resilient hollow cylindrical snap arm 352 and a slotted ring 353. The cylindrical snap arm 352 is integrally formed with a base portion 356 of a second turbine shell member 346 on an annular outer surface $347_R$ thereof so as to extend axially outward from the outer surface $347_R$ of the second turbine shell member 346 toward the first turbine shell member 38 of the first turbine component 34. Preferably, the cylindrical snap arm 352 extends substantially perpendicularly to the outer surface $347_R$ of the second turbine shell member 346, or substantially parallel to the rotational axis X. An axially distal free end of the cylindrical snap arm 352 is formed with one or more arc-shaped barbs or ledges 354 extending radially outwardly from the axially distal end of the snap arm 352. According to the fourth exemplary embodiment of the present invention, each of the snap fasteners 350 has two radially opposite barbs 354, as best shown in FIGS. 28B, 31B and 33. Moreover, as best shown in FIG. 33, each of the barbs 354 has an outwardly tapered exterior end surface 355 forming a ramp surface. The opposite barbs 354 on the axially distal end of each of the snap arms 352 are similar but are oriented in opposite directions so as to face one another. The axially distal end of the cylindrical snap arm 352 is elastically deformable in the radial direction.

Each of the slotted rings 353 is a radially expandable slotted ring (i.e., formed with a slot 353a shown in FIG. 31B), such as a conventional snap ring or C-ring well known to those skilled in the art, and has axially opposite flat surfaces. As best shown in FIG. 33, each of the slotted rings 353 is maintained radially over and around the cylindrical snap arm 352 within the barbs 354 and seated upon and around the cylindrical snap arm 352 of the snap fastener 350. As illustrated, the slotted rings 353 are disposed between the rear surface $43_R$ of the first turbine shell member 38 and the barbs 354 of the snap arms 352. The slotted rings 353 increase the contact surface for axial retention. The slotted rings 353 can also be "load" snap rings configured to exert an axial load (or force) to stack (or press) the first and second turbine components 34 and 336, respectively, together.

A method of securing the second turbine component 336 to the first turbine component 34 is as follows. First, the snap arms 352 of the snap fasteners 350 on the second turbine component 336 are inserted into the holes 39 of the first turbine component 34. Then, the snap arms 352 are pressed over the holes 39 (manually or by machine), causing the snap arms 352 of the snap fasteners 350 to resiliently deform inwardly as a result of the pressure applied by edges of the holes 39 against the tapered exterior end surfaces 355 of the opposite barbs 354. During insertion, the outwardly inclined tapered exterior end surfaces 355 of the opposite barbs 354 also act to guide the snap arms 352 into the holes 39. The snap arms 352 of the snap fasteners 350 advance through the holes 39 until the snap arms 352 spring back to their original or undeformed position as soon as the opposite barbs 354 pass (or clear) the edges of the holes 39. Next, the slotted rings 353 are mounted over and around the cylindrical snap arm 352 between the rear surface $43_R$ of the first turbine shell member 38 and the barbs 354 of the snap arms 352. In this position, the barbs 354 of the snap fasteners 350 of the second turbine component 336 positively engage the flat surfaces of the slotted rings 353, while the opposite flat surfaces of the slotted rings 353 engage the annular rear surface $43_R$ of the first turbine shell member 38 so that the annular outer surface $347_R$ of the second turbine shell member 346 engages the annular support surface 43b of the radially outer portion 42 of the first turbine shell member 38.

Figure 34:
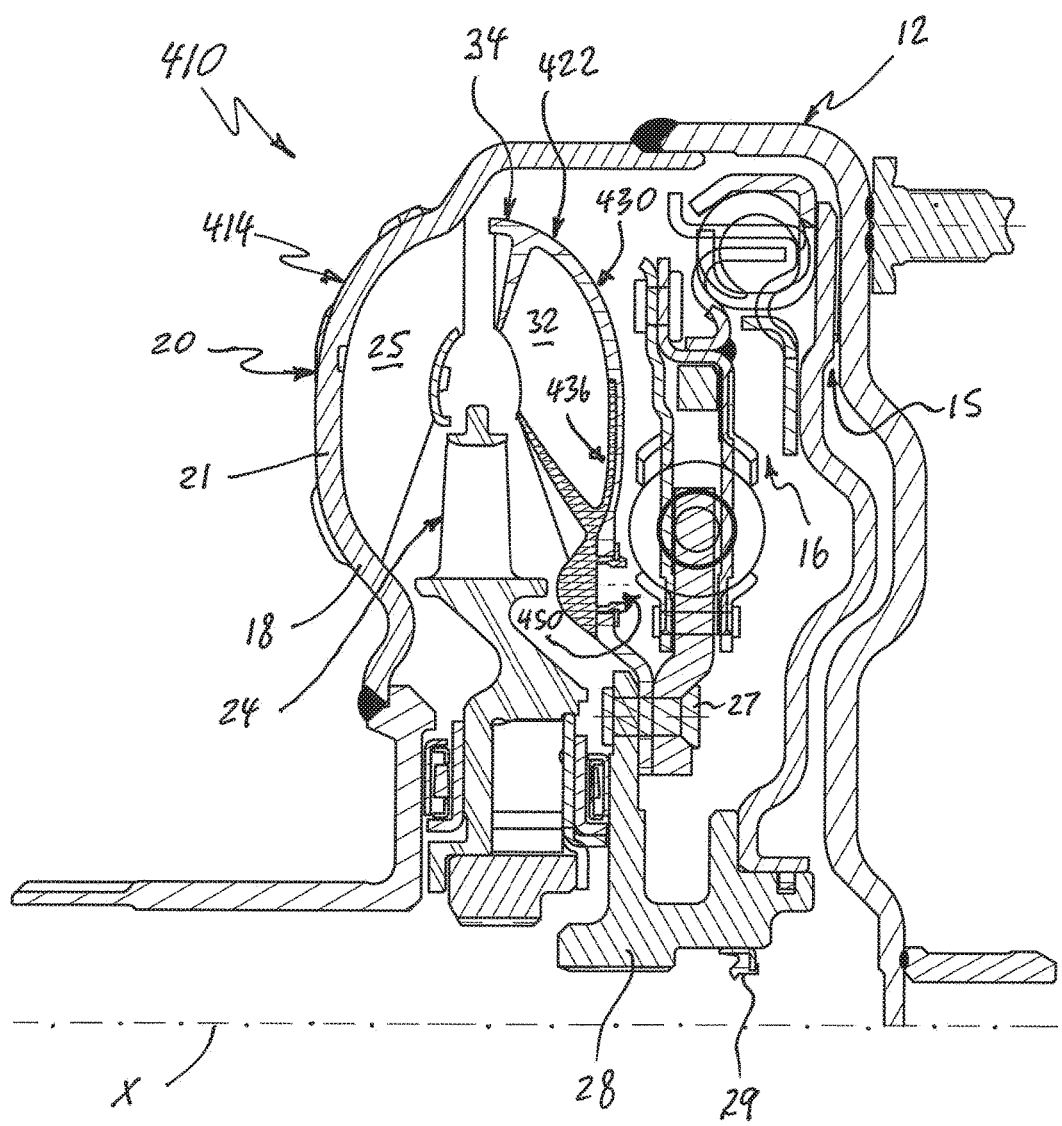
FIG. 34 is a fragmented half-view in axial section of a hydrokinetic torque coupling device with a turbine assembly in accordance with a fifth exemplary embodiment of the present invention.
Figure 35:
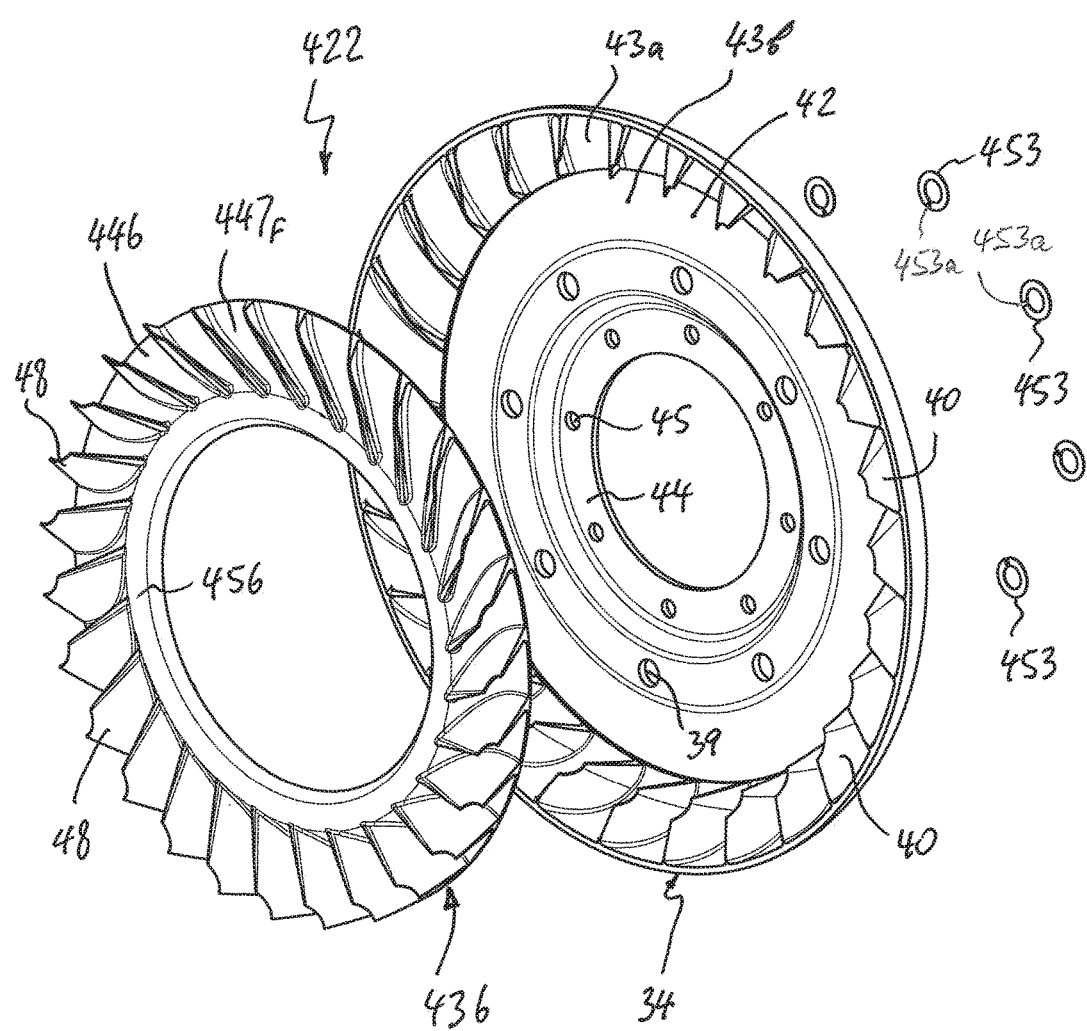
FIG. 35 is a front partial exploded perspective view of the turbine assembly in accordance with the fifth exemplary embodiment of the present invention.
Figure 39:
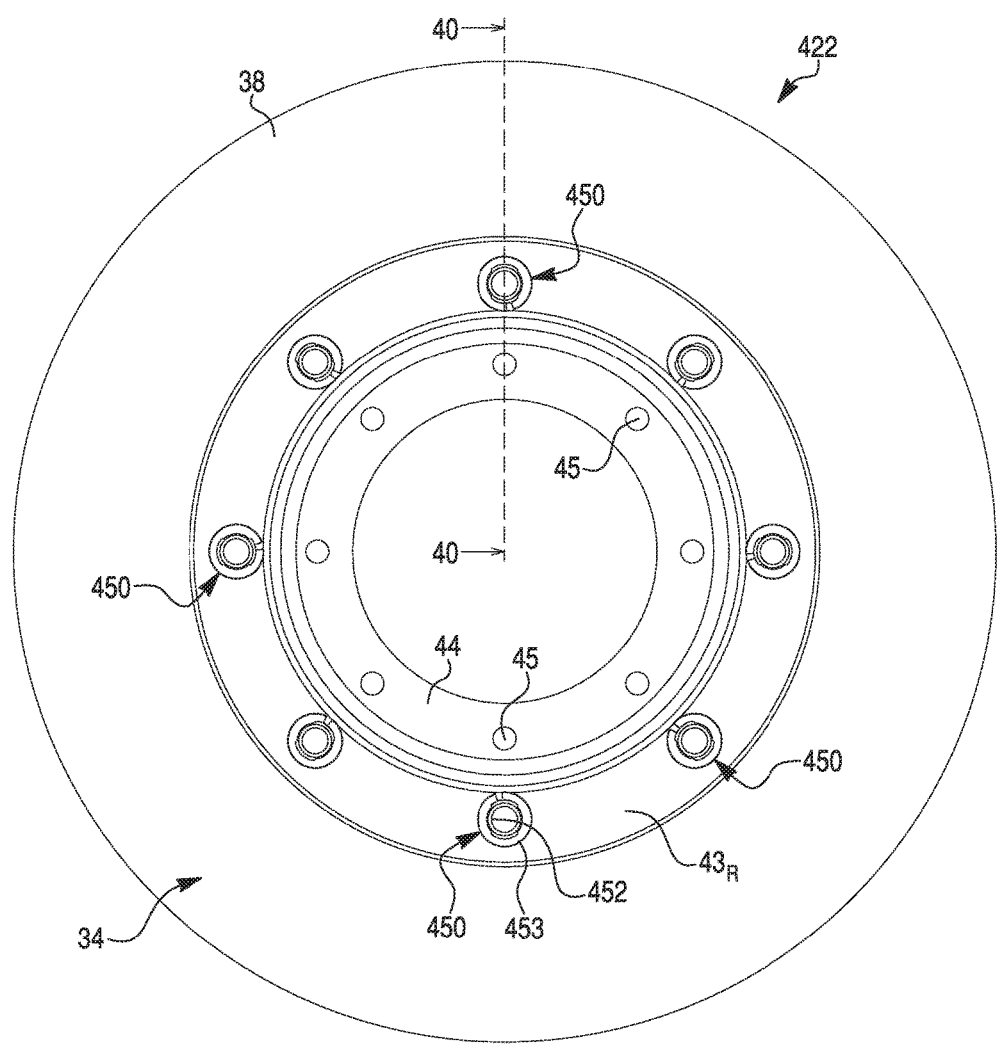
FIG. 39 is a rear elevational view of the turbine assembly in accordance with the fifth exemplary embodiment of the present invention.

In a hydrokinetic torque coupling device 410 of a fifth exemplary embodiment illustrated in FIGS. 34-42, the second turbine component 36 of the turbine assembly 22 is replaced by a second turbine component 436 of a turbine assembly 422. The hydrokinetic torque coupling device 410 of FIGS. 34-42 corresponds substantially to the hydrokinetic torque coupling device 10 of FIGS. 1-8C, and only the portions of the second turbine component 436, which differ, will therefore be explained in detail below. In the fourth exemplary embodiment of the present invention illustrated in FIGS. 34-42, the second turbine component 436 includes two or more of circumferentially (or angularly) spaced fasteners 450, as best shown in FIGS. 34, 39 and 40. The fasteners 450 are configured to fixedly (i.e., non-moveably) secure a first turbine component 34 of the turbine assembly 422 to the second turbine component 436 thereof. The second turbine shell member 446 of the second turbine component 436 non-moveably engages a first turbine shell member 38 of the first turbine component 34 so as to define together a turbine shell 430 of the turbine assembly 422. Moreover, the fasteners 450 axially extend through the holes 39 in the radially outer portion 42 of the first turbine shell member 38 in order to fixedly (i.e., non-moveably) secure the second turbine shell member 446 to the first turbine shell member 38.

Figure 36A:
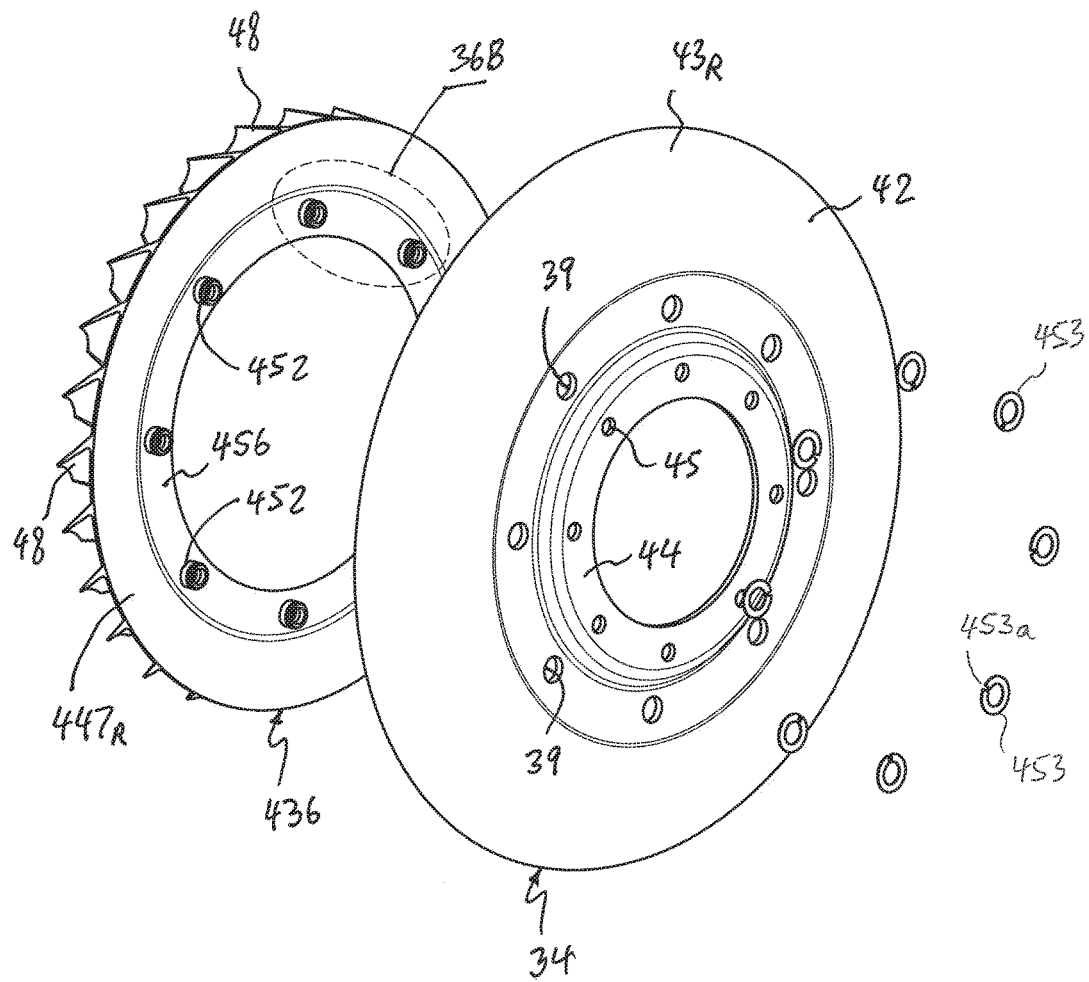
FIG. 36A is a rear partial exploded perspective view of the turbine assembly in accordance with the fifth exemplary embodiment of the present invention.
Figure 36B:
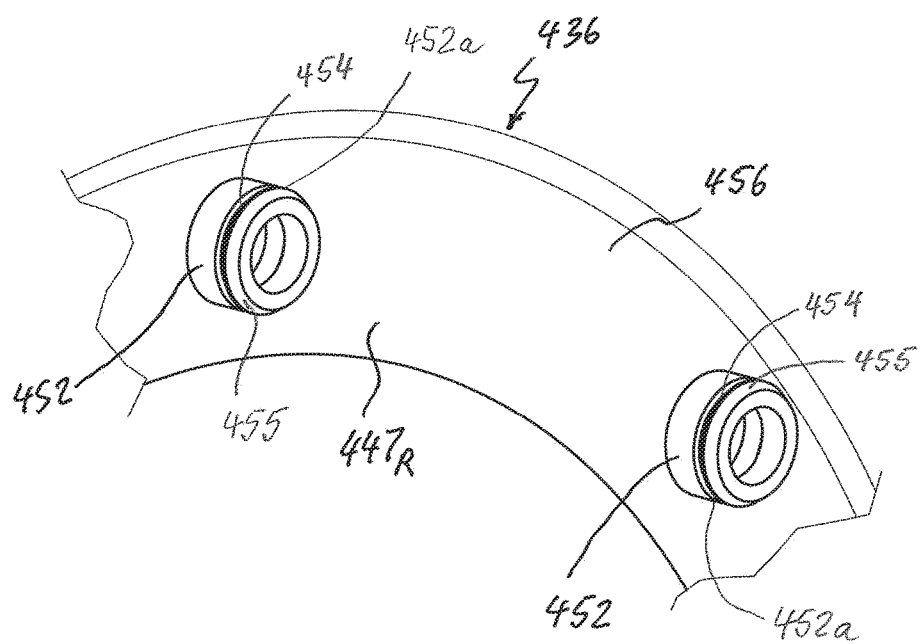
FIG. 36B is an enlarged view of a fragment of the turbine assembly shown in the circle "36B" of FIG. 36A.
Figure 37:
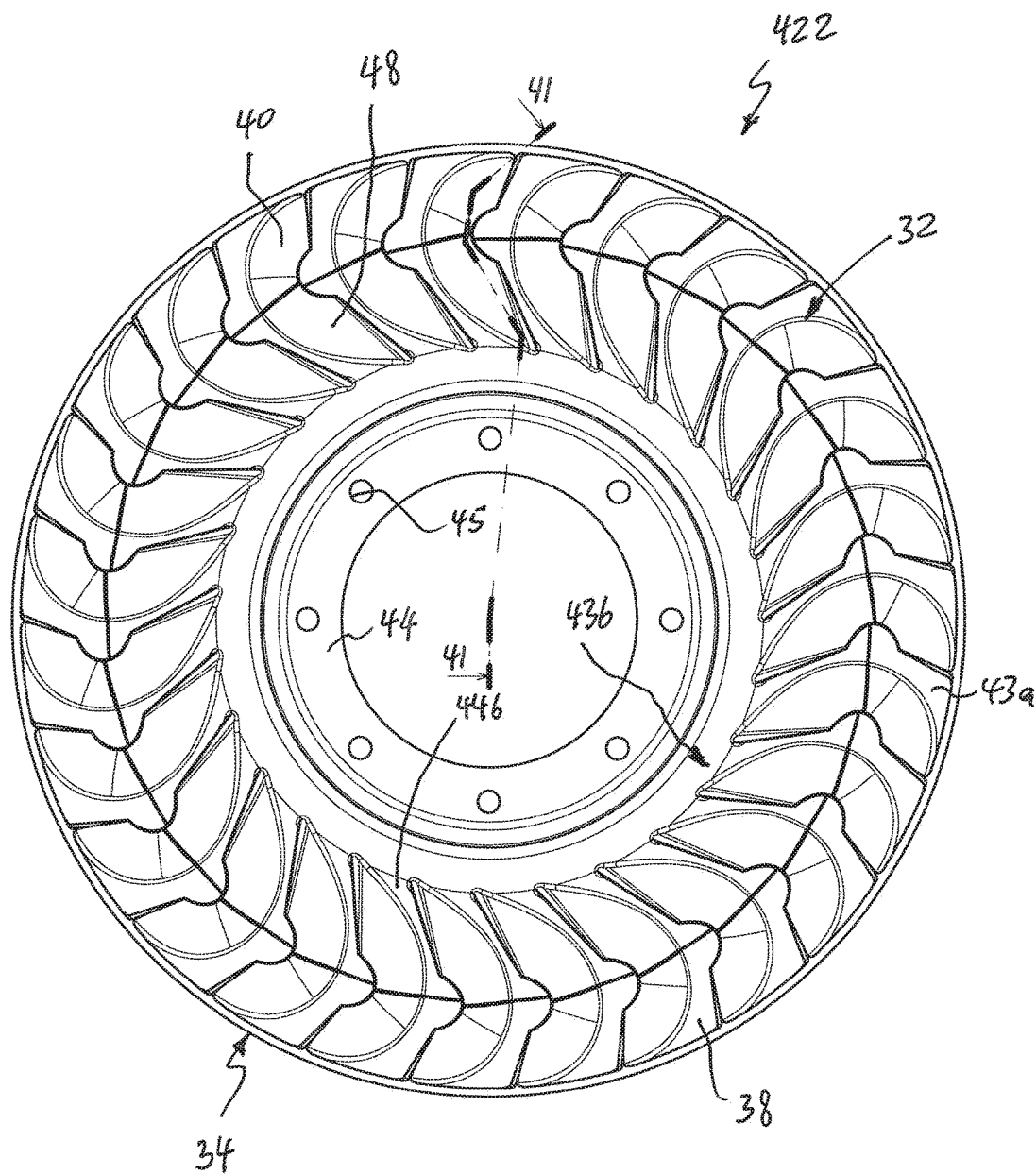
FIG. 37 is a front elevational view of the turbine assembly in accordance with the fifth exemplary embodiment of the present invention.
Figure 38:
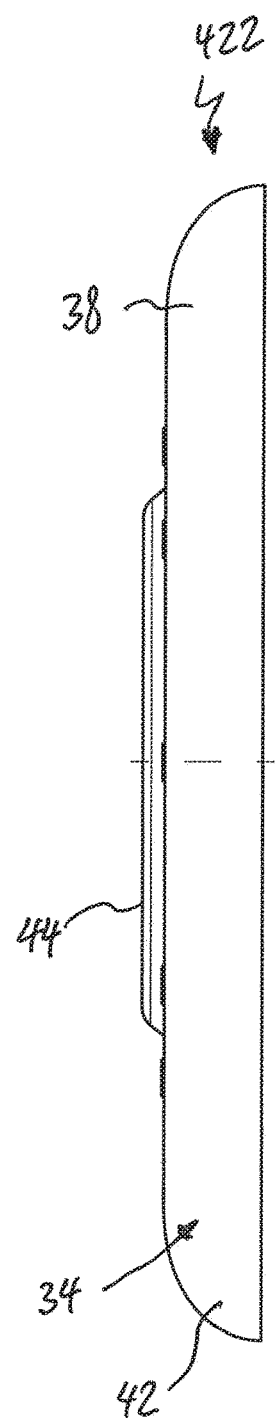
FIG. 38 is a side elevational view of the turbine assembly in accordance with the fifth exemplary embodiment of the present invention.
Figure 42:
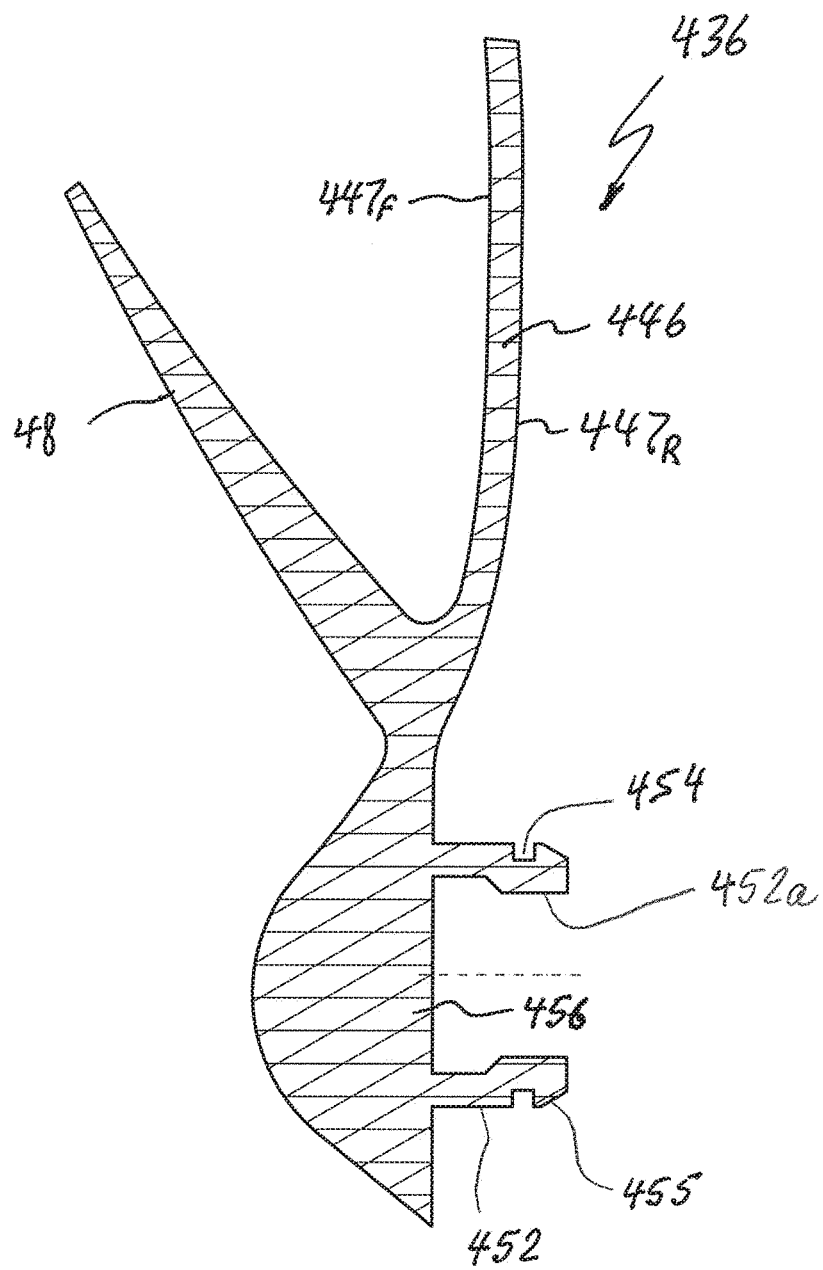
FIG. 42 is a partial sectional view of the second turbine component only of the turbine assembly taken along the line 40-40 in FIG. 39.
Figure 43:
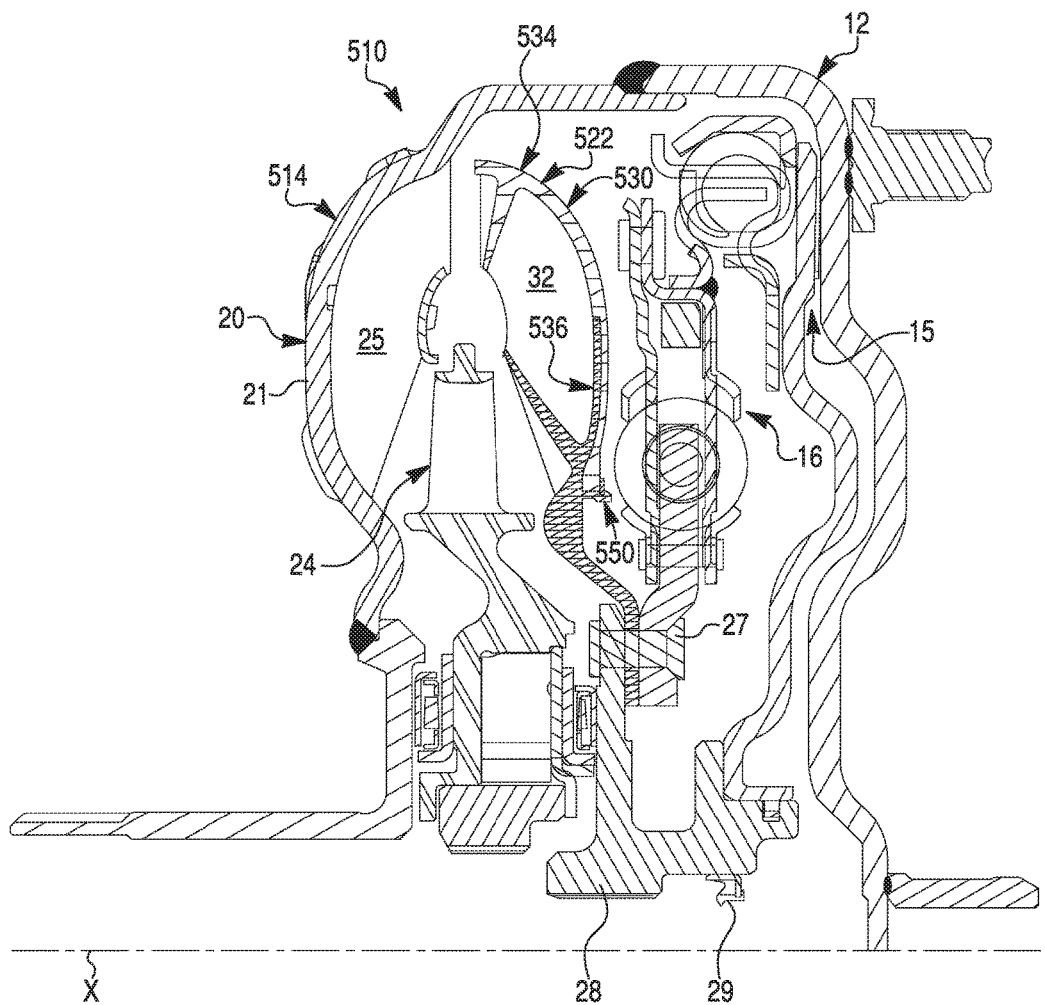
FIG. 43 is a fragmented half-view in axial section of a hydrokinetic torque coupling device with a turbine assembly in accordance with a sixth exemplary embodiment of the present invention.

Each of the fasteners 450 according to the fifth exemplary embodiment of the present invention includes a hollow cylindrical fastener arm 452 and a slotted ring 453. The cylindrical fastener arm 452 is integrally formed with a base portion 456 of a second turbine shell member 446 on an annular outer surface $447_R$ thereof so as to extend axially outward from the outer surface $447_R$ of the second turbine shell member 446 toward the first turbine shell member 38 of the first turbine component 34. Preferably, the cylindrical fastener arm 452 extends substantially perpendicular to the outer surface $447_R$ of the second turbine shell member 446, or substantially parallel to the rotational axis X. An axially distal free end 452a of the cylindrical fastener arm 452 is formed with an annular groove 454, as best shown in FIGS. 36B and 42. Moreover, as best shown in FIG. 42, the axially distal free end 452a of the cylindrical fastener arms 452 has an outwardly tapered exterior end surface 455.

Each of the slotted rings 453 is a radially expandable slotted ring (i.e., formed with a slot 453a shown in FIGS. 35 and 36A), such as a conventional snap ring or C-ring well known to those skilled in the art, and has axially opposite flat surfaces. As best shown in FIG. 40, each of the slotted rings 453 is maintained radially over and around one of the cylindrical fastener arms 452 and at least partially seated (disposed) in the annular groove 454 of the fastener 450. As illustrated, the slotted rings 453 are disposed between the rear surface $43_R$ of the first turbine shell member 38 and the axially distal free ends 452a of the cylindrical fastener arms 452. The slotted rings 453 are provided to retain axially the first and second turbine components 34 and 436, respectively, together. The slotted rings 453 can also be a "load" snap rings configured to exert an axial load (or force) to stack (or press) the first and second turbine components 34 and 436, respectively, together.

A method of securing the second turbine component 436 to the first turbine component 34 is as follows. First, the fastener arms 452 of the fasteners 450 on the second turbine component 436 are inserted into the holes 39 of the first turbine component 34. Then, the fastener arms 452 are pressed over the holes 39 (manually or by machine), until the axially distal free ends 452a of the fastener arms 452 pass (or clear) the edges of the holes 39. Next, the slotted snap rings 453 are mounted into the annular groove 454 of the fastener arms 452. In this position, the slotted snap rings 453 of the fasteners 450 positively engage the annular rear surface $43_R$ of the first turbine shell member 38 so that the annular outer surface $447_R$ of the second turbine shell member 446 engages the annular support surface 43b of the radially outer portion 42 of the first turbine shell member 38.

In a hydrokinetic torque coupling device 510 of a sixth exemplary embodiment illustrated in FIGS. 43-51, the turbine assembly 22 is replaced by a turbine assembly 522. The hydrokinetic torque coupling device 510 of FIGS. 43-51 corresponds substantially to the hydrokinetic torque coupling device 10 of FIGS. 1-8C, and only the portions of the turbine assembly 522, which differ, will therefore be explained in detail below.

The turbine assembly 522 of the sixth exemplary embodiment comprises a first turbine component 534 rotatable about the rotational axis X, and a second turbine component 536 non-moveably secured to the first turbine component 534 coaxially therewith, as best shown in FIGS. 43-45, 48 and 49. As illustrated, the first turbine component 534 includes a substantially annular first turbine shell member 538 and a plurality of first turbine blade members 40 integrally formed therewith and outwardly extending from the first turbine shell member 538 so as to face the impeller blades 25 of the impeller assembly 20. Preferably, the first turbine shell member 538 and the first turbine blade members 40 are made of a single or unitary component, but may be separate components fixedly (i.e., non-moveably) connected together.

Figure 44:
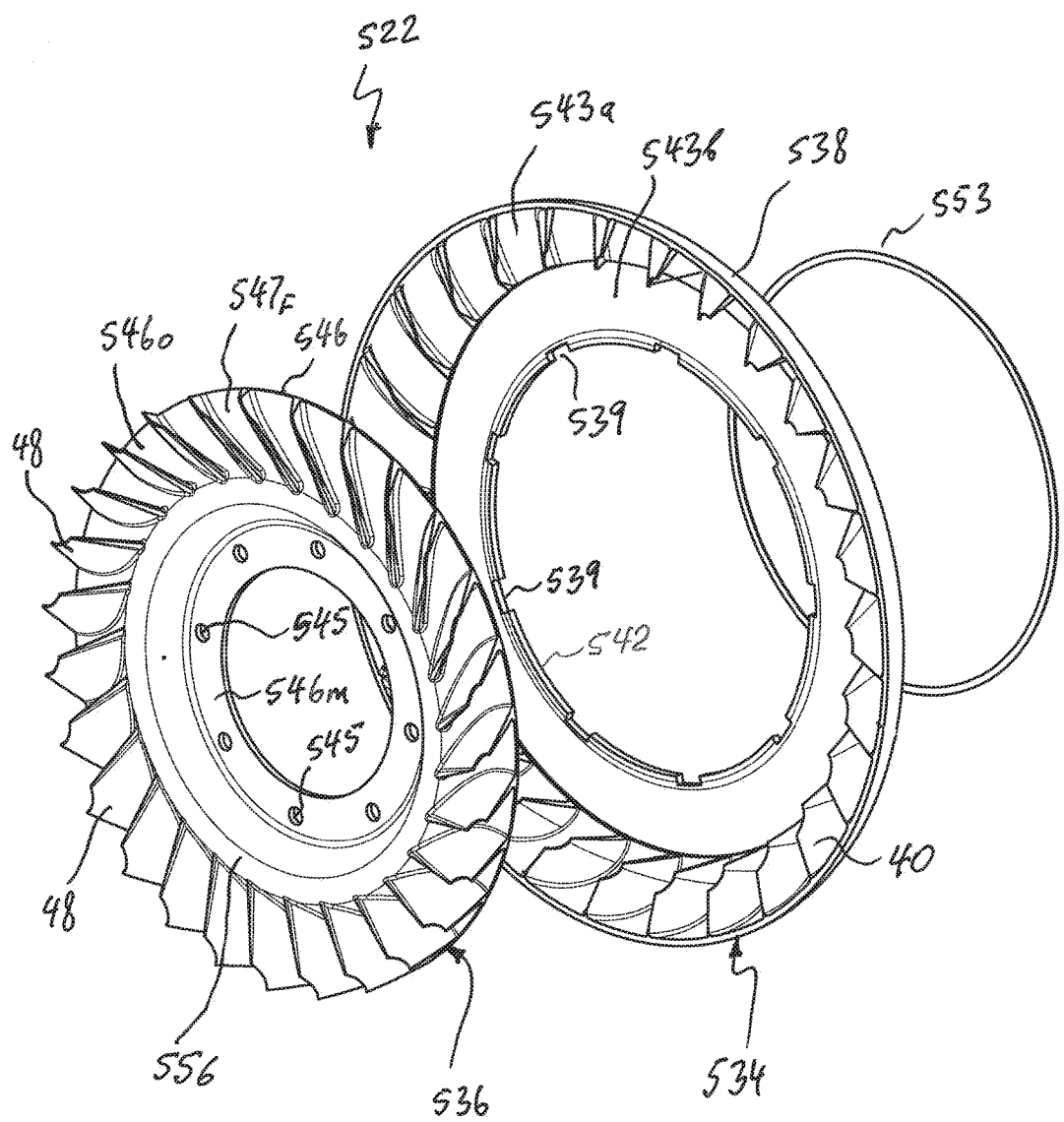
FIG. 44 is a front partial exploded perspective view of the turbine assembly in accordance with the sixth exemplary embodiment of the present invention.

The first turbine shell member 538 has a substantially annular, semi-toroidal (i.e., concave) inner surface 543a and a substantially annular support surface 543b located radially within the inner surface 543a of the first turbine shell member 538. Both the inner surface 543a and the support surface 543b of the first turbine shell member 538 are facing the impeller assembly 20. As best shown in FIG. 44, the turbine blade members 40 are integrally formed on and outwardly extend from the inner surface 543a of the first turbine shell member 538 of the first turbine component 534 of the turbine assembly 522. A radially inner peripheral edge 542 of the first turbine shell member 538 is provided with a plurality of circumferentially spaced, generally U-shaped cut-outs 539, as best shown in FIGS. 44 and 45.

Figure 45:
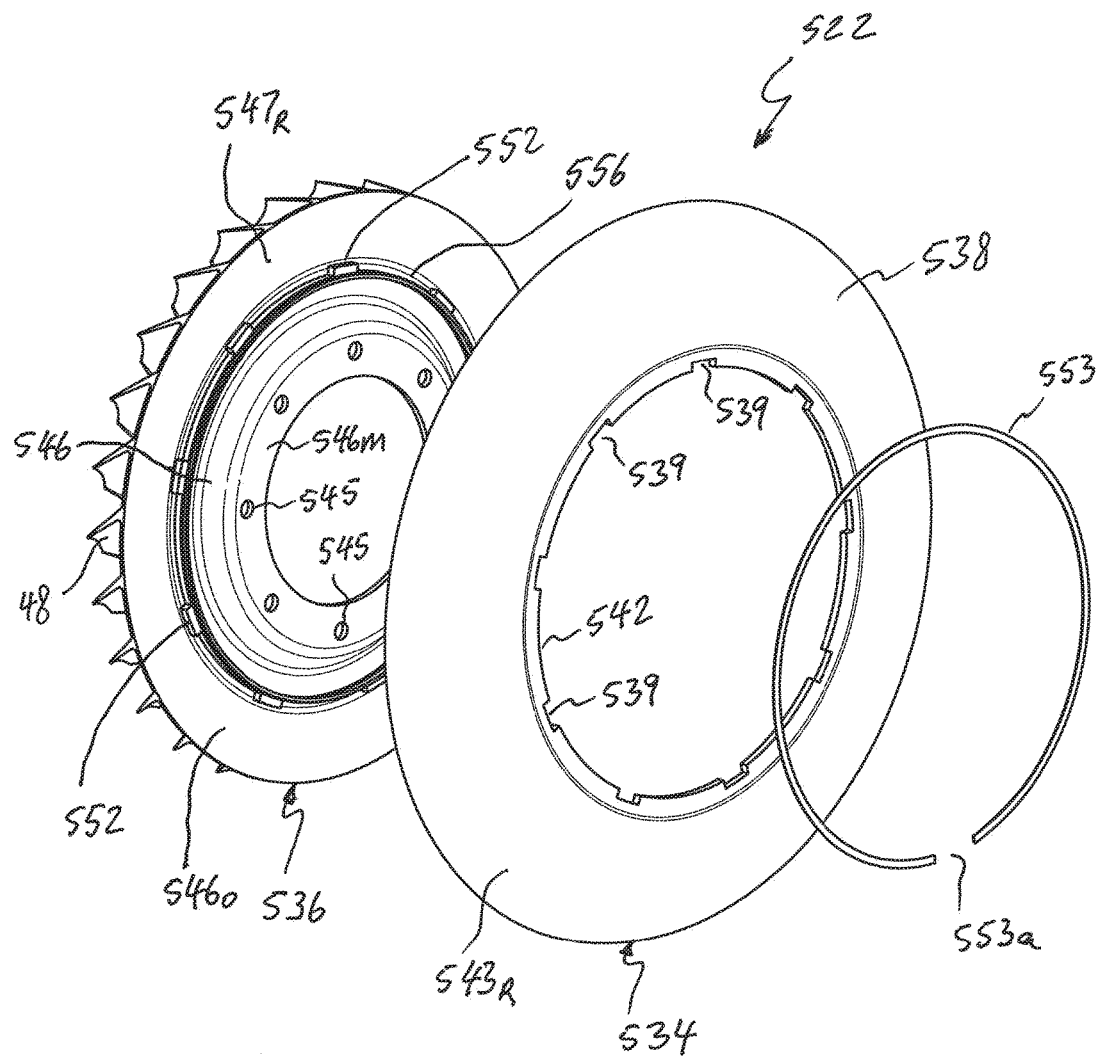
FIG. 45 is a rear partial exploded perspective view of the turbine assembly in accordance with the sixth exemplary embodiment of the present invention.
Figure 46:
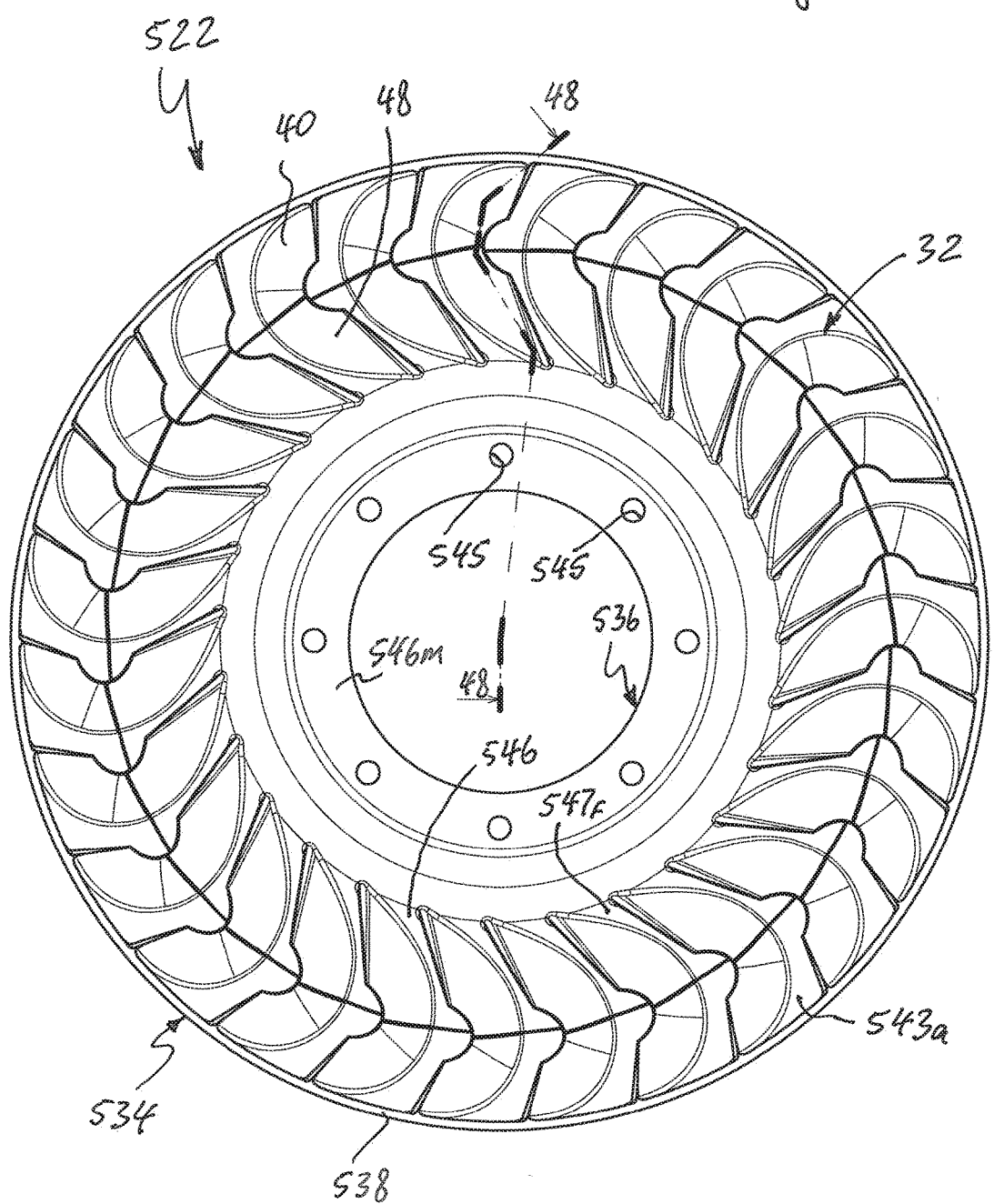
FIG. 46 is a front elevational view of the turbine assembly in accordance with the sixth exemplary embodiment of the present invention.
Figure 47:
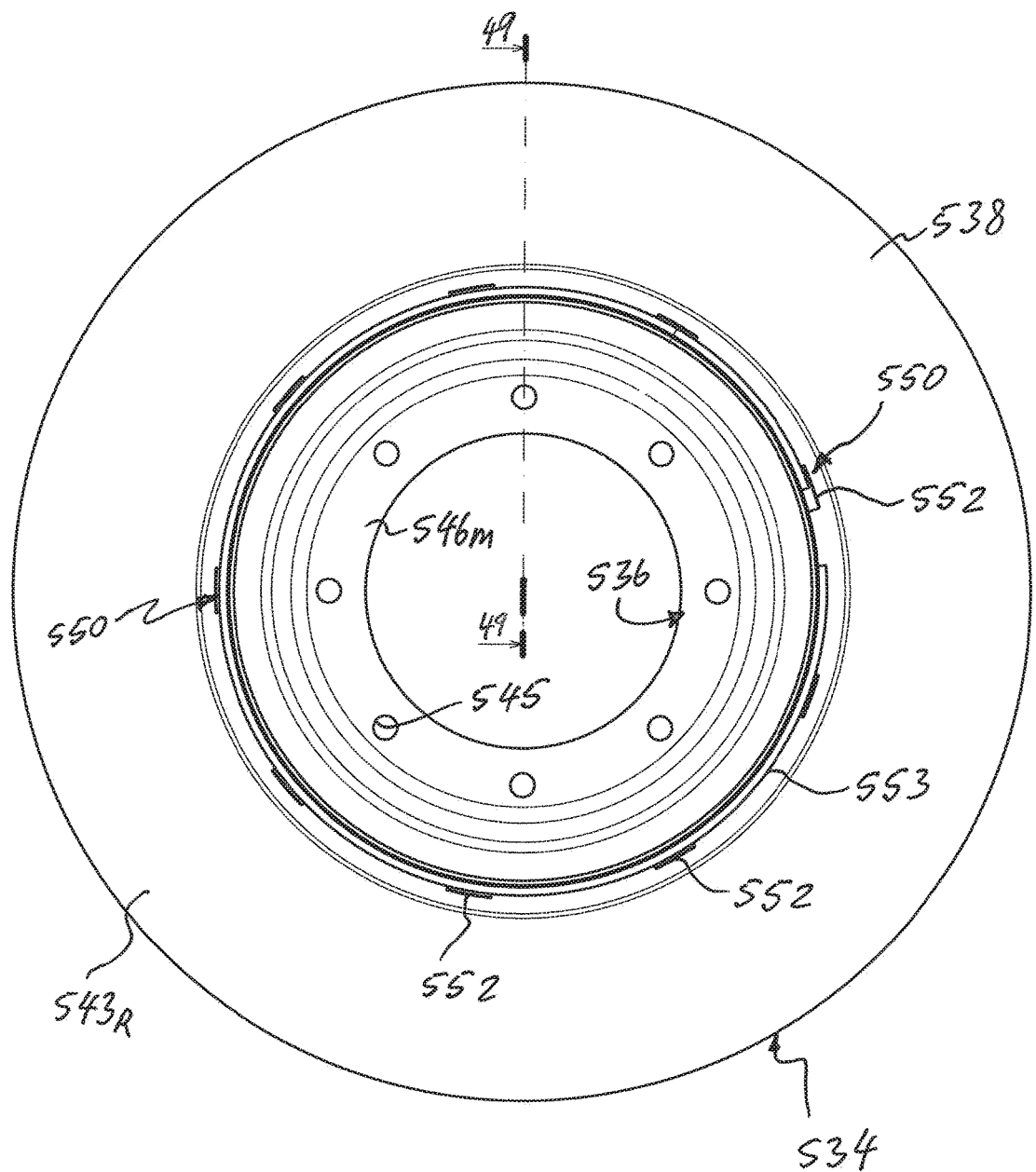
FIG. 47 is a rear elevational view of the turbine assembly in accordance with the sixth exemplary embodiment of the present invention.

As further illustrated in FIGS. 44 and 45, the second turbine component 536 includes a substantially annular second turbine shell member 546 and a plurality of second turbine blade members 48 integrally formed therewith and outwardly extending from the second turbine shell member 546 so as to face the impeller blades 25 of the impeller assembly 20. Preferably, the second turbine shell member 546 and the second turbine blade members 48 are made of a single or unitary component, but may be separate components fixedly (i.e., non-moveably) connected together.

The second turbine shell member 546 has a substantially annular, semi-toroidal radially outer portion 546o, a substantially annular base portion 556 located radially within the radially outer portion 546o, and a substantially annular mounting portion 546m located radially within the base portion 556 and the radially outer portion 546o of the second turbine shell member 546. The second turbine blade members 48 are integrally formed with the radially outer portion 546o of the second turbine shell member 546 and outwardly extend from an annular, substantially semi-toroidal (i.e., concave) inner surface $547_F$ of the second turbine shell member 546. The mounting portion 546m of the second turbine shell member 546 is provided with a plurality of circumferentially spaced holes 545. The second turbine shell member 546 is fixedly secured to the turbine hub 28 by the rivets 27 extending through the holes 545 in the mounting portion 546m of the second turbine shell member 546.

In the sixth exemplary embodiment of the present invention illustrated in FIGS. 43-51, the second turbine component 536 includes two or more of equiangulrly circumferentially (or angularly) spaced fasteners 550, as best shown in FIGS. 43, 47, 48 and 49. The fasteners 550 are configured to fixedly (i.e., non-moveably) secure the first turbine component 534 of the turbine assembly 522 to the second turbine component 536 thereof. A second turbine shell member 546 of the second turbine component 536 non-moveably engages a first turbine shell member 538 of the first turbine component 534 so as to define together a turbine shell 530 of the turbine assembly 522.

Each of the fasteners 550 according to the sixth exemplary embodiment of the present invention includes a fastener arm 552 integrally formed with the base portion 556 of the second turbine shell member 546 on an annular outer surface $547_R$ thereof so as to extend axially outward from the outer surface $547_R$ of the second turbine shell member 546 toward the first turbine shell member 538 of the first turbine component 534. Preferably, the fastener arm 552 extends substantially perpendicular to the outer surface $547_R$ of the second turbine shell member 546, or substantially parallel to the rotational axis X. Moreover, the fastener arms 552 are configured to axially extend through equiangularly disposed U-shaped cut-outs 539 formed in the radially inner peripheral edge 542 of the first turbine shell member 538 in order to non-rotatably secure the second turbine component 536 relative to the first turbine component 534. Specifically, a circumferential length of each of the fastener arms 552 substantially equals the circumferential length of each of the U-shaped cut-outs 539. Accordingly, as the fastener arms 552 of the second turbine component 536 extend through the U-shaped cut-outs 539 in the first turbine component 534, the relative angular movement between the first turbine component 534 and the second turbine component 536 is blocked.

Figure 52:
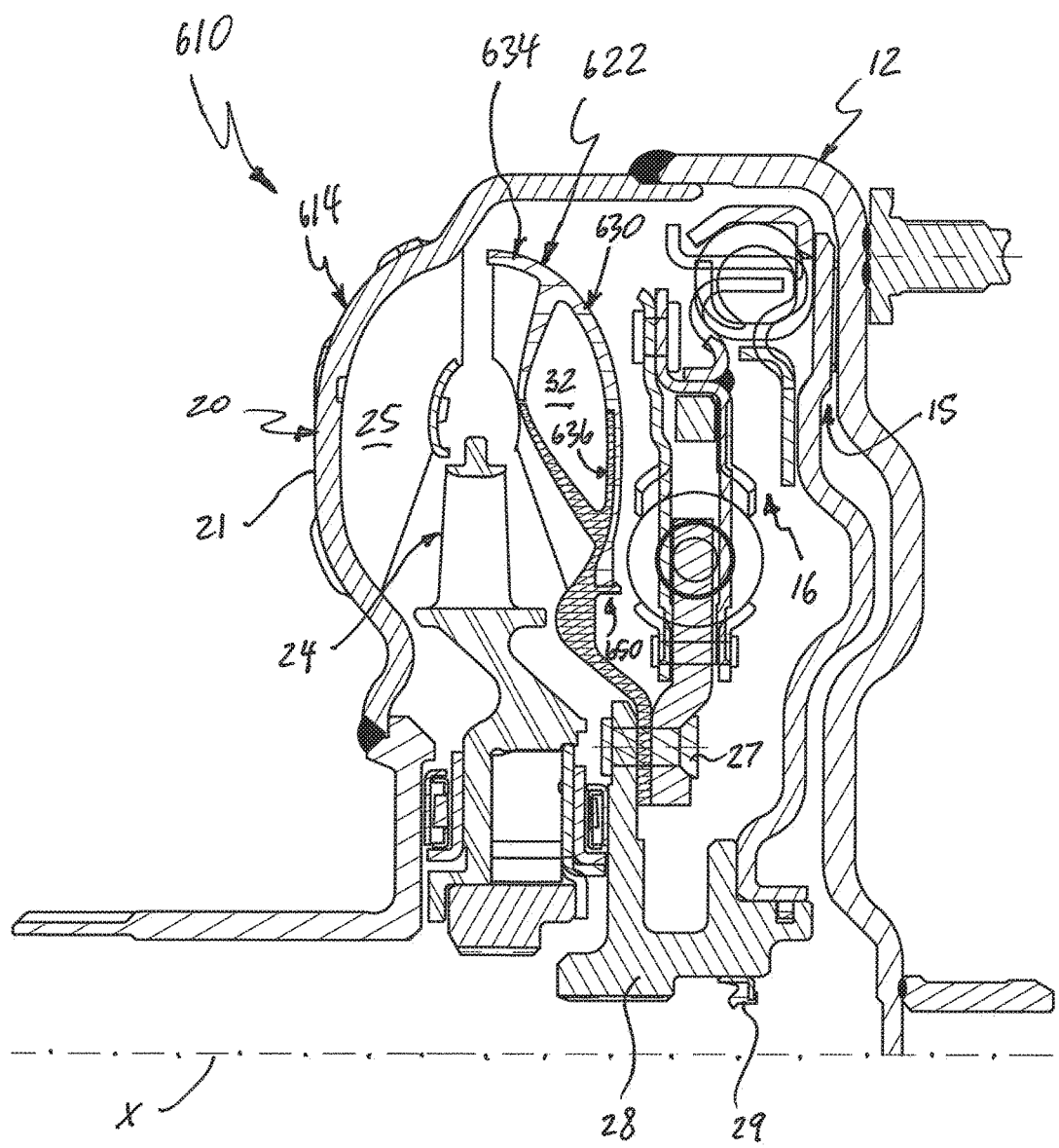
FIG. 52 is a fragmented half-view in axial section of a hydrokinetic torque coupling device with a turbine assembly in accordance with a seventh exemplary embodiment of the present invention.

Furthermore, an axially distal free end 552a of each of the fastener arms 552 is formed with a circumferentially extending groove 554 open radially outwardly from the rotational axis X, as best shown in FIGS. 51 and 52.

The turbine assembly 522 according to the sixth exemplary embodiment of the present invention further comprises a single slotted (or snap) ring 553 substantially coaxial (or concentric) with the rotational axis X. The slotted ring 553 is a radially expandable slotted ring (i.e., formed with a slot 553a shown in FIG. 45), such as a conventional snap ring or C-ring well known to those skilled in the art, and has axially opposite flat surfaces. As best shown in FIGS. 43, 48, 49 and 50, the slotted ring 553 is maintained radially over the fastener arms 552 and at least partially seated (disposed) in the grooves 554 of the fastener arms 552. As illustrated, the snap ring 553 is disposed between the rear surface $543_R$ of the first turbine shell member 538 and the axially distal free ends 552a of the fastener arms 552. The snap ring 553 is provided to retain axially the first and second turbine components 534 and 536, respectively, together. Thus, the first turbine component 534 and the second turbine component 536 are fixedly (i.e., non-moveably) secured one to another. The snap ring 553 can also be a "load" snap rings configured to exert an axial load (or force) to stack (or press) the first and second turbine components 534 and 536, respectively, together.

A method of securing the second turbine component 536 to the first turbine component 534 is as follows. First, the fastener arms 552 of the fasteners 550 on the second turbine component 536 are inserted into the cut-outs 539 of the first turbine component 534 until the axially distal free ends 552a of the fastener arms 552 with the grooves 554 pass (or clear) the edges of the cut-outs 539. Next, the slotted snap ring 553 is mounted into the grooves 554 of fastener arms 552. In this position, the slotted snap ring 553 positively engage the annular rear surface $543_R$ of the first turbine shell member 538 so that the annular outer surface $547_R$ of the second turbine shell member 546 engages the annular support surface 543b of the radially outer portion 542 of the first turbine shell member 538.

In a hydrokinetic torque coupling device 610 of a seventh exemplary embodiment illustrated in FIGS. 52-62, the turbine assembly 522 is replaced by a turbine assembly 622. The hydrokinetic torque coupling device 610 of FIGS. 52-62 corresponds substantially to the hydrokinetic torque coupling device 510 of FIGS. 43-51, and only the portions of the turbine assembly 622, which differ, will therefore be explained in detail below.

Figure 53:
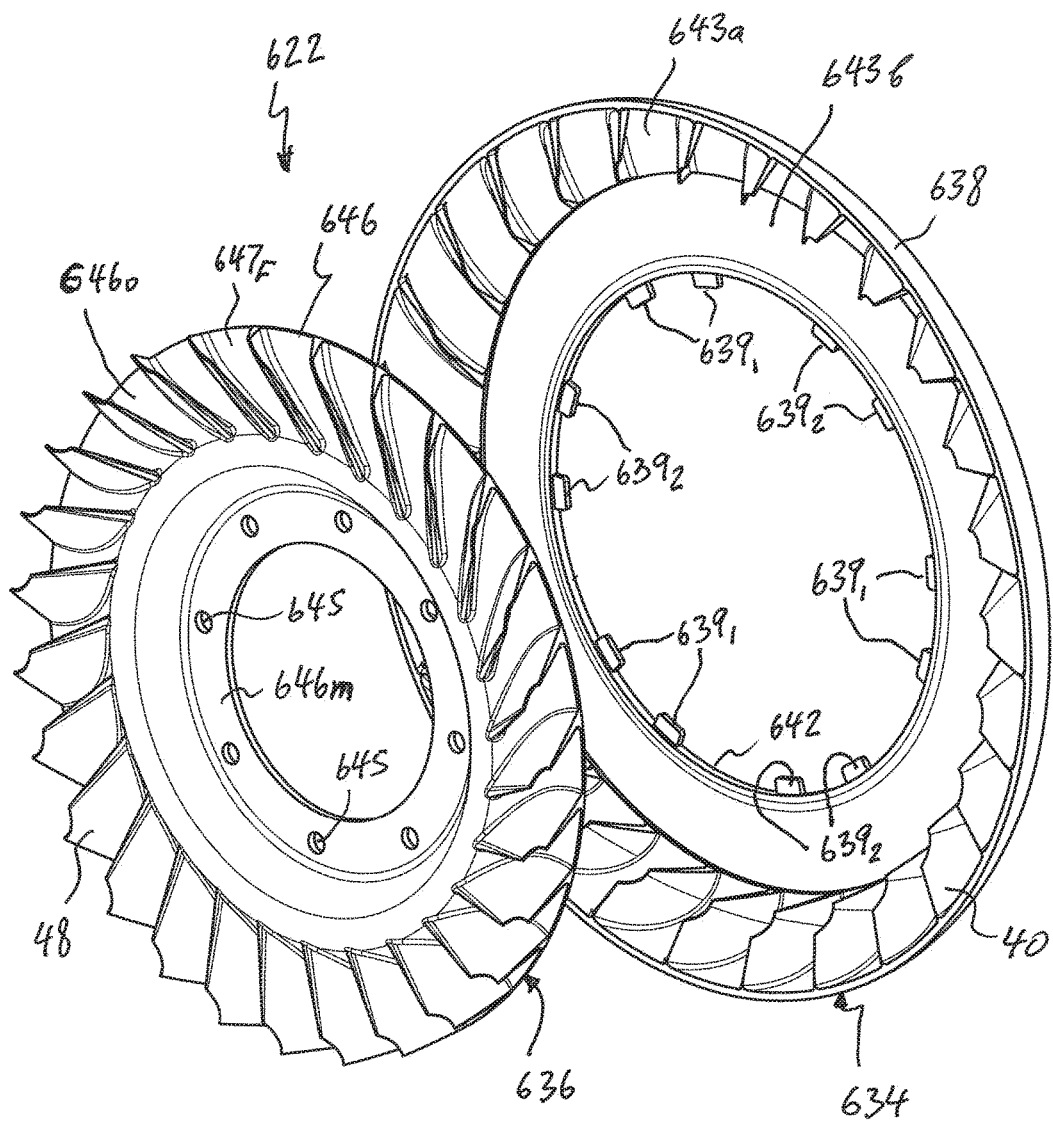
FIG. 53 is a front partial exploded perspective view of the turbine assembly in accordance with the seventh exemplary embodiment of the present invention.
Figure 54:
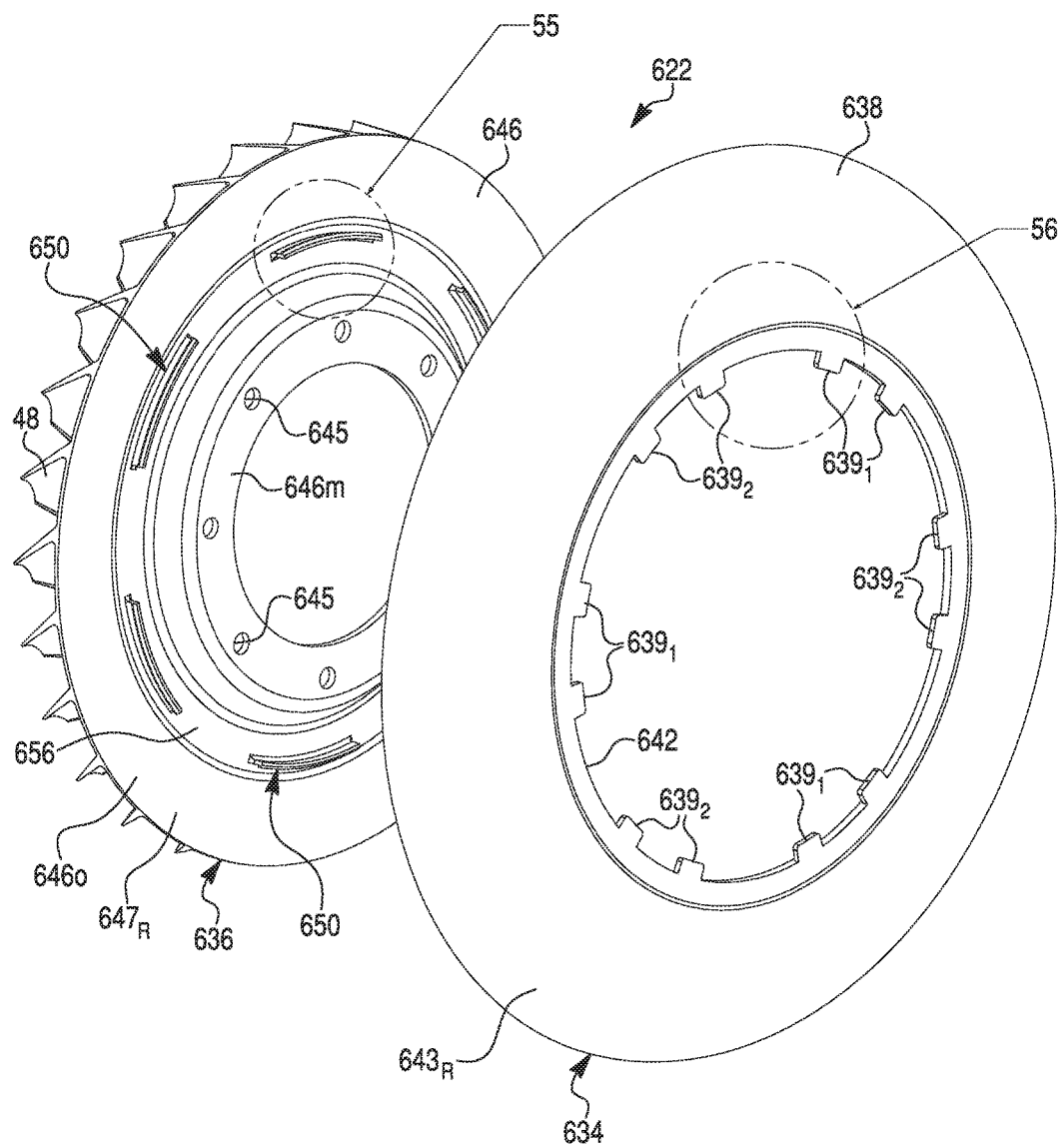
FIG. 54 is a rear partial exploded perspective view of the turbine assembly in accordance with the seventh exemplary embodiment of the present invention.

The turbine assembly 622 of the seventh exemplary embodiment comprises a first turbine component 634 rotatable about the rotational axis X, and a second turbine component 636 non-moveably secured to the first turbine component 634 coaxially therewith, as best shown in FIGS. 52-54. As illustrated, the first turbine component 634 includes a substantially annular first turbine shell member 638 and a plurality of first turbine blade members 40 integrally formed therewith and outwardly extending from the first turbine shell member 638 so as to face the impeller blades 25 of the impeller assembly 20. Preferably, the first turbine shell member 638 and the first turbine blade members 40 are made of a single or unitary component, but may be separate components fixedly (i.e., non-moveably) connected together.

The first turbine shell member 638 has a substantially annular, semi-toroidal (i.e., concave) inner surface 643a and a substantially annular support surface 643b located radially within the inner surface 643a of the first turbine shell member 638. Both the inner surface 643a and the support surface 643b of the first turbine shell member 638 are facing the impeller assembly 20. As best shown in FIG. 53, the turbine blade members 40 are integrally formed on and outwardly extend from the inner surface 643a of the first turbine shell member 638 of the first turbine component 634 of the turbine assembly 622. A radially inner peripheral edge 642 of the first turbine shell member 638 is provided with a plurality of circumferentially spaced pairs of protrusions, each pair including first and second protrusions $639_1$ and $639_2$, respectively. The pairs are equiangularly disposed about the edge 642. Each of the first and second protrusions $639_1$ and $639_2$ extending radially inwardly from the radially inner peripheral edge 642 of the first turbine shell member 638 and integrally formed with the first turbine shell member 638, as best shown in FIGS. 53 and 54. Moreover, the radially inner peripheral edge 642 of the first turbine shell member 638 is coaxial (or concentric) with the rotational axis X. According to the seventh exemplary embodiment, a circumferential distance between the first and second protrusions $639_1$ and $639_2$ is substantially bigger that a circumferential distance between the first protrusions $639_1$ or between the second protrusions $639_2$, as best shown in FIGS. 53 and 54.

As further illustrated in FIGS. 52-54, the second turbine component 636 includes a substantially annular second turbine shell member 646 and a plurality of second turbine blade members 48 integrally formed therewith and outwardly extending from the second turbine shell member 646 so as to face the impeller blades 25 of the impeller assembly 20. Preferably, the second turbine shell member 646 and the second turbine blade members 48 are made of a single or unitary component, but may be separate components fixedly (i.e., non-moveably) connected together.

In the seventh exemplary embodiment of the present invention illustrated in FIGS. 52-61, the second turbine component 636 includes two or more of circumferentially (or angularly) spaced snap fasteners 650, as best shown in FIGS. 52, 54, 55, 56, 58 and 61. The snap fasteners 650 are configured to fixedly (i.e., non-moveably) secure the first turbine component 634 of the turbine assembly 622 to the second turbine component 636 thereof. A second turbine shell member 646 of the second turbine component 636 non-moveably engages a first turbine shell member 638 of the first turbine component 634 so as to define together a turbine shell 630 of the turbine assembly 622.

Figure 55:
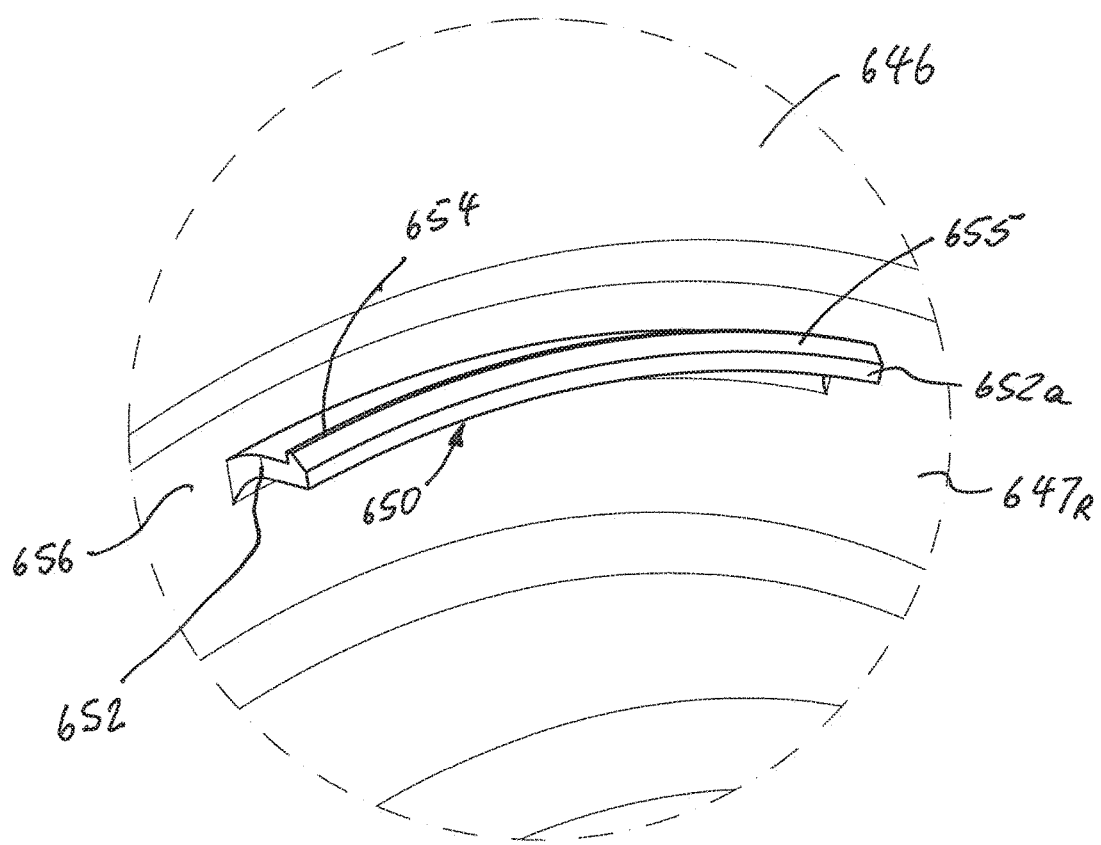
FIG. 55 is an enlarged view of a fragment of the turbine assembly shown in the circle "55" of FIG. 54.
Figure 56:
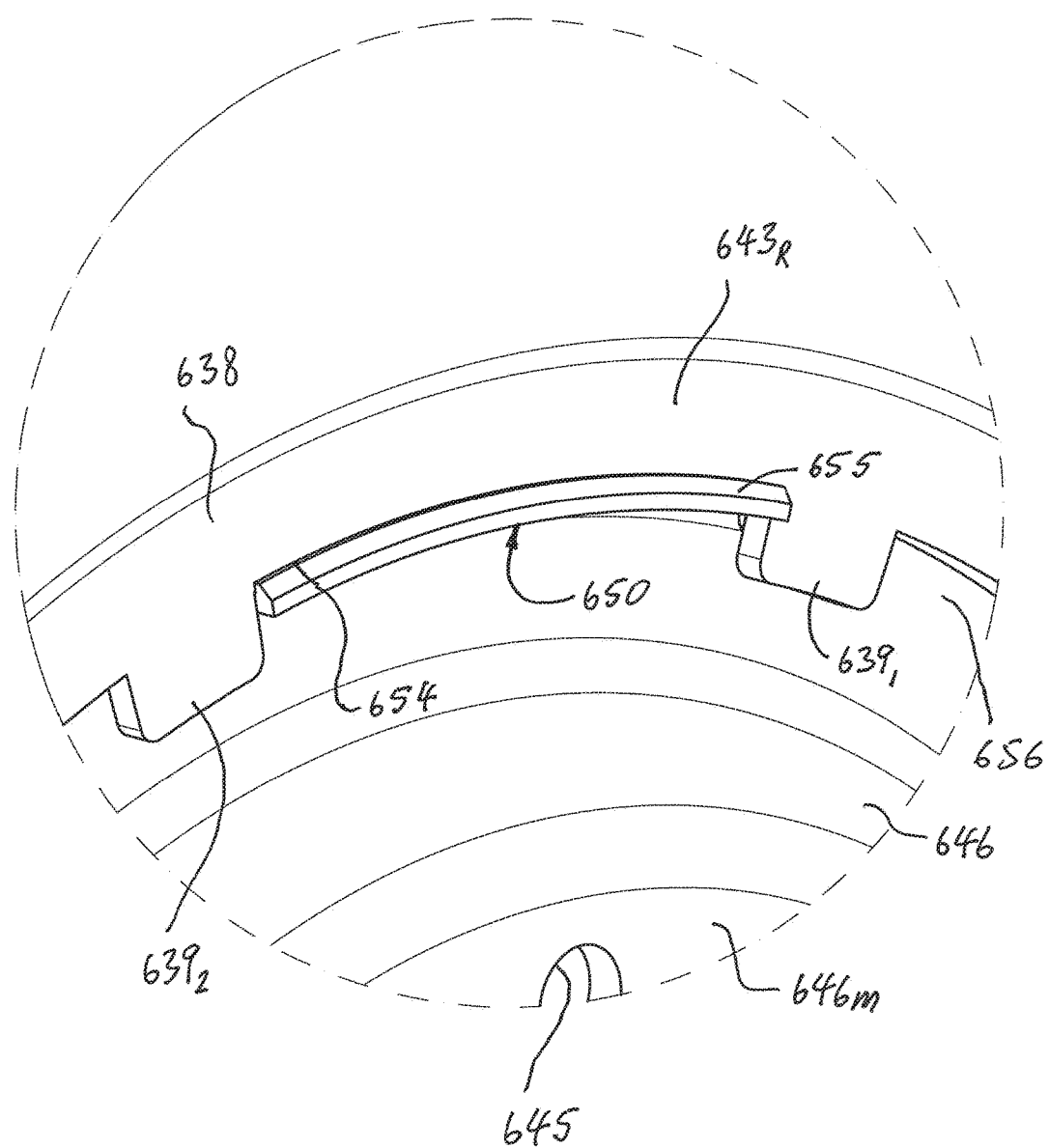
FIG. 56 is an enlarged view of a fragment of the turbine assembly shown in the circle "56" of FIG. 54 including snap fasteners fixedly securing the first turbine component of the turbine assembly to the second turbine component thereof.
Figure 57:
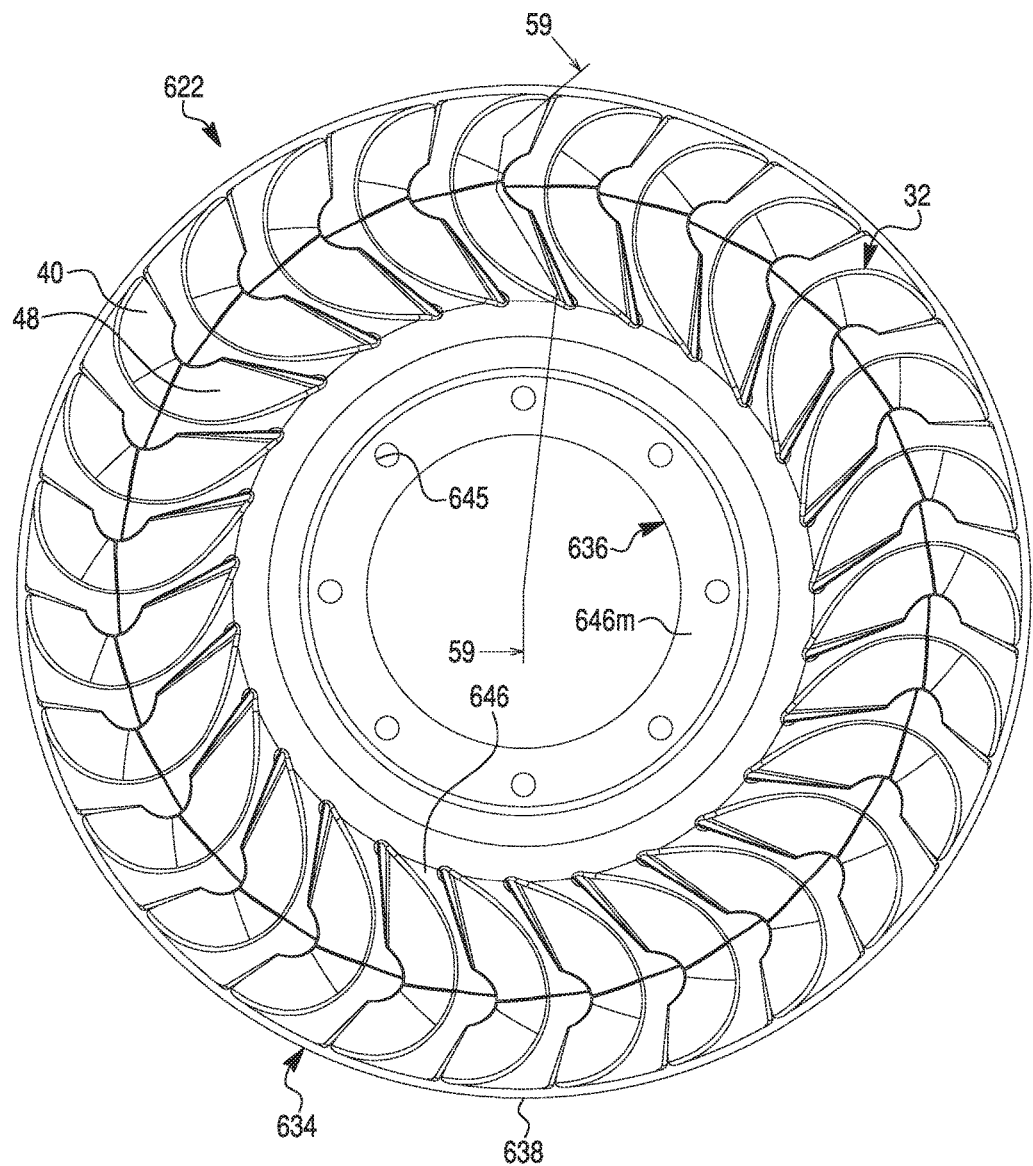
FIG. 57 is a front elevational view of the turbine assembly in accordance with the seventh exemplary embodiment of the present invention.
Figure 58:
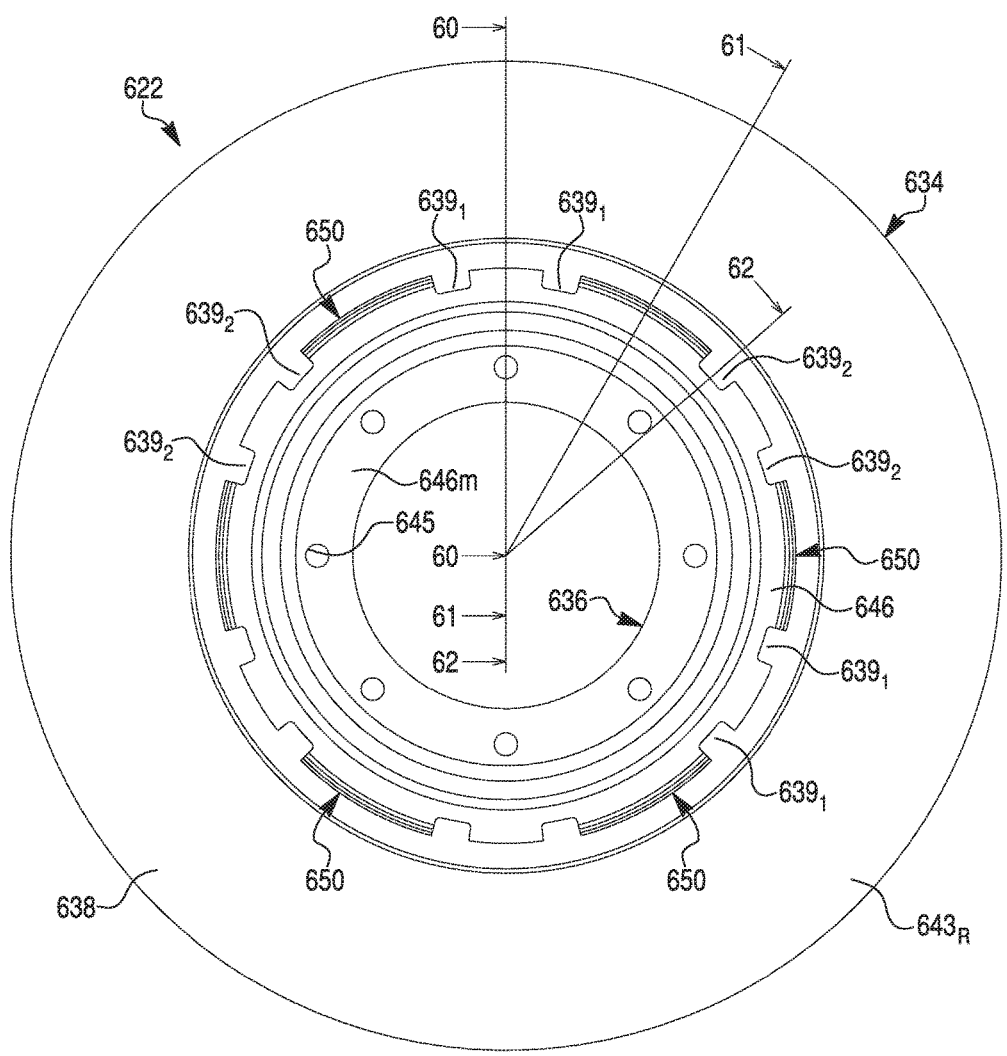
FIG. 58 is a rear elevational view of the turbine assembly in accordance with the seventh exemplary embodiment of the present invention.
Figure 61:
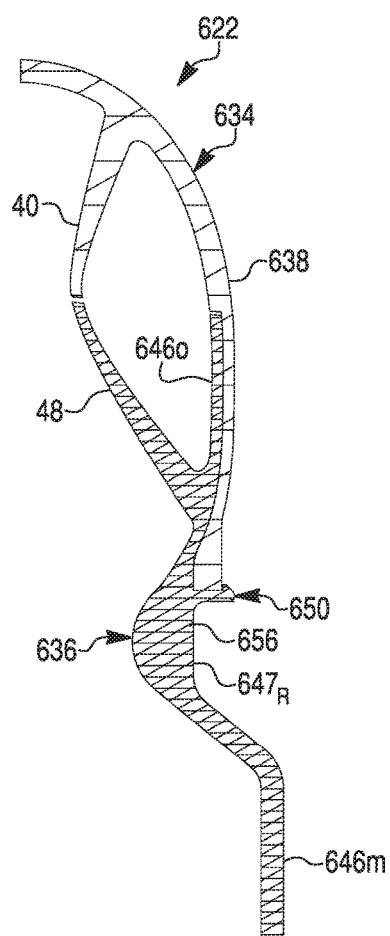
FIG. 61 is a partial sectional view the turbine assembly taken along the line 61-61 in FIG. 58.
Figure 62:
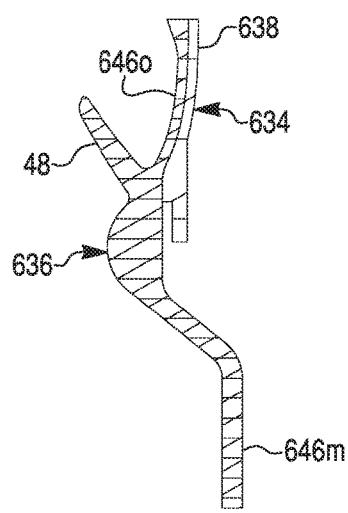
FIG. 62 is a partial sectional view the turbine assembly taken along the line 62-62 in FIG. 58.

Each of the snap fasteners 650 according to the seventh exemplary embodiment of the present invention includes a resilient snap arm 652 integrally formed with the base portion 656 of the second turbine shell member 646 on an annular outer surface $647_R$ thereof so as to extend axially outward from the outer surface $647_R$ of the second turbine shell member 646 toward the first turbine shell member 638 of the first turbine component 634, as best shown in FIG. 55. Preferably, the snap arms 652 extend substantially perpendicularly to the outer surface $647_R$ of the second turbine shell member 646, or substantially parallel to the rotational axis X. Also, each of the snap arms 652 extends substantially circumferentially (or angularly). In other words, each of the snap arms 652 is a circular arc (i.e., part of a circle) coaxial (or concentric) with the rotational axis X. Moreover, a radius of the radially inner peripheral edge 642 of the first turbine shell member 638 and a radius of a radially outer peripheral surface of each of the snap arms 652 are substantially equal to each other.

Furthermore, the snap arms 652 are configured to axially extend between the first and second protrusions $639_1$ and $639_2$ formed on the radially inner peripheral edge 642 of the first turbine shell member 638 in order to non-rotatably secure the second turbine component 636 relative to the first turbine component 634. Specifically, a circumferential (or angular) length of each of the snap arms 652 substantially equals to the circumferential distance between the first and second protrusions $639_1$ and $639_2$ of the first turbine component 634. Accordingly, as the snap arms 652 of the second turbine component 636 extend between the first and second protrusions $639_1$ and $639_2$ of the first turbine component 634, the relative angular movement between the first turbine component 634 and the second turbine component 636 is blocked.

Furthermore, an axially distal free end 652a of each of the snap arms 652 is formed with a barb or ledge 654 extending radially outwardly from the axially distal end 652a of the snap arm 652, as best shown in FIG. 55. Moreover, as best shown in FIG. 55, each of the barbs 654 has an outwardly tapered exterior end surface 655 forming a ramp surface. The snap arms 652 are elastically deformable in the radial direction. The second turbine shell member 646 of the second turbine component 636 is fixedly (i.e., non-moveably) secured to the first turbine shell member 638 of the first turbine component 634 by the snap fasteners 650 extending between the first and second protrusions $639_1$ and $639_2$ of the first turbine component 634.

A method of securing the second turbine component 636 to the first turbine component 634 is as follows. First, the snap arms 652 of the snap fasteners 650 on the second turbine component 636 are inserted into spaces between the first and second protrusions $639_1$ and $639_2$ of the first turbine component 634. The snap arms 652 are pressed toward the first turbine component 634, causing the snap arms 652 to resiliently deform inwardly as a result of the pressure applied by the radially inner peripheral edge 642 of the first turbine component 634 against the tapered exterior end surfaces 655 of the barbs 654 of the snap fasteners 650. During insertion, the outwardly inclined tapered exterior end surfaces 655 of the barbs 654 also act to guide the snap arms 652 into the spaces between the first and second protrusions $639_1$ and $639_2$ of the first turbine component 634. The snap arms 652 of the snap fasteners 650 advance toward the first turbine component 634 until the snap arms 652 spring back to their original or undeformed position as soon as the barbs 654 pass (or clear) the radially inner peripheral edge 642 of the first turbine component 634, i.e. until the barbs 654 of the snap fasteners 650 of the second turbine component 636 positively engage an annular rear surface $643_R$ of the first turbine shell member 638 so that the annular outer surface $647_R$ of the second turbine shell member 646 engages the annular support surface 643b of the first turbine shell member 638.

In a hydrokinetic torque coupling device of a eighth exemplary embodiment illustrated in FIGS. 63-72, the turbine assembly 622 is replaced by a turbine assembly 722. The hydrokinetic torque coupling device of FIGS. 63-72 corresponds substantially to the hydrokinetic torque coupling device 610 of FIGS. 52-62, and only the portions of the turbine assembly 722, which differ, will therefore be explained in detail below.

In the eighth exemplary embodiment of the present invention illustrated in FIGS. 63-72, a second turbine component 736 includes two or more of circumferentially (or angularly) spaced snap fasteners 750, as best shown in FIGS. 64-66, 68, 71 and 72. The snap fasteners 750 are configured to fixedly (i.e., non-moveably) secure a first turbine component 734 of the turbine assembly 722 to the second turbine component 736 thereof. A second turbine shell member 746 of the second turbine component 736 non-moveably engages a first turbine shell member 738 of the first turbine component 734 so as to define together a turbine shell of the turbine assembly 722.

The turbine assembly 722 of the eighth exemplary embodiment comprises a first turbine component 734 rotatable about the rotational axis X, and a second turbine component 736 non-moveably secured to the first turbine component 734 coaxially therewith, as best shown in FIGS. 63-64 and 68-72. As illustrated, the first turbine component 734 includes a substantially annular first turbine shell member 738 and a plurality of first turbine blade members 40 integrally formed therewith and outwardly extending from the first turbine shell member 738 so as to face the impeller blades 25 of the impeller assembly 20. Preferably, the first turbine shell member 738 and the first turbine blade members 40 are made of a single or unitary component, but may be separate components fixedly (i.e., non-moveably) connected together.

Figure 63:
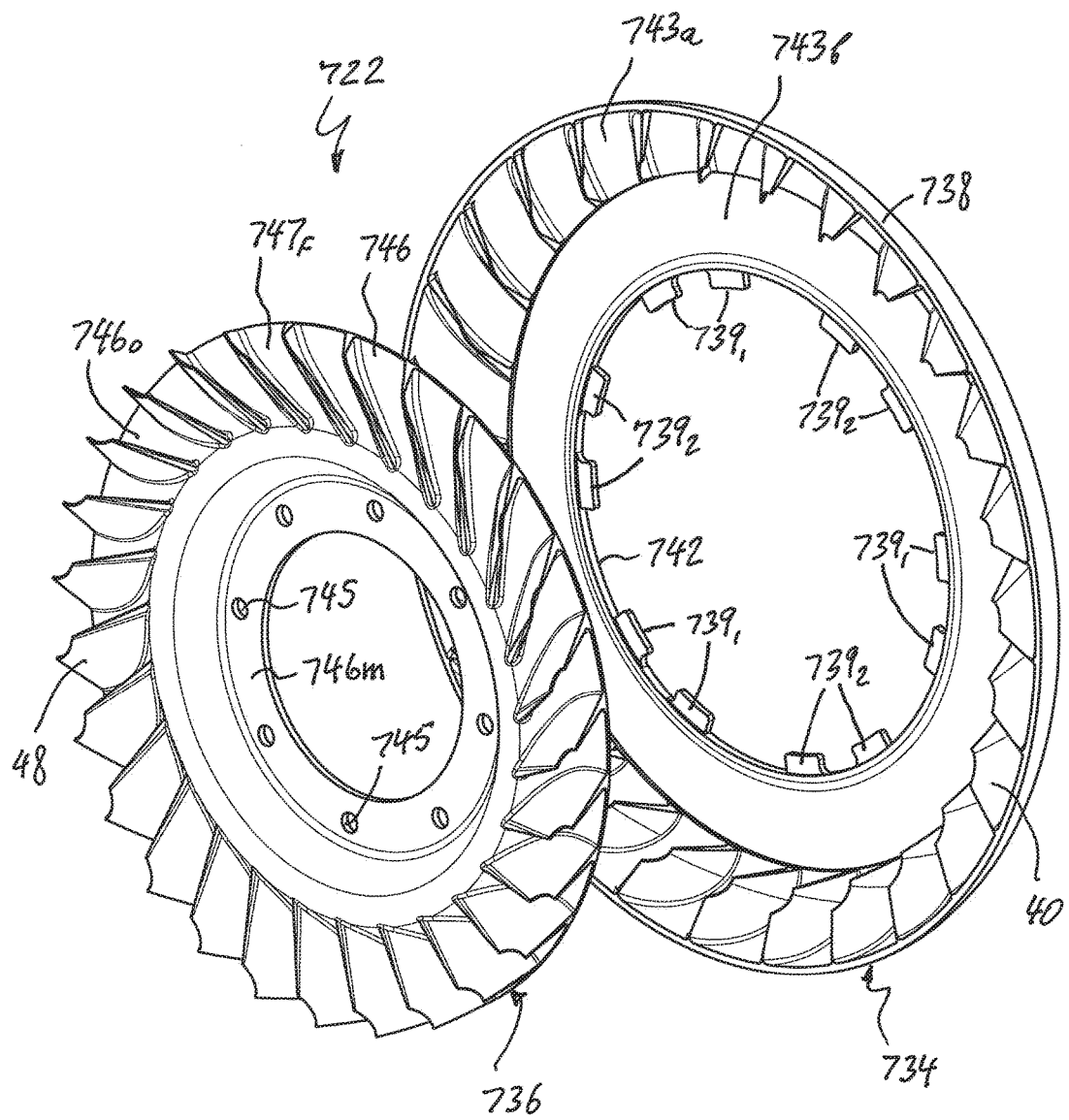
FIG. 63 is a front partial exploded perspective view of the turbine assembly in accordance with the eighth exemplary embodiment of the present invention.
Figure 64:
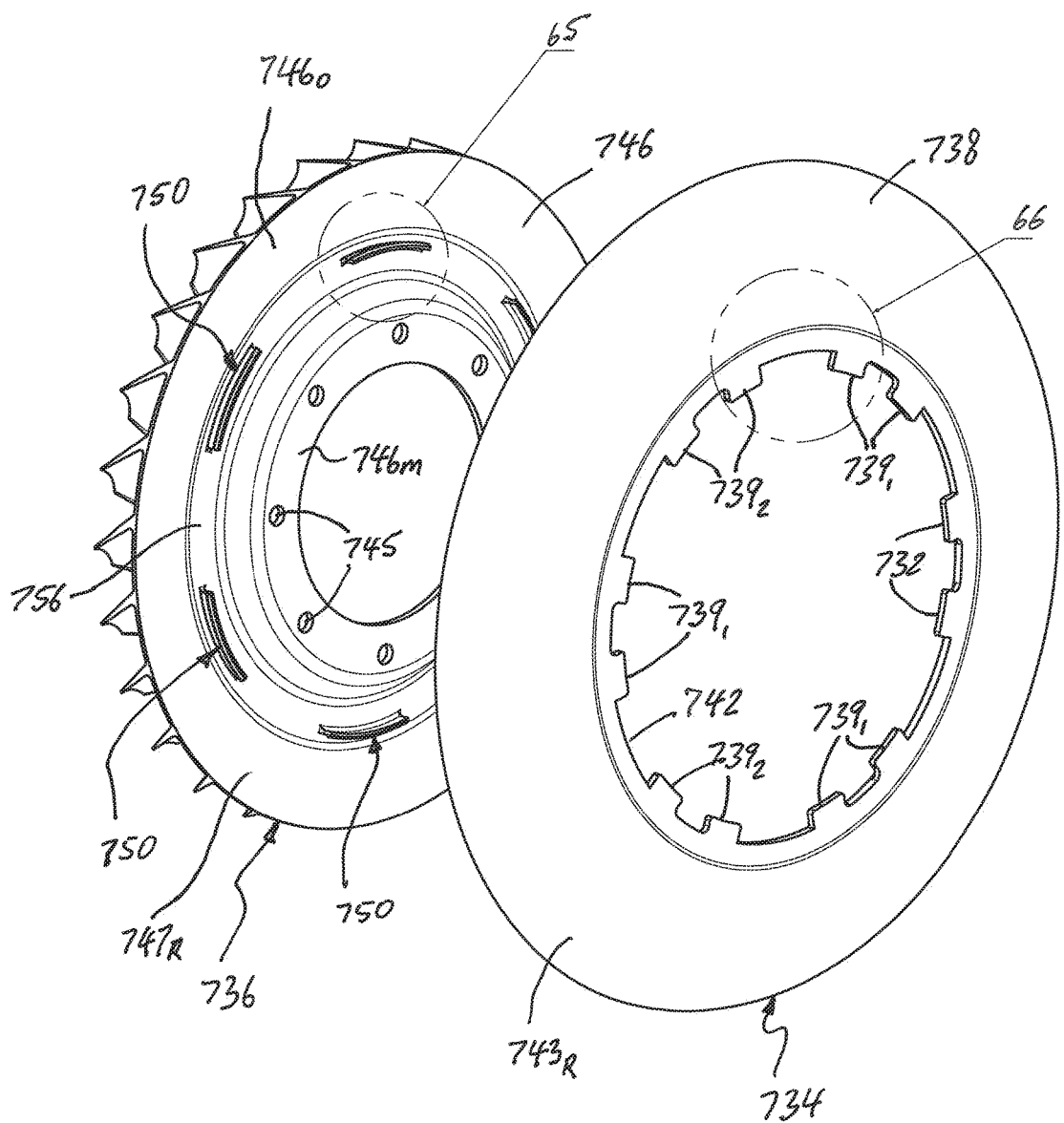
FIG. 64 is a rear partial exploded perspective view of the turbine assembly in accordance with the eighth exemplary embodiment of the present invention.

A radially inner peripheral edge 742 of the first turbine shell member 738 is provided with a plurality of circumferentially spaced pairs of protrusions, each pair including first and second protrusions $739_1$ and $739_2$, respectively. Each of the first and second protrusions $739_1$ and $739_2$ extending radially inwardly extending from the radially inner peripheral edge 742 of the first turbine shell member 738 and integrally formed with the first turbine shell member 738, as best shown in FIGS. 63 and 64. Moreover, the radially inner peripheral edge 742 of the first turbine shell member 738 is coaxial (or concentric) with the rotational axis X, as best shown in FIG. 68. According to the seventh exemplary embodiment, a circumferential distance between the first and second protrusions $739_1$ and $739_2$ is substantially bigger that a circumferential distance between the first protrusions $739_1$ or between the second protrusions $739_2$, as best shown in FIGS. 63, 64 and 68.

As further illustrated in FIGS. 63-64 and 68-72, the second turbine component 736 includes a substantially annular second turbine shell member 746 and a plurality of second turbine blade members 48 integrally formed therewith and outwardly extending from the second turbine shell member 746 so as to face the impeller blades 25 of the impeller assembly 20. Preferably, the second turbine shell member 746 and the second turbine blade members 48 are made of a single or unitary component, but may be separate components fixedly (i.e., non-moveably) connected together.

Figure 65:
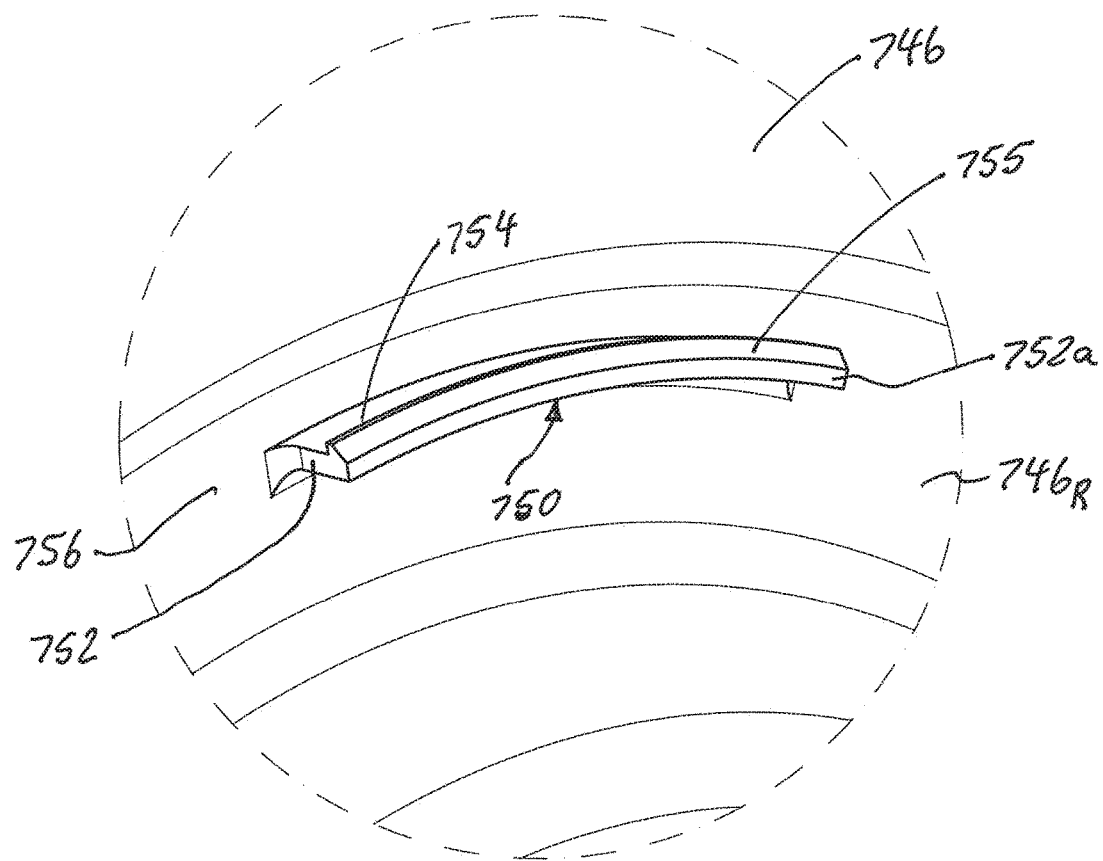
FIG. 65 is an enlarged view of a fragment of the turbine assembly shown in the circle "65" of FIG. 64.
Figure 66:
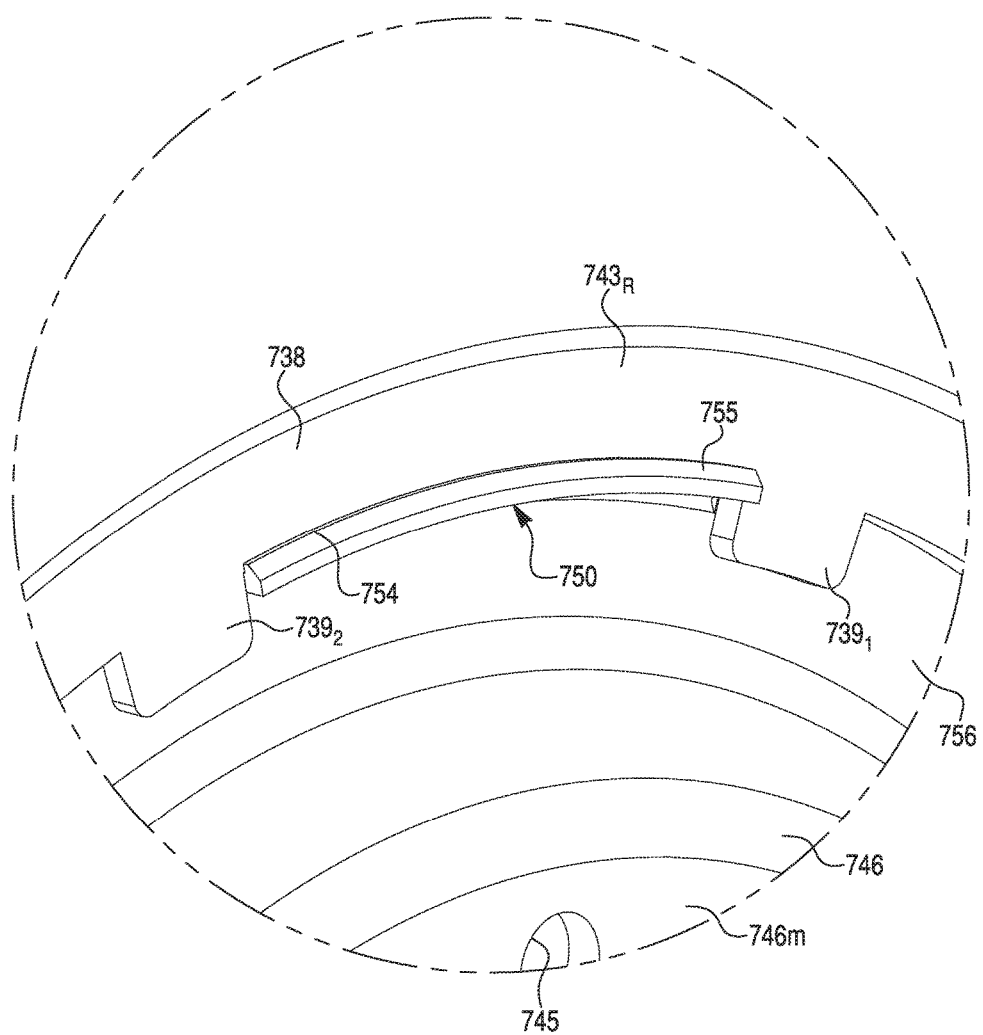
FIG. 66 is an enlarged view of a fragment of the turbine assembly shown in the circle "66" of FIG. 64 including snap fasteners fixedly securing the first turbine component of the turbine assembly to the second turbine component thereof.
Figure 67:
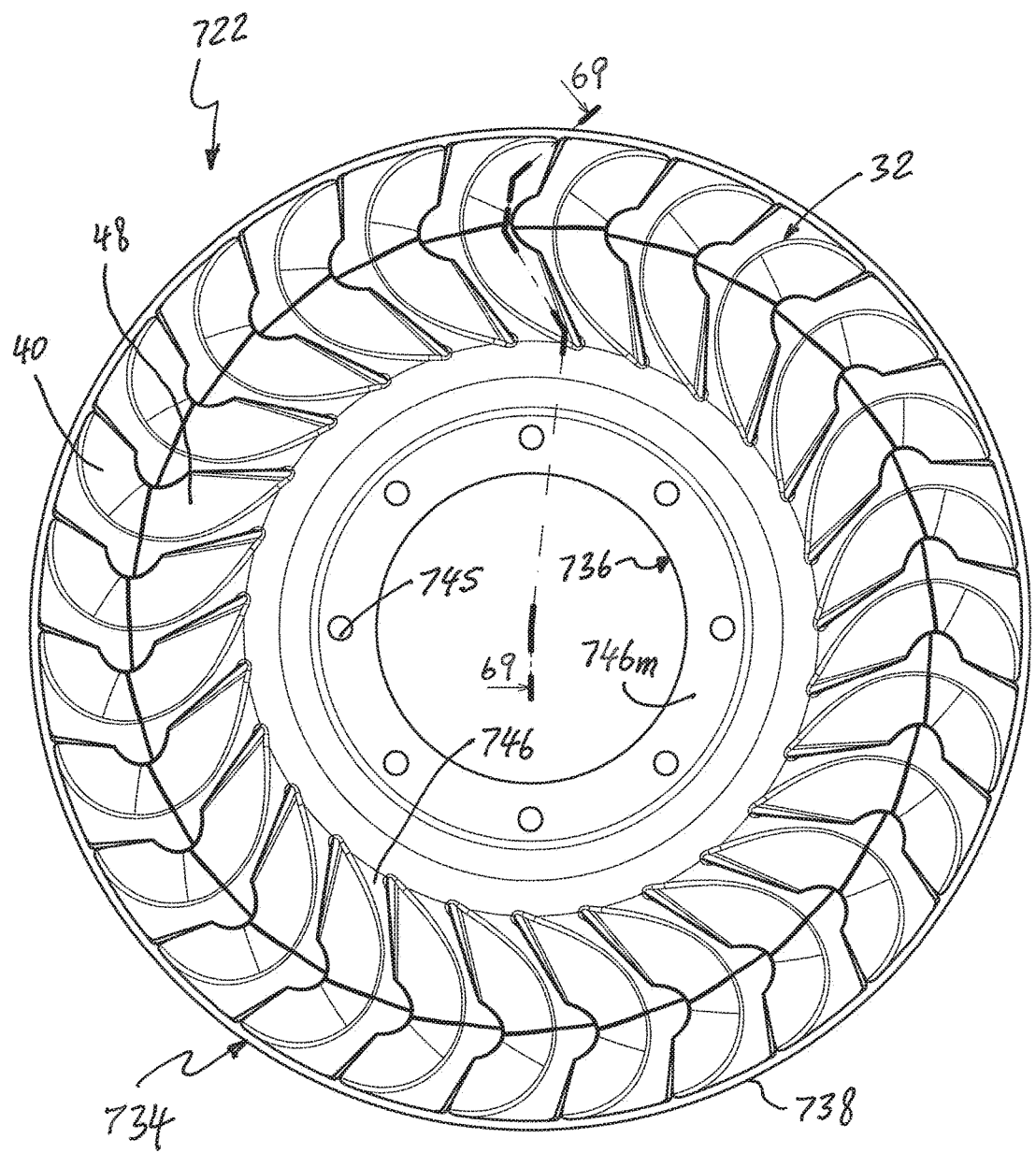
FIG. 67 is a front elevational view of the turbine assembly in accordance with the eighth exemplary embodiment of the present invention.

Each of the snap fasteners 750 according to the eighth exemplary embodiment of the present invention includes a resilient snap arm 752 integrally formed with a base portion 756 of the second turbine shell member 746 on an annular outer surface $747_R$ thereof so as to extend axially outward from the outer surface $747_R$ of the second turbine shell member 746 toward the first turbine shell member 738 of the first turbine component 734, as best shown in FIG. 65. Preferably, the snap arms 752 extend substantially perpendicularly to the outer surface $747_R$ of the second turbine shell member 746, or substantially parallel to the rotational axis X. Also, each of the snap arms 752 extends substantially circumferentially (or angularly). In other words, each of the snap arms 752 is a circular arc (i.e., part of a circle) but not coaxial with the rotational axis X, as best shown in FIG. 68. Specifically, a radius $R_1$ of the radially inner peripheral edge 742 of the first turbine shell member 738 is substantially different than a radius $R_2$ of a radially outer peripheral surface of each of the snap arms 752. Moreover, as best shown in FIG. 68, the radii $R_1$ and $R_2$ have different centers radially spaced from each other to a distance S.

Moreover, the snap arms 752 are configured to axially extend between the first and second protrusions $739_1$ and $739_2$ formed on the radially inner peripheral edge 742 of the first turbine shell member 738 in order to non-rotatably secure the second turbine component 736 relative to the first turbine component 734. Specifically, a circumferential (or angular) length of each of the snap arms 752 substantially equals to the circumferential distance between the first and second protrusions $739_1$ and $739_2$ of the first turbine component 734. Accordingly, as the snap arms 752 of the second turbine component 736 extend between the first and second protrusions $739_1$ and $739_2$ of the first turbine component 734, the relative angular movement between the first turbine component 734 and the second turbine component 736 is blocked.

Furthermore, an axially distal free end 752a of each of the snap arms 752 is formed with a barb or ledge 754 extending radially outwardly from the axially distal end 752a of the snap arm 752, as best shown in FIG. 65. Moreover, as best shown in FIG. 65, each of the barbs 754 has an outwardly tapered exterior end surface 755 forming a ramp surface. The snap arms 752 are elastically deformable in the radial direction. The second turbine shell member 746 of the second turbine component 736 is fixedly (i.e., non-moveably) secured to the first turbine shell member 738 of the first turbine component 734 by the snap fasteners 750 extending between the first and second protrusions $739_1$ and $739_2$ of the first turbine component 734.

A method of securing the second turbine component 736 to the first turbine component 734 is as follows. First, the snap arms 752 of the snap fasteners 750 on the second turbine component 736 are inserted into spaces between the first and second protrusions $739_1$ and $739_2$ of the first turbine component 734. The snap arms 752 are pressed toward the first turbine component 734, causing the snap arms 752 to resiliently deform inwardly as a result of the pressure applied by the radially inner peripheral edge 742 of the first turbine component 734 against the tapered exterior end surfaces 755 of the barbs 754 of the snap fasteners 750. During insertion, the outwardly inclined tapered exterior end surfaces 755 of the barbs 754 also act to guide the snap arms 752 into the spaces between the first and second protrusions $739_1$ and $739_2$ of the first turbine component 734. The snap arms 752 advance toward the first turbine component 734 until the snap arms 752 spring back to their original or undeformed position as soon as the barbs 754 pass (or clear) the radially inner peripheral edge 742 of the first turbine component 734, i.e. until the barbs 754 of the snap fasteners 750 of the second turbine component 736 positively engage an annular rear surface $743_R$ of the first turbine shell member 738 so that the annular outer surface $747_R$ of the second turbine shell member 746 engages the annular support surface 743b of the first turbine shell member 738. As the snap arms 752 are not coaxial with the rotational axis X, the deformation of the snap arms 752 during assembly of the turbine assembly 722 is less and stress and plastic deformation lower on distal ends (extremities) of the snap arms 752, then during the assembly of the turbine assembly 622 of the seventh exemplary embodiment.

Therefore, the present invention provides a novel turbine assembly for a hydrokinetic torque converter and method for assembling thereof. The turbine assembly of the present invention has light weight and reduced inertia that both increase launching performance and reduce exhaust emissions of the engine, allows greater flexibility in design for improved mass and strength optimization compared to turbine assemblies of conventional hydrokinetic torque converters.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A turbine assembly for a hydrokinetic torque converter, the turbine assembly rotatable about a rotational axis and comprising:
    a first turbine component including a first turbine shell member coaxial with the rotational axis; and
    a second turbine component formed separately from the first turbine component and including a second turbine shell member non-moveably secured to the first turbine shell member substantially coaxially therewith so that the second turbine shell member overlaps the first turbine shell member;
    the first turbine component having a plurality of first turbine blade members integrally formed with and outwardly extending from the first turbine shell member;
    the second turbine shell member having an outer surface non-moveably engaging the first turbine shell member and a concave inner surface disposed axially opposite to the outer surface of the second turbine shell member;
    the second turbine component including a plurality of second turbine blade members integrally formed with and outwardly extending from the second turbine shell member;
    each of the first turbine blade members is oriented adjacent to one of the second turbine blade members so as to define together a turbine blade of the turbine assembly outwardly extending from the turbine shell of the turbine assembly.

2. The turbine assembly as defined in claim 1, wherein at least one of the first turbine shell member and the second turbine shell member has a variable thickness.

3. The turbine assembly as defined in claim 1, wherein at least the first turbine blade members or the second turbine blade members have variable thickness.

4. The turbine assembly as defined in claim 1, further comprising a plurality of fasteners non-moveably securing the second turbine component to the first turbine component.

5. The turbine assembly as defined in claim 4, wherein each of the fasteners includes at least one fastener arm integrally formed with the second turbine component and extending axially outward from an outer surface of the second turbine component toward the first turbine component.

6. The turbine assembly as defined in claim 5, wherein each of the fasteners includes a single cylindrical fastener arm integrally formed with the second turbine component and extending axially outward from the outer surface of the second turbine component toward the first turbine component.

7. The turbine assembly as defined in claim 6, wherein the cylindrical fastener arm is formed with at least one barb extending outwardly from an axially distal end of the cylindrical fastener arm, wherein the axially distal end of the cylindrical fastener arm axially extends through the first turbine component, and wherein the at least one barb positively engages an annular rear surface of the first turbine component.

8. The turbine assembly as defined in claim 5, wherein each of the fasteners includes a plurality of snap arms integrally formed with the second turbine component and extending axially outward from the outer surface of the second turbine component toward the first turbine component, wherein each of the snap arms is formed with a barb extending outwardly from an axially distal end of each of the snap arms, wherein the axially distal end of each of the snap arms axially extends through the first turbine component, and wherein the barb of each of the snap arms positively engages an annular rear surface of the first turbine component.

9. The turbine assembly as defined in claim 5, further comprising a radially expandable slotted ring, wherein each of the fasteners includes a single snap arm integrally formed with second turbine component and extending axially outward from the outer surface of the second turbine component toward the first turbine component, and wherein the snap arm is an arc coaxial with the rotational axis X, wherein the snap arm is formed with a barb extending radially outwardly from an axially distal end of the snap arm, wherein the axially distal end of the snap arm axially extends through the first turbine component, wherein the slotted ring is maintained radially over and around of each of the snap arms between the barbs and an annular rear surface of the first turbine component, and wherein the slotted ring positively engages the annular rear surface of the first turbine component.

10. The turbine assembly as defined in claim 9, wherein a radially inner peripheral edge of the first turbine component is provided with a plurality of circumferentially spaced, generally U-shaped cut-outs, and wherein the snap arms are configured to axially extend through the U-shaped cut-outs formed in the radially inner peripheral edge of the first turbine component in order to non-rotatably secure the second turbine component relative to the first turbine component.

11. The turbine assembly as defined in claim 4, wherein each of the fasteners includes a snap fastener formed separately from the first and second turbine components, wherein each of the snap fasteners includes a base and at least one snap arm integrally formed with the base and extending axially outward therefrom, wherein the at least one snap arm is formed with a barb extending outwardly from an axially distal end of the at least one snap arm, wherein the axially distal end of the at least one snap arm axially extends through the first and second turbine components, and wherein the barb positively engages an annular rear surface of the first turbine component.

12. The turbine assembly as defined in claim 1, wherein each of the first and second turbine components are made of a single component.

13. The turbine assembly as defined in claim 1, wherein the first and second turbine components are made of different materials having different mechanical characteristics.

14. A turbine assembly for a hydrokinetic torque converter, the turbine assembly rotatable about a rotational axis and comprising:
 a first turbine component coaxial with the rotational axis;
 a second turbine component formed separately from and non-moveably secured to the first turbine component coaxially therewith;
 a plurality of fasteners non-moveably securing the second turbine component to the first turbine component; and
 a plurality of radially expandable slotted rings,
 wherein the first turbine component has a plurality of first turbine blade members integrally formed therewith,
 wherein each of the fasteners includes a single cylindrical fastener arm integrally formed with the second turbine component and extending axially outward from the outer surface of the second turbine component toward the first turbine component,
 wherein each cylindrical fastener arm is formed with at least one barb extending outwardly from an axially distal end of the cylindrical fastener arm, wherein the axially distal end of the cylindrical fastener arm axially extends through the first turbine component,
 wherein each of the slotted rings is maintained radially over and around one of the cylindrical fastener arms between the at least one barb and an annular rear surface of the first turbine component, and wherein each of the slotted rings positively engages the annular rear surface of the first turbine component.

15. A turbine assembly for a hydrokinetic torque converter, the turbine assembly rotatable about a rotational axis and comprising:
 a first turbine component coaxial with the rotational axis;
 a second turbine component formed separately from and non-moveably secured to the first turbine component coaxially therewith;
 a plurality of fasteners non-moveably securing the second turbine component to the first turbine component; and
 a plurality of radially expandable slotted rings,
 wherein the first turbine component has a plurality of first turbine blade members integrally formed therewith,
 wherein each of the fasteners includes a single cylindrical fastener arm integrally formed with the second turbine component and extending axially outward from the outer surface of the second turbine component toward the first turbine component,
 wherein an axially distal free end of the cylindrical fastener arm is formed with an annular groove, wherein each of the slotted rings is maintained radially over and around one of the cylindrical fastener arms and at least partially seated in the annular groove of the fastener, and wherein each of the slotted rings positively engages an annular rear surface of the first turbine component.

16. A turbine assembly for a hydrokinetic torque converter, the turbine assembly rotatable about a rotational axis and comprising:
 a first turbine component coaxial with the rotational axis;
 a second turbine component formed separately from and non-moveably secured to the first turbine component coaxially therewith;
 a plurality of fasteners non-moveably securing the second turbine component to the first turbine component,
 wherein the first turbine component has a plurality of first turbine blade members integrally formed therewith,
 wherein each of the fasteners includes a single snap arm integrally formed with the second turbine component and extending axially outward from an outer surface of the second turbine component toward the first turbine component, and wherein the snap arm is a circular arc coaxial with the rotational axis X, wherein the snap arm is formed with a barb extending radially outwardly from an axially distal end of the snap arm, wherein the axially distal end of the snap arm axially extends through the first turbine component, and wherein the barb of the snap arm positively engages an annular rear surface of the first turbine component.

17. The turbine assembly as defined in claim 16, wherein a radially inner peripheral edge of the first turbine component is provided with a plurality of circumferentially spaced pairs of first and second protrusions, wherein each of the first and second protrusions extends radially inwardly extending from the radially inner peripheral edge of the first turbine component and integrally formed therewith, wherein the snap arms are configured to axially extend between the first and second protrusions in order to non-rotatably secure the second turbine component relative to the first turbine component, and wherein the radially inner peripheral edge of the first turbine component is coaxial with the rotational axis X.

18. A turbine assembly for a hydrokinetic torque converter, the turbine assembly rotatable about a rotational axis and comprising:
 a first turbine component coaxial with the rotational axis;
 a second turbine component formed separately from and non-moveably secured to the first turbine component coaxially therewith;
 a plurality of fasteners non-moveably securing the second turbine component to the first turbine component,
 wherein the first turbine component has a plurality of first turbine blade members integrally formed therewith,
 wherein each of the fasteners includes a single snap arm integrally formed with second turbine component and extending axially outward from an outer surface of the second turbine component toward the first turbine component, and wherein the snap arm is a circular arc not coaxial with the rotational axis X, wherein the snap arm is formed with a barb extending radially outwardly from an axially distal end of the snap arm, wherein the axially distal end of the snap arm axially extends through the first turbine component, and wherein the barb of the snap arm positively engages an annular rear surface of the first turbine component.

19. The turbine assembly as defined in claim 18, wherein a radially inner peripheral edge of the first turbine component is provided with a plurality of circumferentially spaced pairs of first and second protrusions, wherein each of the first and second protrusions extends radially inwardly extending from the radially inner peripheral edge of the first turbine component and integrally formed therewith, wherein the snap arms are configured to axially extend between the first and second protrusions in order to non-rotatably secure the second turbine component relative to the first turbine component, and wherein the radially inner peripheral edge of the first turbine component is coaxial with the rotational axis X.

20. A hydrokinetic torque converter, comprising:
an impeller assembly rotatable about a rotational axis, the impeller assembly including a impeller shell and a plurality of impeller blades outwardly extending from the impeller shell; and
a turbine assembly rotatable about the rotational axis and disposed axially opposite to the impeller assembly, the turbine assembly coaxially aligned with and hydrodynamically drivable by the impeller assembly, the turbine assembly comprising:
a first turbine component including a first turbine shell member coaxial with the rotational axis; and
a second turbine component formed separately from the first turbine component and including a second turbine shell member non-moveably secured to the first turbine shell member substantially coaxially therewith so that the second turbine shell member overlaps the first turbine shell member;
the first turbine component having a plurality of first turbine blade members integrally formed with and outwardly extending from the first turbine shell member;
the second turbine shell member of the second turbine component having an outer surface non-moveably engaging the first turbine shell member of the first turbine component and a concave inner surface disposed axially opposite to the outer surface of the second turbine shell member so as to face the impeller blades of the impeller assembly;
the second turbine component including a plurality of second turbine blade members integrally formed with and outwardly extending from the second turbine shell member;
each of the first turbine blade members is oriented adjacent to one of the second turbine blade members so as to define together a turbine blade of the turbine assembly; and
a turbine hub rotatable about the rotational axis and non-moveably secured to one of the first turbine component and the second turbine component of the turbine assembly.

21. The hydrokinetic torque converter as defined in claim 20, wherein the second turbine component having a plurality of second turbine blade members integrally formed therewith.

22. The hydrokinetic torque converter as defined in claim 20, wherein each of the first and second turbine components are made of a single component.

23. The hydrokinetic torque converter as defined in claim 20 wherein the first and second turbine components are made of different materials having different mechanical characteristics.

24. A hydrokinetic torque converter, comprising:
an impeller assembly rotatable about a rotational axis, the impeller assembly including a impeller shell and a plurality of impeller blades outwardly extending from the impeller shell; and
a turbine assembly rotatable about the rotational axis and disposed axially opposite to the impeller assembly, the turbine assembly coaxially aligned with and hydrodynamically drivable by the impeller assembly, the turbine assembly comprising:
a first turbine component coaxial with the rotational axis; and
a second turbine component formed separately from and non-moveably secured to the turbine component coaxially therewith;
the first turbine component having a plurality of first turbine blade members integrally formed therewith; and
a turbine hub rotatable about the rotational axis and non-moveably secured to one of the first turbine component and the second turbine component of the turbine assembly,
wherein the second turbine component has a plurality of second turbine blade members integrally formed therewith, and
wherein each of the first turbine blade members is oriented adjacent to one of the second turbine blade members so as to define together a turbine blade of the turbine assembly.

25. A method for assembling a turbine assembly of a hydrokinetic torque converter, the method comprising the steps of:
providing a first turbine component, the first turbine component having a first turbine shell member and a plurality of first turbine blade members integrally formed therewith;
providing a second turbine component formed separately from the first turbine component, the second turbine component including a second turbine shell member and a plurality of second turbine blade members integrally formed therewith;
providing a plurality of fasteners each including at least one fastener arm; and
non-moveably securing the second turbine shell member of the second turbine component to the first turbine shell member of the first turbine component by means of the fasteners such that the at least one fastener arm extending axially outward from the second turbine component through the first turbine component so that the second turbine shell member overlaps the first turbine shell member.

* * * * *